US008280398B2

(12) United States Patent
Ishii et al.

(10) Patent No.: US 8,280,398 B2
(45) Date of Patent: Oct. 2, 2012

(54) POSITIONING SYSTEM, POSITIONING METHOD, AND PROGRAM THEREOF

(75) Inventors: Kenichi Ishii, Tokyo (JP); Junichi Matsuda, Tokyo (JP)

(73) Assignee: NEC Corporation (JP)

( * ) Notice: Subject to any disclaimer, the term of this patent is extended or adjusted under 35 U.S.C. 154(b) by 509 days.

(21) Appl. No.: 10/591,370

(22) PCT Filed: Mar. 3, 2005

(86) PCT No.: PCT/JP2005/003595
§ 371 (c)(1),
(2), (4) Date: Sep. 1, 2006

(87) PCT Pub. No.: WO2005/086375
PCT Pub. Date: Sep. 15, 2005

(65) Prior Publication Data
US 2007/0177161 A1    Aug. 2, 2007

(30) Foreign Application Priority Data

Mar. 3, 2004  (JP) ................................. 2004-058524
Oct. 27, 2004  (JP) ................................. 2004-311977
Mar. 1, 2005  (JP) ................................. 2005-055961

(51) Int. Cl.
*H04B 10/00* (2006.01)
(52) U.S. Cl. .................. 455/456.1; 340/539.13; 398/127
(58) Field of Classification Search ............... 455/456.1, 455/440
See application file for complete search history.

(56) References Cited

U.S. PATENT DOCUMENTS

| 5,396,543 | A | * | 3/1995 | Beeson et al. ................ 455/560 |
| 5,917,425 | A | | 6/1999 | Crimmins et al. |
| 6,175,308 | B1 | * | 1/2001 | Tallman et al. .......... 340/539.11 |
| 6,385,458 | B1 | * | 5/2002 | Papadimitriou et al. ... 455/456.2 |
| 6,396,413 | B2 | * | 5/2002 | Hines et al. ..................... 340/8.1 |
| 6,528,782 | B1 | * | 3/2003 | Zhang et al. .................. 250/226 |
| 6,616,606 | B1 | * | 9/2003 | Petersen et al. ............... 600/300 |
| 6,731,071 | B2 | | 5/2004 | Baarman ......................... 315/51 |
| 6,756,723 | B2 | * | 6/2004 | Fukushima et al. .......... 313/332 |
| 6,768,909 | B1 | * | 7/2004 | Irvin ......................... 455/456.1 |
| 6,861,658 | B2 | * | 3/2005 | Fiset ......................... 250/504 R |
| 6,912,395 | B2 | * | 6/2005 | Benes et al. ............... 455/456.1 |
| 6,963,277 | B2 | * | 11/2005 | Imasaki et al. ............. 340/539.1 |

(Continued)

FOREIGN PATENT DOCUMENTS

JP    58-106838    6/1983

(Continued)

OTHER PUBLICATIONS

International Search Report PCT/JP2005/003595 dated May 30, 2005 (Japanese Patent Office).

(Continued)

*Primary Examiner* — Marcos Batista
*Assistant Examiner* — Frank Donado
(74) *Attorney, Agent, or Firm* — Ostrolenk Faber LLP

(57) ABSTRACT

A positioning system includes an illumination device, a terminal, and a positioning server. The illumination device transmits identification information. The terminal transmits the identification information received from the illumination device, to the positioning server. The positioning server uses the identification information received from the terminal, thereby searching an illumination installation position database registered in advance so as to identify the terminal position. This eliminates power supply for positioning infrastructure and facilitates attachment to a ceiling, thereby realizing the positioning infrastructure at a low cost.

27 Claims, 53 Drawing Sheets

U.S. PATENT DOCUMENTS

| | | | |
|---|---|---|---|
| 6,982,639 B2* | 1/2006 | Brackett et al. | 340/539.13 |
| 6,995,708 B2* | 2/2006 | Schmidt | 342/357.71 |
| 7,006,768 B1* | 2/2006 | Franklin | 398/127 |
| 7,109,869 B2* | 9/2006 | Sweatte | 340/573.1 |
| 7,138,974 B2* | 11/2006 | Hirakata et al. | 345/98 |
| 7,212,112 B2* | 5/2007 | Barber et | 340/539.2 |
| 7,260,408 B2* | 8/2007 | Friday et al. | 455/456.1 |
| 7,309,965 B2* | 12/2007 | Dowling et al. | 315/318 |
| 7,388,464 B2* | 6/2008 | Ward et al. | 340/3.41 |
| 7,411,921 B2* | 8/2008 | Strong et al. | 370/328 |
| 2001/0034223 A1* | 10/2001 | Rieser et al. | 455/404 |
| 2003/0073406 A1* | 4/2003 | Benjamin et al. | 455/41 |
| 2003/0155869 A1* | 8/2003 | Mollema et al. | 315/225 |
| 2003/0220117 A1* | 11/2003 | Duffett-Smith et al. | 455/456.6 |
| 2003/0222820 A1* | 12/2003 | Karr et al. | 342/457 |
| 2004/0021566 A1* | 2/2004 | Hayashi et al. | 340/539.13 |
| 2004/0101312 A1* | 5/2004 | Cabrera | 398/172 |
| 2004/0162084 A1* | 8/2004 | Wang | 455/456.1 |
| 2004/0203563 A1* | 10/2004 | Menard | 455/404.1 |
| 2004/0251884 A1* | 12/2004 | Steffie et al. | 323/282 |
| 2005/0032531 A1* | 2/2005 | Gong et al. | 455/456.5 |
| 2005/0068169 A1* | 3/2005 | Copley et al. | 340/539.13 |
| 2005/0109841 A1* | 5/2005 | Ryan et al. | 235/380 |
| 2005/0148346 A1* | 7/2005 | Maloney et al. | 455/456.6 |
| 2006/0015503 A1* | 1/2006 | Simons et al. | 707/10 |
| 2006/0025158 A1* | 2/2006 | Leblanc et al. | 455/456.2 |
| 2006/0056855 A1* | 3/2006 | Nakagawa et al. | 398/183 |

FOREIGN PATENT DOCUMENTS

| | | |
|---|---|---|
| JP | 03-240331 | 10/1991 |
| JP | 08-279061 | 10/1996 |
| JP | 08-297156 | 11/1996 |
| JP | 09-008734 | 1/1997 |
| JP | 09-145309 | 6/1997 |
| JP | 09-159688 | 6/1997 |
| JP | 10-079973 | 3/1998 |
| JP | 10-206183 | 8/1998 |
| JP | 10-300493 | 11/1998 |
| JP | 2001-235528 | 8/2001 |
| JP | 2003-269988 | 9/2003 |
| JP | 2005-148021 | 6/2005 |

OTHER PUBLICATIONS

Supplemental Partial European Search Report for counterpart European Application No. EP 05 71 9899.

Office Action issued by the Japanese Patent Office on Jun. 21, 2011 in connection with corresponding Japanese Patent Application No. 2006-510717.

English translation of Japanese Office Action issued in connection with Japanese Patent Application No. 2006-510717 on Jun. 21, 2011, Mar. 2011.

* cited by examiner

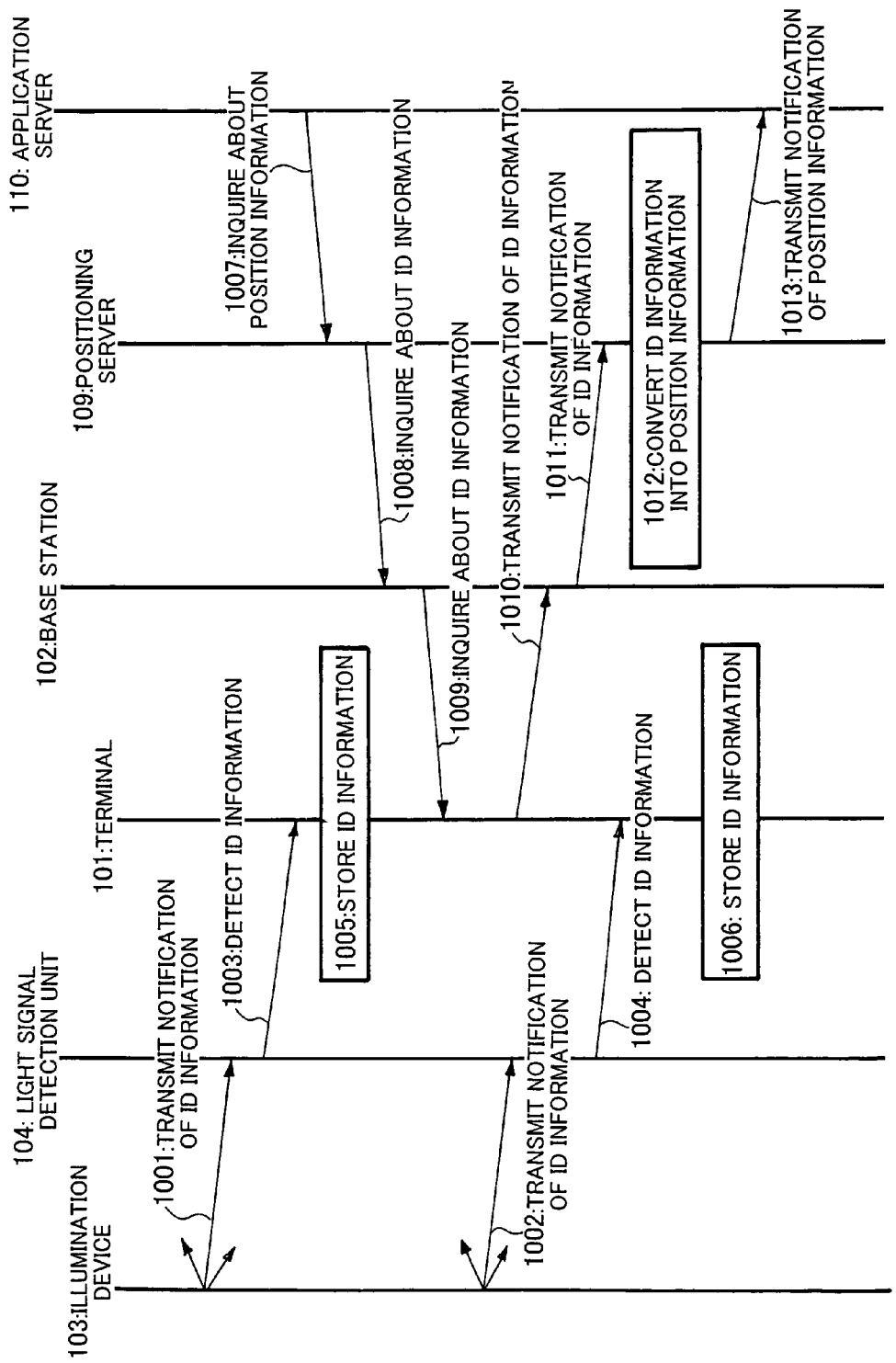

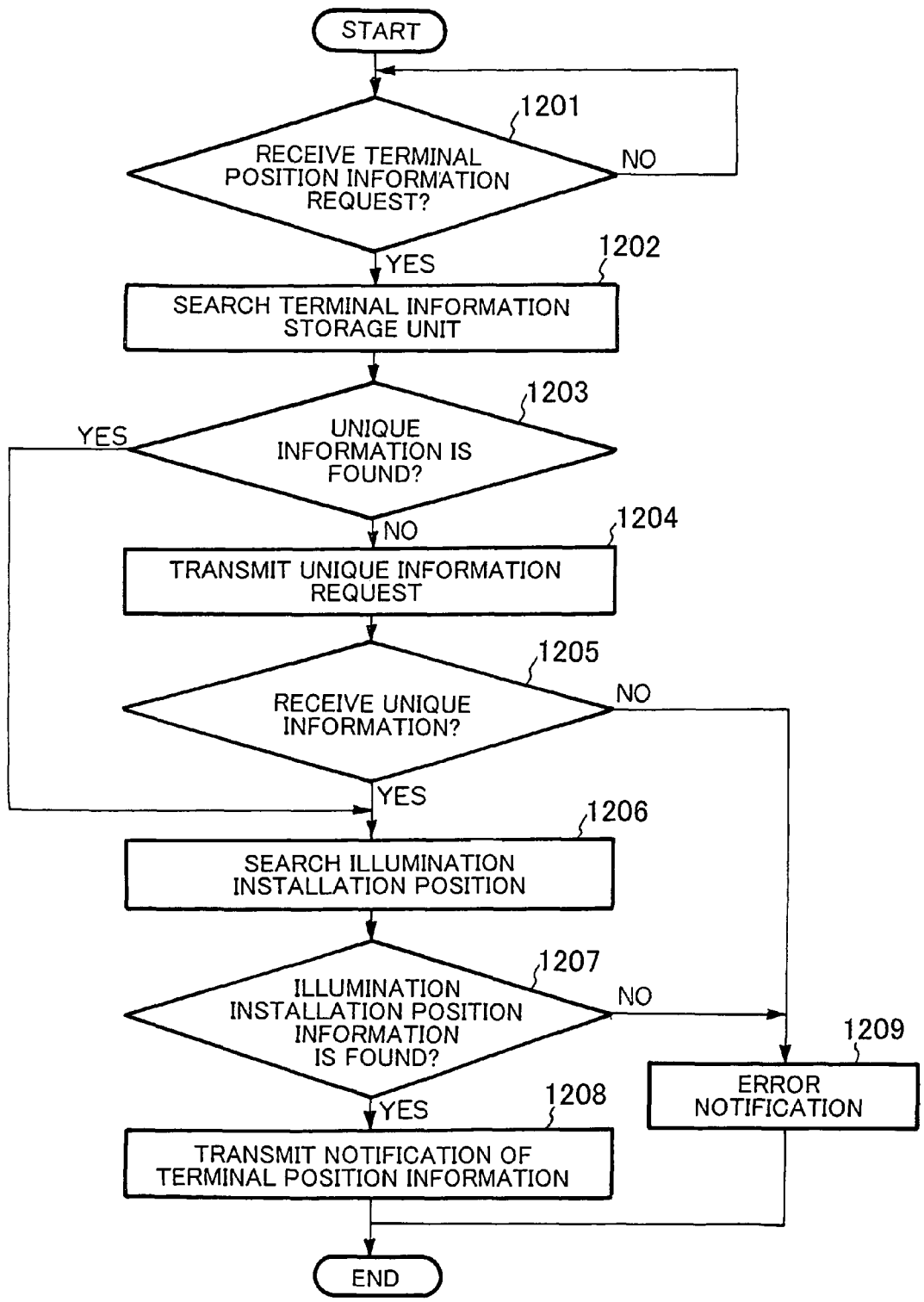

FIG.13

| TERMINAL ID (1301) | UNIQUE INFORMATION (1302) | RECEPTION TIME (1303) |
|---|---|---|
| ID 1 | ILLUMINATION ID 10 | 2003/10/01 15:10:53 |
| ID 2 | ILLUMINATION ID 06 | 2003/10/01 15:12:10 |
| ⋮ | ⋮ | ⋮ |

FIG.14

| UNIQUE INFORMATION (1401) | LOGICAL INFORMATION (1402) | COORDINATE INFORMATION (1403) | AREA INFORMATION (1404) |
|---|---|---|---|
| ILLUMINATION ID 10 | FIRST MEETING ROOM | X=10, Y=20, Z=2 | 10m |
| ILLUMINATION ID 06 | LOBBY | X=20, Y=10, Z=1 | 5m |
| ⋮ | ⋮ | ⋮ | ⋮ |

FIG.16

| TERMINAL ID 1301 | UNIQUE INFORMATION 1302 | RECEPTION TIME 1303 | BASE STATION ID 1601 | CONNECTION TIME 1602 |
|---|---|---|---|---|
| ID 1 | ILLUMINATION ID 10 | 2003/10/01 15:10:53 | BASE STATION ID 10 | 2003/10/01 15:00:05 |
| ID 2 | ILLUMINATION ID 06 | 2003/10/01 15:12:10 | BASE STATION ID 06 | 2003/10/01 15:02:20 |
| ...... | ...... | ...... | ...... | ...... |

FIG.17

| BASE STATION ID 1701 | LOGICAL INFORMATION 1702 | COORDINATE INFORMATION 1703 | AREA INFORMATION 1704 |
|---|---|---|---|
| BASE STATION ID 10 | FIRST MEETING ROOM | X=12, Y=22, Z=2 | 30m |
| BASE STATION ID 06 | LOBBY | X=22, Y=11, Z=1 | 25m |
| ...... | ...... | ...... | ...... |

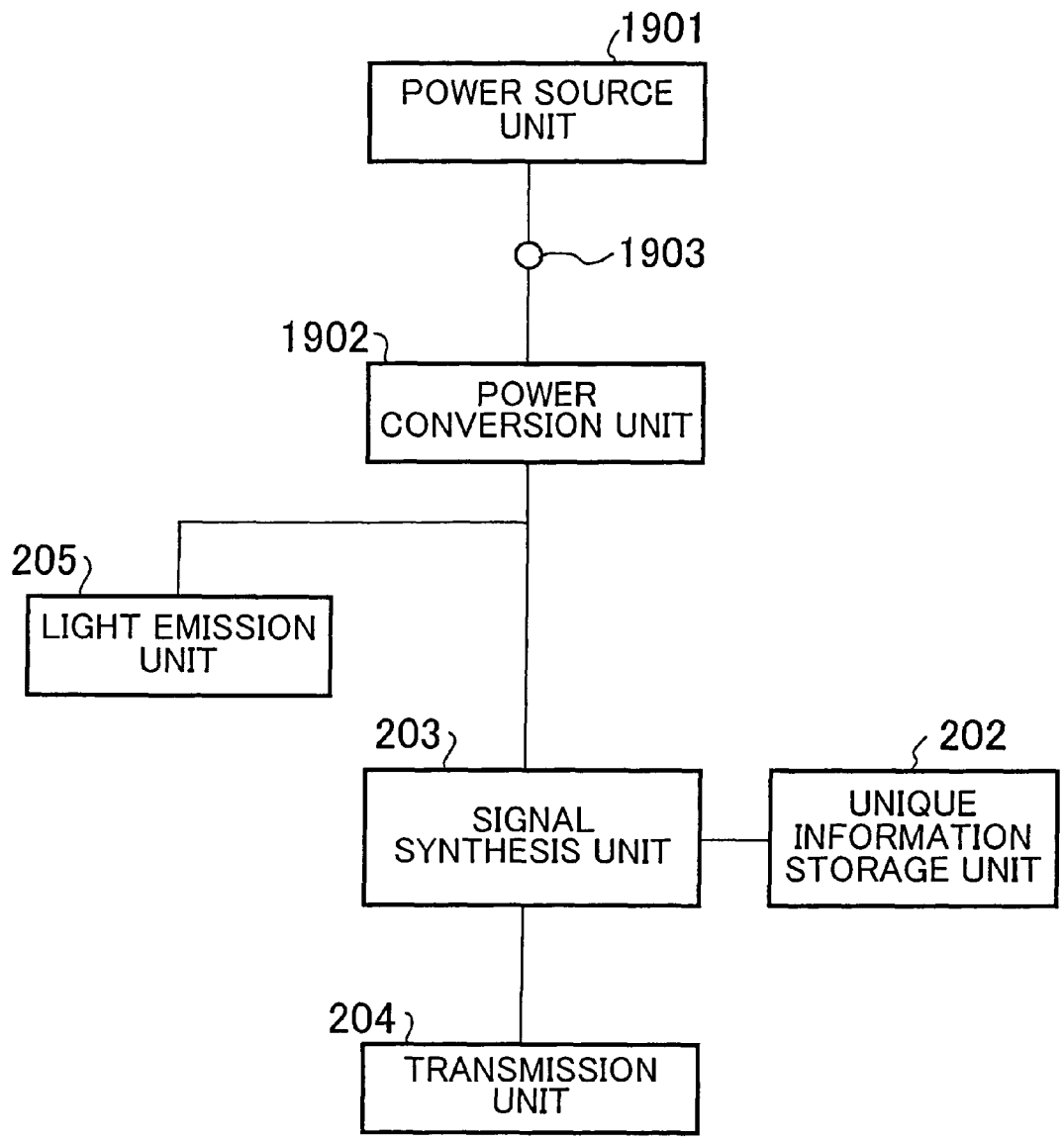
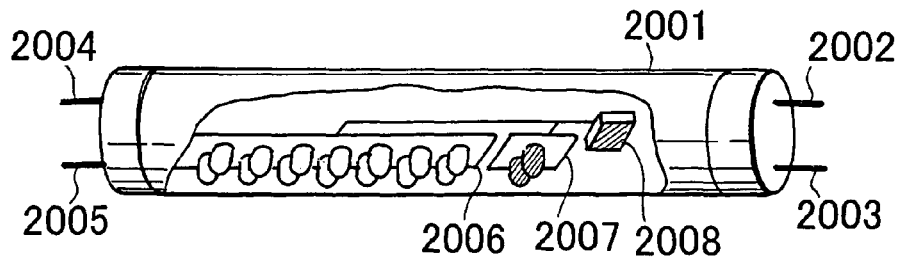

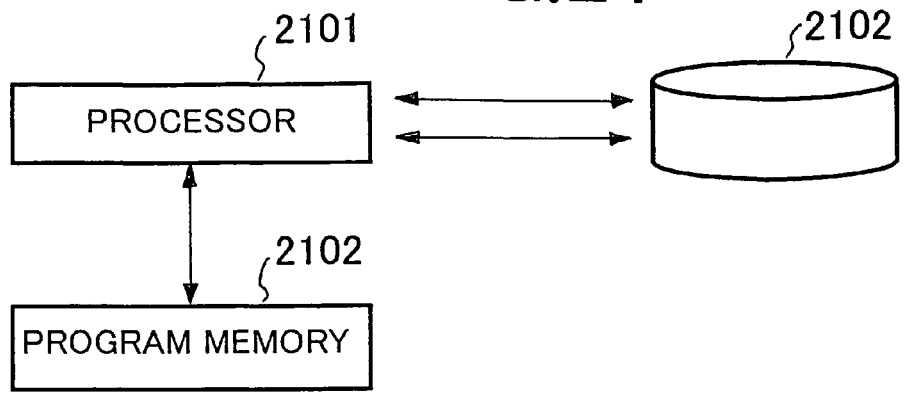
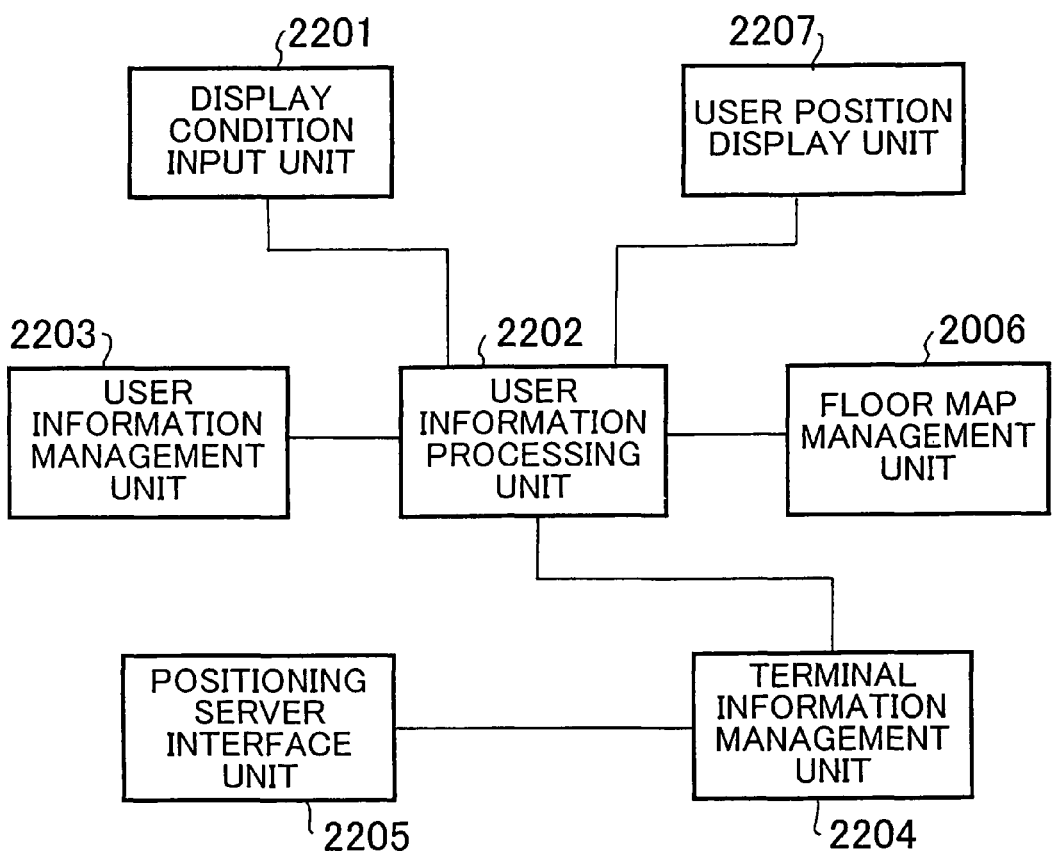

FIG.23

| USER ID | USER NAME | DEPARTMENT NAME | USER TERMINAL INFORMATION | TERMINAL TYPE |
|---|---|---|---|---|
| tanaka_taro | TARO TANAKA | FIRST SALES DEPARTMENT | tanaka_pc | WIRELESS LAN |
| sato_jiro | JIRO SATO | FIRST SALES DEPARTMENT | sato_pc | WIRELESS LAN |
| | | | sato_pc2 | WIRED LAN |
| suzuki_saburo | SABURO SUZUKI | SECOND SALES DEPARTMENT | suzuki_pc | WIRED LAN |
| yamada_siro | SHIRO YAMADA | FIRST SALES DEPARTMENT | yamada_pc | WIRELESS LAN |

FIG.24

| TERMINAL NAME | POSITION INFORMATION | POSITION ACCURACY | POSITION ACQUISITION TIME |
|---|---|---|---|
| tanaka_pc | F=2, X=10, Y=30 | 10m | 2003/1/10 17:20 |
| sato_pc | F=2, X=10, Y=20 | 3m | 2003/1/10 17:15 |
| sato_pc2 | F=1, X=20, Y=10 | 1m | 2003/1/10 16:00 |
| suzuki_pc | F=2, X=20, Y=20 | 1m | 2003/1/10 17:00 |
| yamada_pc | F=1, X=10, Y=10 | 10m | 2003/1/9  12:00 |

FIG.25

| FLOOR NAME | FILE NAME | FLOOR ID | AREA INFORMATION |
|---|---|---|---|
| FIRST FLOOR | 1Fmap.jpg | F=1 | X1=0, Y1=0, X1=50, Y2=50 |
| SECOND FLOOR | 2Fmap.jpg | F=2 | X1=0, Y1=0, X1=50, Y2=50 |
| THIRD FLOOR | 3Fmap.jpg | F=3 | X1=0, Y1=0, X1=50, Y2=40 |
| FOURTH FLOOR | 4Fmap.jpg | F=4 | X1=20, Y1=0, X1=50, Y2=40 |
| FIFTH FLOOR | 5Fmap.jpg | F=5 | X1=20, Y1=0, X1=50, Y2=40 |

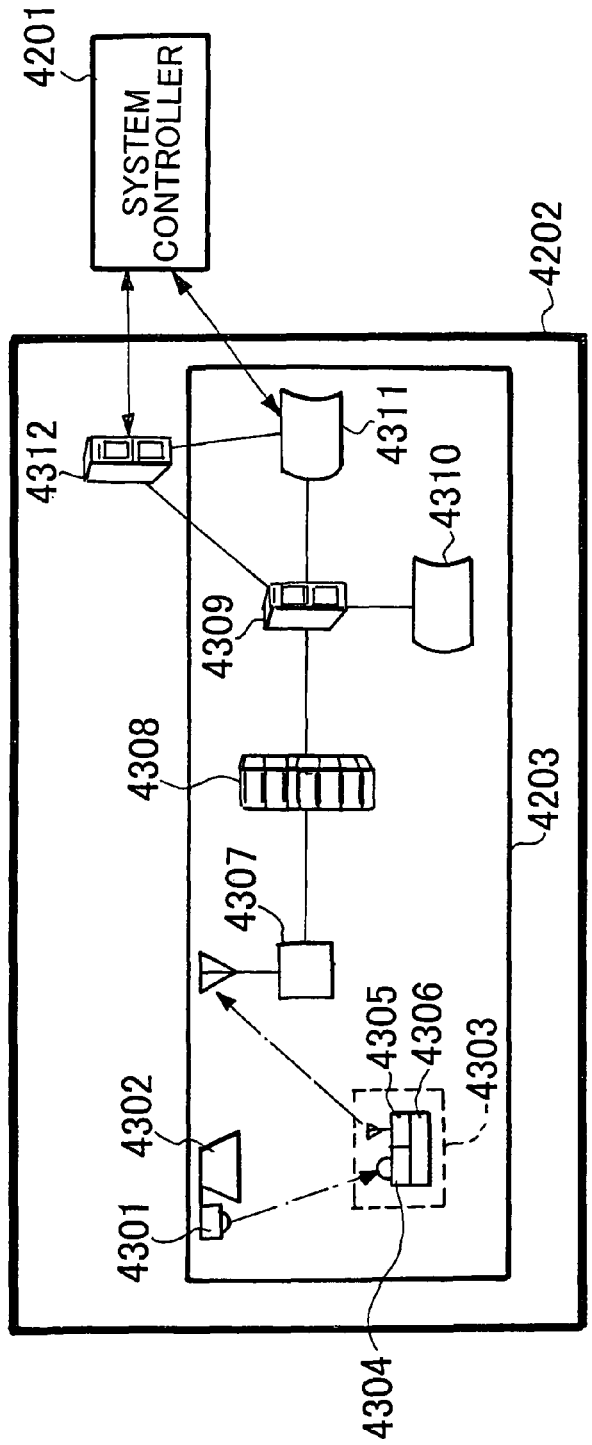

FIG.43

4202: ENTERING/LEAVING PERSON MANAGEMENT UNIT
4203: OPERATOR POSITION MANAGEMENT UNIT
4301: TRANSMITTER
4302: ILLUMINATION DEVICE
4303: TERMINAL
4304: LIGHT SIGNAL DETECTION UNIT
4305: PHS TRANSMITTER
4306: OPERATION CONTROLLER
4307: PHS BASE STATION
4308: SWITCHING SYSTEM
4309: POSITIONING SERVER
4310: ILLUMINATION INSTALLATION POSITION INFORMATION DB
4311: TERMINAL POSITION INFORMATION DB
4312: ENTERING/LEAVING PERSON MANAGEMENT SERVER

FIG.47

| | 4701 | |
|---|---|---|
| | TERMINAL ID "4509" | |
| 4702_1 | 10:10:15 | POSITION ID "1", JUST NEAR GATEWAY 4507 | 4703_1 |
| 4702_2 | 10:10:25 | POSITION ID "2", 5 m FROM GATEWAY 4507 | 4703_2 |
| 4702_3 | 10:10:35 | POSITION ID "3", 10 m FROM GATEWAY 4507 | 4703_3 |

FIG.50

| | 4701 | |
|---|---|---|
| | TERMINAL ID "4509" | |
| 4702_1 | 10:10:15 | POSITION ID "1", JUST NEAR GATEWAY 4507 — 4703_1 |
| 4702_2 | 10:10:25 | POSITION ID "2", 5 m FROM GATEWAY 4507 — 4703_2 |
| 4702_3 | 10:10:35 | POSITION ID "3", 10 m FROM GATEWAY 4507 — 4703_3 |
| | ⋮ | ⋮ |
| 5002_1 | 12:10:15 | POSITION ID "3", 10 m FROM GATEWAY 4507 — 5003_1 |
| 5002_2 | 12:10:25 | POSITION ID "2", 5 m FROM GATEWAY 4507 — 5003_2 |
| 5002_3 | 12:10:35 | POSITION ID "1", JUST NEAR GATEWAY 4507 — 5003_3 |

4301: TRANSMITTER
4302: ILLUMINATION DEVICE
4303: TERMINAL
4304: LIGHT SIGNAL DETECTION UNIT
4305: PHS TRANSMITTER
4306: OPERATION CONTROLLER
4307: PHS BASE STATION
4308: SWITCHING SYSTEM
4309: POSITIONING SERVER
4310: ILLUMINATION INSTALLATION POSITION INFORMATION DB
4311: TERMINAL POSITION INFORMATION DB
5503: EXIT DETECTION UNIT
5701: EXIT MANAGEMENT SERVER

FIG.73

| TERMINAL ID (1301) | UNIQUE INFORMATION (1302) | RECEPTION TIME (1303) |
|---|---|---|
| ID 1 | ILLUMINATION ID 10 | 2003/10/01 15:10:53 |
| ID 1 | ILLUMINATION ID 10 | 2003/10/01 15:10:57 |
| ID 1 | ILLUMINATION ID 03 | 2003/10/01 15:11:30 |
| ID 2 | ILLUMINATION ID 06 | 2003/10/01 15:12:10 |
| ID 3 | ILLUMINATION ID 07 | 2003/10/01 15:12:10 |
| ⋮ | ⋮ | ⋮ |

US 8,280,398 B2

POSITIONING SYSTEM, POSITIONING METHOD, AND PROGRAM THEREOF

CROSS REFERENCE TO RELATED APPLICATION

The present application is a 35 U.S.C. §§371 national phase conversion of PCT/JP2005/003595, filed 3 Mar. 2005, which claims priority of Japanese Patent Application No. 2004-058524, filed 3 Mar. 2004, Japanese Patent Application No. 2004-311977, filed 27 Oct. 2004, and Japanese Patent Application No. 2005-055961, filed 1 Mar. 2005, which is herein incorporated by reference. The PCT International Application was published in the Japanese language.

TECHNICAL FIELD

The present invention relates to a positioning technique for identifying the position of a wireless terminal and, more particularly, to a positioning technique for identifying the position of an indoor wireless terminal.

BACKGROUND ART

In a cellular system, a positioning technique for identifying the position of a terminal using a signal from a plurality of GPS (Global Positioning System) satellites or a plurality of base stations has been used. This technique can identify the position of a terminal with an accuracy of about 10 to 100 m.

However, in an indoor environment, it is difficult to receive a signal from GPS satellites or base stations needed for position identification, preventing highly accurate identification of the terminal position.

As a technique for identifying the position of a terminal used in an indoor environment, there are known positioning techniques such as one using a signal of a wireless LAN (Local Area Network) installed by and used at companies, shops or the like, one using a Bluetooth or RFID (Radio Frequency Identification) system.

In order to perform accurate positioning using a wireless LAN, three or more wireless LAN base stations need to be seen by a positioning target terminal. However, in the wireless LAN, where base stations are not installed under the design of providers unlike the case of a cellular system but are often installed at non-responsive or randomly selected locations, there is no guarantee that the positioning target terminal can see three or more base stations. In a positioning system using a weak radio wave, such as a Bluetooth or RFID system, it is possible to achieve pinpoint positioning while it is necessary to install a large number of communication modules conforming to Bluetooth or RFID to walls and a ceiling, increasing installation cost.

It can be seen, from such a background, it is not practical to install a positioning infrastructure that utilizes a Bluetooth or RFID system only for the positioning operation and, currently, a positioning technique capable of utilizing an infrastructure installed for purposes other than the positioning is required.

DISCLOSURE OF INVENTION

A first problem is that service coverage where a wireless LAN is used to achieve highly accurate positioning is low. The reason for this is that the area within which a positioning target terminal can see three or more wireless LAN base stations becomes narrower in highly accurate positioning system.

A second problem is that installation cost of an infrastructure using a Bluetooth or RFID system is high. The reason is that securing of power supply, installation of a backbone communication infrastructure, and work for fixing a large number of communication modules conforming to Bluetooth or RFID to walls, a ceiling and the like are necessary in order to install the Bluetooth or RFID system as a positioning infrastructure.

An object of the present invention is therefore to provide a technique to realize a positioning system for identifying the position of an indoor-use terminal at low cost.

To solve the above problem, according to the present invention, there is provided a positioning system which detects the position of a terminal, characterized by comprising: an illumination device configured to transmit unique information from a given installation position; a terminal configured to receive the unique information transmitted from the illumination device; and a position estimation means configured to estimate the position of the terminal based on the unique information that the terminal has received.

Preferably, in the positioning system according to the present invention, the unique information is illumination identification information for uniquely identifying the illumination device. Preferably the position estimation means manages illumination installation position information including the unique information and position information indicating the installation position of the illumination device in association with each other, reads out from the illumination installation position information the position information corresponding to the unique information that the terminal has received, and estimates the position of the terminal based on the read out position information.

Preferably, in the positioning system according to the present invention, the position estimation means estimates the position of the terminal based on one or more unique information that the terminal has received within a past predetermined time period. Preferably the position estimation means estimates the position of the terminal based on the unique information that the terminal has received most recently. Preferably the position estimation means estimates the position of the terminal based on most frequently received unique information among one or more unique information that the terminal has received within a past predetermined time period. Preferably the position estimation means adds a weighting value to one or more unique information that the terminal has received within a past predetermined time based on the reception time of the respective unique information and estimates the position of the terminal based on unique information selected based on a result of the addition. Preferably the position estimation means increases the weighting value as the reception time becomes newer, selects unique information having the largest value resulting from the addition, and estimates the position of the terminal based on the selected unique information.

Preferably, in the positioning system according to the present invention, the illumination device comprises a light emission unit for emitting an illumination light and a transmission unit for transmitting the unique information. Preferably the transmission unit comprises a white LED which emits a visible light signal and the white LED transmits the unique information on the visible light signal. Preferably the transmission unit comprises an infrared LED which emits an infrared ray signal and the infrared LED transmits the unique information on the infrared ray signal. Preferably the transmission unit comprises a wireless communication unit which transmits a radio signal and the wireless communication unit transmits the unique information on the radio signal. Preferably the transmission unit transmits the unique information to the terminal at random timing.

Preferably, in the positioning system according to the present invention, the illumination device comprises a power source unit and the light emission unit and transmission unit are separated from the power source unit. Preferably the light emission unit and transmission unit are connected to the power source unit by means of a power source interface of a fluorescent tube for a fluorescent illumination device. Preferably the light emission unit and transmission unit incorporate a power conversion unit.

Preferably, in the positioning system according to the present invention, the power conversion unit converts an AC power supplied from the power source interface of a fluorescent tube into a DC power that the light emission unit and transmission unit use. Preferably the light emission unit uses a fluorescent tube and the transmission unit incorporates the power conversion unit.

Preferably, in the positioning system according to the present invention, the power conversion unit converts an AC power supplied from the power source interface of a fluorescent tube into a DC power that the transmission unit uses. Preferably the power conversion unit comprises an overcurrent protection circuit for protecting the power source unit of the fluorescent illumination device. Preferably the power conversion unit comprises a power holding circuit for holding a power required for transmission of the unique information.

Preferably, in the positioning system according to the present invention, the fluorescent tube is a straight fluorescent tube having two electrode terminals respectively on both sides thereof, the straight fluorescent tube further comprises a power acquisition unit which is connected in parallel to the two electrode terminals formed at one side thereof and acquires a power to be supplied to the power conversion unit, and the power acquisition unit is formed into a plate having two holes through which the two electrode terminals are inserted. Preferably the power acquisition unit has a thickness of 1.3 mm or less.

Preferably, in the positioning system according to the present invention, the light emission unit and transmission unit are connected to the power source unit by means of a power source interface of an incandescent light bulb for an incandescent light bulb illumination device. Preferably the light emission unit and transmission unit incorporate a power conversion unit. Preferably the power conversion unit converts a DC power voltage supplied from the power source interface of an incandescent light bulb into a voltage form that the light emission unit and transmission unit use.

Preferably, in the positioning system according to the present invention, the illumination device comprises a solar battery unit and the transmission unit uses a power supplied from the solar battery unit to transmit the unique information. Preferably the solar battery unit converts a light energy output from the light emission unit into an electrical power. Preferably the illumination device comprises a rechargeable battery for storing a power supplied from the solar battery unit and the transmission unit transmits the unique information when a power required for the transmission of the information has been stored in the rechargeable battery.

Preferably, in the positioning system according to the present invention, the transmission unit determines an angle at which the unique information is transmitted depending on the size of the area within which the unique information can be received and installation level of the illumination device. Preferably the transmission unit determines the number and output power of LEDs constituting the transmission unit that transmits the unique information depending on the size of the area within which the unique information can be received, installation level of the illumination device, gain characteristics of a receiver of the terminal for receiving the unique information, and output characteristics of the LEDs constituting the transmission unit that transmits the unique information. Preferably the transmission unit comprises a plurality of LEDs which emit a light signal and the LEDs transmit the unique information on the light signal in different directions. Preferably the transmission unit determines the number of LEDs that transmit the unique information depending on a difference in the transmission direction between the adjacent two LEDs, transmission angles of LEDs, size of the area within which the unique information can be received, and installation level of the illumination device.

Preferably, in the positioning system according to the present invention, the illumination device emits a light having a color indicating that it is transmitting the unique information. Preferably the illumination device emits a light using different colors for each service type. Preferably the illumination device emits a light using different colors for each service provider providing a service using the position information of the terminal. Preferably the illumination device illuminates the area within which the terminal can receive the unique information with an illumination light. Preferably the illumination device comprises a storage unit for storing the unique information. Preferably the illumination installation position information is created by associating the unique information collected by the terminal and installation position of the illumination device with each other.

Preferably, in the positioning system according to the present invention, the positioning system further comprises a second positioning system and the positioning system and second positioning system can be operated in a switchable manner. Preferably the second positioning system uses a wireless LAN. Preferably in the case where requested terminal position information is logical position information, the positioning system uses the unique information that the illumination device transmits to identify the position of the terminal. Preferably in the case where the positioning system could not identify the position of the terminal by using the unique information, the system uses the second positioning system to identify the position of the terminal.

Preferably, in the positioning system according to the present invention, the positioning system determines, based on the type of the requested terminal position information, whether to identify the position of the terminal using the unique information or using the second positioning system. Preferably the positioning system displays acquired terminal position information. Preferably the positioning system reacquires terminal position information depending on the accuracy of acquired terminal position information.

Preferably, in the positioning system according to the present invention, the positioning system stores attribute information concerning the terminal and has a function of displaying the position information of the terminal corresponding to specified attribute information. Preferably the positioning system stores, as the attribute information of the terminal, a name of a department to which a terminal user belongs. Preferably the positioning system displays the terminal position information corresponding to a specified display condition. Preferably the positioning system specifies, as the display condition, information of floors in which the terminal exists.

Preferably, in the positioning system according to the present invention, the illumination device comprises a rechargeable battery and uses a power supply from the rechargeable battery to transmit information in the case where it cannot use a power source thereof. Preferably the positioning system identifies a user terminal in response to a position information request concerning a user of the terminal and acquires the position information of the identified terminal. Preferably in the case where a plurality of the user terminals exist, the positioning system selects one terminal in order of priority set for the respective terminals to acquire the position information thereof.

Preferably, in the positioning system according to the present invention, the priority is determined based on the type of the terminal. Preferably the priority is determined such that the position information of the terminal using a wireless LAN has a higher priority. Preferably the priority is determined based on presence/absence of a response from the terminal. Preferably the priority is determined based on the use state of the terminal.

To solve the above problem, according to the present invention, there is provided a positioning method of a position system which detects the position of a terminal, characterized by comprising: transmitting unique information using an illumination device from a given installation position thereof, receiving the unique information transmitted from the illumination device using a terminal; and estimating the position of the terminal based on the unique information received by the terminal.

Preferably, in the positioning method according to the present invention, the unique information is illumination identification information for uniquely identifying the illumination device. Preferably the positioning method stores illumination installation position information including the unique information and position information indicating the installation position of the illumination device in association with each other, reads out the position information corresponding to the unique information from the stored illumination installation position information based on the unique information received by the terminal, and estimates the position of the terminal based on the read out position information.

Preferably, in the positioning method according to the present invention, the method uses a white LED as a light emission source of the illumination device and uses the white LED to transmit the unique information on a visible light signal emitted by the white LED. Preferably the method uses an infrared LED to transmit the unique information on an infrared ray signal emitted by the infrared LED. Preferably the method uses a radio signal to transmit the unique information.

Preferably, in the positioning method according to the present invention, the illumination device transmits the unique information to the terminal at random timing. Preferably in the case where the light emission unit and transmission unit of the illumination device are connected to a power source unit by means of a power source interface of a fluorescent tube for a fluorescent illumination device, the light emission unit and transmission unit convert an AC power supplied from the power source interface of a fluorescent tube into a DC power. Preferably in the case where the light emission unit and transmission unit of the illumination device are connected to a power source unit by means of a power source interface of an incandescent light bulb for an incandescent light bulb illumination device, the light emission unit and transmission unit convert a DC power voltage supplied from the power source interface of an incandescent light bulb into a voltage form that they can use.

Preferably, in the positioning method according to the present invention, the method determines an angle at which the unique information is transmitted from the illumination device depending on the size of the area within which the unique information can be received and installation level of the illumination device. Preferably in the case where a plurality of LEDs are arranged in the illumination device so as to emit the unique information in different directions, the method determines the number of LEDs that transmit the unique information depending on a difference in the transmission direction between the adjacent two LEDs, transmission angles of LEDs, size of the area within which the unique information can be received, and installation level of the illumination device.

Preferably, in the positioning method according to the present invention, the method uses a terminal that can receive the unique information that the illumination device transmits to collect the unique information and associate the position at which the unique information is received and received unique information with each other to create the illumination installation position information to be stored in a positioning system.

Preferably, in the positioning method according to the present invention, in the case where position detection processing can be switched between the positioning system and a second positioning system and where a terminal position information request is logical position information, the method uses the unique information that the illumination device transmits to identify the position of the terminal. Preferably the second positioning system carries out the second positioning method using a wireless LAN. Preferably in the case where the position of the terminal could not be identified by using the unique information, the method uses the second positioning system to identify the position of the terminal. Preferably the method determines, based on the type of the requested position information, whether to identify the position of the terminal using the unique information or using the second positioning system.

To solve the above problem, according to the present invention, there is provided a program for a positioning server in a positioning system, the positioning system including an illumination device which transmits unique information from a given installation position, a terminal which receives the unique information, and a positioning server realized by a computer connected in a communicable manner to a terminal and detecting the position information of the terminal based on the unique information received by the terminal, the program allowing a computer serving as the positioning server to function as a position estimation means for estimating the position of the terminal based on the unique information that the terminal has received.

Preferably, in the program according to the present invention, the position estimation means reads out, from illumination installation position information in which the unique information and position information indicating the installation position of the illumination device are associated with each other based on the unique information received by the terminal, the position information corresponding to the unique information and estimates the position of the terminal based on the read out position information.

To solve the above problem, according to the present invention, there is provided a program for an application server in a positioning system, the positioning system including an illumination device which transmits unique information from a given installation position, a terminal which receives the unique information, and an application server realized by a computer connected in a communicable manner to a terminal and detecting the position of the terminal based on the unique information received by the terminal, the program allowing a computer serving as the application server to function as a display means for displaying the position information of the detected terminal.

Preferably, in the program according to the present invention, the display means reacquires terminal position information depending on the accuracy of acquired terminal position information. Preferably the display means stores attribute information concerning the terminal and displays the position information of the terminal corresponding to specified attribute information. Preferably the display means displays the terminal position information corresponding to a specified display condition.

Preferably, in the program according to the present invention, the program allows the computer serving as the application server to function as an acquisition means for receiving a position information request concerning a terminal user, identifying the terminal that the user uses, and acquiring the position information of the identified terminal.

Preferably, in the program according to the present invention, in the case where a plurality of the user terminals exist, the acquisition means selects one terminal in order of priority set for the respective terminals to acquire the position information thereof. Preferably the acquisition means determines the priority based on the type of the terminal. Preferably the acquisition means determines the priority such that the position information of the terminal using a wireless LAN has a higher priority. Preferably the acquisition means determines the priority based on presence/absence of a response from the terminal. Preferably the acquisition unit determines the priority based on the use state of the terminal.

Preferably in the positioning system according to the present invention, the power conversion unit comprises a protection means for supplying a DC power to the transmission unit only when an electrical connection between the power conversion unit and transmission unit is established. Preferably the protection means is constituted by a current detection means, a determination means, and a switching means; the current detection means detects the output current value of the power conversion unit and notifies the determination means of the detected output current value; and the determination means compares the notified output current value and a previously set threshold value, wherein in the case where the output current value is smaller than the threshold value, output of a DC power is stopped by the switching means; while in the case where the output current value is larger than the threshold value, a DC power is output by the switching means.

Preferably, in the positioning system according to the present invention, a connection interface for connecting the power conversion unit and transmission unit comprises an insulating means for preventing an electrical contact from outside at connection time. Preferably the connection interface is an electrode covered by an insulating body.

Preferably, in the positioning system according to the present invention, in which a configuration a person entering a specified area carries the terminal, the positioning system comprises: an entering person detection means for detecting the person who has entered the specified area; an entering person information management means for managing information concerning the person who has entered the specified area; a leaving person detection means for detecting a person who has left the specified area; a leaving person information management means for managing information concerning the person who has left the specified area; and a remainder identification means for identifying a person who remains in the specified area, in which the remainder identification means compares entering person information managed by the entering person management means and leaving person information managed by the leaving person information management means to identify a person who has entered the specified area but has not left the specified area as a remainder and identify the position of the terminal carried by the remainder.

Preferably, in the positioning system according to the present invention, the terminal comprises a signal reception means for receiving the unique information transmitted from the illumination device and an information transmission means for transmitting the received unique information and terminal identification information on a radio signal, and the positioning system identifies the position of the terminal based on the unique information and terminal identification information transmitted from the terminal. Preferably the information transmission means utilizes a PHS.

Preferably, in the positioning system according to the present invention, the entering person detection means and leaving person detection means are constituted by a plurality of the illumination devices installed near a gateway to the specified area, a storage means for storing the unique information and terminal identification information, and a moving direction detection means for detecting the moving direction of the person carrying the terminal from the stored unique information and terminal identification information, in which the terminal carried by a person who passes through the gateway from outside of the specified area and enters or leaves the specified area receives the unique information transmitted from the illumination device and uses the storage means to store the received unique information and terminal identification information, and the moving direction detection means refers to a change of the unique information transmitted from the specified terminal stored by using the storage means to estimate the moving direction of the person carrying the terminal and detects the person as an entering person in the case where the moving direction is toward the inside of the specified area while detects the person as a leaving person in the case where the moving direction is toward the outside of the specified area. Preferably the storage means is set outside the terminal and the terminal and storage means may communicate with each other using the information transmission means. Preferably the leaving person detection means detects as a leaving person the person carrying the terminal that has received the unique information transmitted from the illumination device installed outside the specified area.

Preferably, in the positioning system according to the present invention, position detection processing can be switched between the positioning system and a second positioning system. Preferably the second positioning system identifies the position of a PHS base station with which the terminal communicates with as the position of the terminal.

Preferably, in the positioning system according to the present invention, the entering person detection means comprises a reading device which stores information for the person to identify him or herself and reads out the information from a second terminal carried by the person and an entrance permission device which allows the person to enter the specified area in the case where readout of the information succeeds and the entering person information management means is a storage means for storing the information of the person allowed to enter the specified area.

Preferably, in the positioning system according to the present invention, the leaving person detection means comprises a reading device which stores information for the person to identify him or herself and reads out the information from a second terminal carried by the person and an exit permission device which allows the person to leave the specified area in the case where readout of the information succeeds, and the leaving person information management means is a storage means for storing the information of the person allowed to leave the specified area.

Preferably, in the positioning system according to the present invention, the leaving person detection means comprises a reading device which stores information for the person to identify him or herself and reads out the information from a second terminal carried by the person and an exit permission device which allows the person to leave the specified area in the case where readout of the information succeeds or a request from outside is received, a plurality of the illumination devices installed near the gateway to the specified area, a storage means for storing the unique information and terminal identification information, and a moving direction detection means for detecting the moving direction of the person carrying the terminal from the stored unique information and terminal identification information, wherein in the case where the exit permission device allows the person to leave the specified area in response to a request made from outside irrespective of success or failure of the readout of the information, the terminal carried by the person who enters the specified area through the gateway and leaves from the specified area receives the unique information transmitted from the illumination device and uses the storage means to store the unique information and terminal identification information, and the moving direction detection means refers to a change of the unique information transmitted from the specified terminal stored by using the storage means to estimate the moving direction of the person carrying the terminal and detects the person as a leaving person in the case where the moving direction is toward the outside of the specified area.

Preferably, in the positioning system according to the present invention, the second terminal is a noncontact IC card, and the reading device is a card reader.

Preferably, in the positioning system according to the present invention, the transmission unit is installed to a fixing body, for example, a ceiling or the like such that the direction in which the transmission power of the transmission unit becomes maximum is downward. Preferably a receiver of the unique information that the terminal has is attached to a moving body such that the direction in which the reception gain of the receiver becomes maximum is upward. Preferably the transmission unit is installed to a fixing body, for example, a column or the like such that the direction in which the transmission power of the transmission unit becomes maximum is horizontal. Preferably the receiver is attached to a moving body such that the direction in which the reception gain of the receiver becomes maximum is horizontal. Preferably two receivers are attached to a moving body. Preferably two receivers are attached to two different moving bodies such that the directions in which the reception gains of the receivers become the maximum are right and left, respectively. Preferably the positioning system determines entering/leaving of the moving body into/from a specified zone based on unique information that the receiver receives. Preferably the positioning system determines the direction of the moving body based on the unique information that the receiver receives.

According to the present invention, a system uses an illumination device to transmit unique information, uses a terminal to receive the unique information, and estimates the position of the terminal based on the unique information transmitted from the terminal. This configuration eliminates the need to provide a power source for a positioning infrastructure, facilitates attachment to a ceiling, thereby realizing the positioning infrastructure at a low cost.

BRIEF DESCRIPTION OF DRAWINGS

FIG. 10 is a time chart showing an example of a signal flow in the first embodiment of the present embodiment;

FIG. 12 is a flowchart showing an example of a process flow of the positioning server in the first embodiment of the present invention;

FIG. 13 is a table showing an example of information stored by a terminal information storage unit of the positioning server in the first embodiment of the present invention;

FIG. 14 is a table showing an example of information stored by an illumination installation position database of the positioning server in the first embodiment of the present invention;

FIG. 16 is a table showing another example of information stored in a terminal information storage unit of the positioning server in the second embodiment of the present invention;

FIG. 17 is a table showing an example of information stored in a base station installation position database of the positioning server in the second embodiment of the present invention;

FIG. 19 is a view showing a configuration example of an illumination module part of the illumination device in the first embodiment of the present invention;

FIG. 20 is a view showing a configuration example of the illumination module part in which an interface of an existing fluorescent tube is used as a connection interface in the first embodiment of the present invention;

FIG. 21 is view showing a configuration example of an information processing apparatus in a third embodiment of the present invention;

FIG. 22 is a view showing a configuration example of the application server in the second embodiment;

FIG. 23 is a table showing a configuration example of user information in the second embodiment of the present invention;

FIG. 24 is a table showing a configuration example of terminal information in the second embodiment of the present invention;

FIG. 25 is a table showing a configuration example of floor information in the second embodiment of the present invention;

FIG. 43 is a view showing configurations of an entering/leaving person management unit and an operator position management unit in the fourth embodiment of the present invention;

FIG. 47 is a table showing an example of information stored in a terminal position information DB at the entering person detection time in the fourth embodiment of the present invention;

FIG. 50 is a table showing an example of information stored in a terminal position information DB at the leaving person detection time in the fourth embodiment of the present invention;

FIG. 73 is a table showing another example of the terminal information stored by a terminal information storage unit in the first embodiment of the present invention.

DESCRIPTION OF REFERENCE SYMBOLS 101, 105: Terminal
102, 106: Base station
103, 107: Illumination device
104, 108: Light signal detection unit
109: Positioning server
110: Application server

BEST MODE FOR CARRYING OUT THE INVENTION

Embodiments of the present invention will be described in detail below with reference to the accompanying drawings. A positioning system according to the present embodiment has a terminal capable of receiving unique information from an illumination device and a positioning server which is connected to the terminal and has an illumination installation position database. The illumination device transmits unique information (identification information). The terminal transmits the unique information received from the illumination device to the positioning server. The positioning server uses the unique information received from the terminal, thereby searching the illumination installation position database registered in advance so as to identify the terminal position.

First Embodiment

Figure 1:
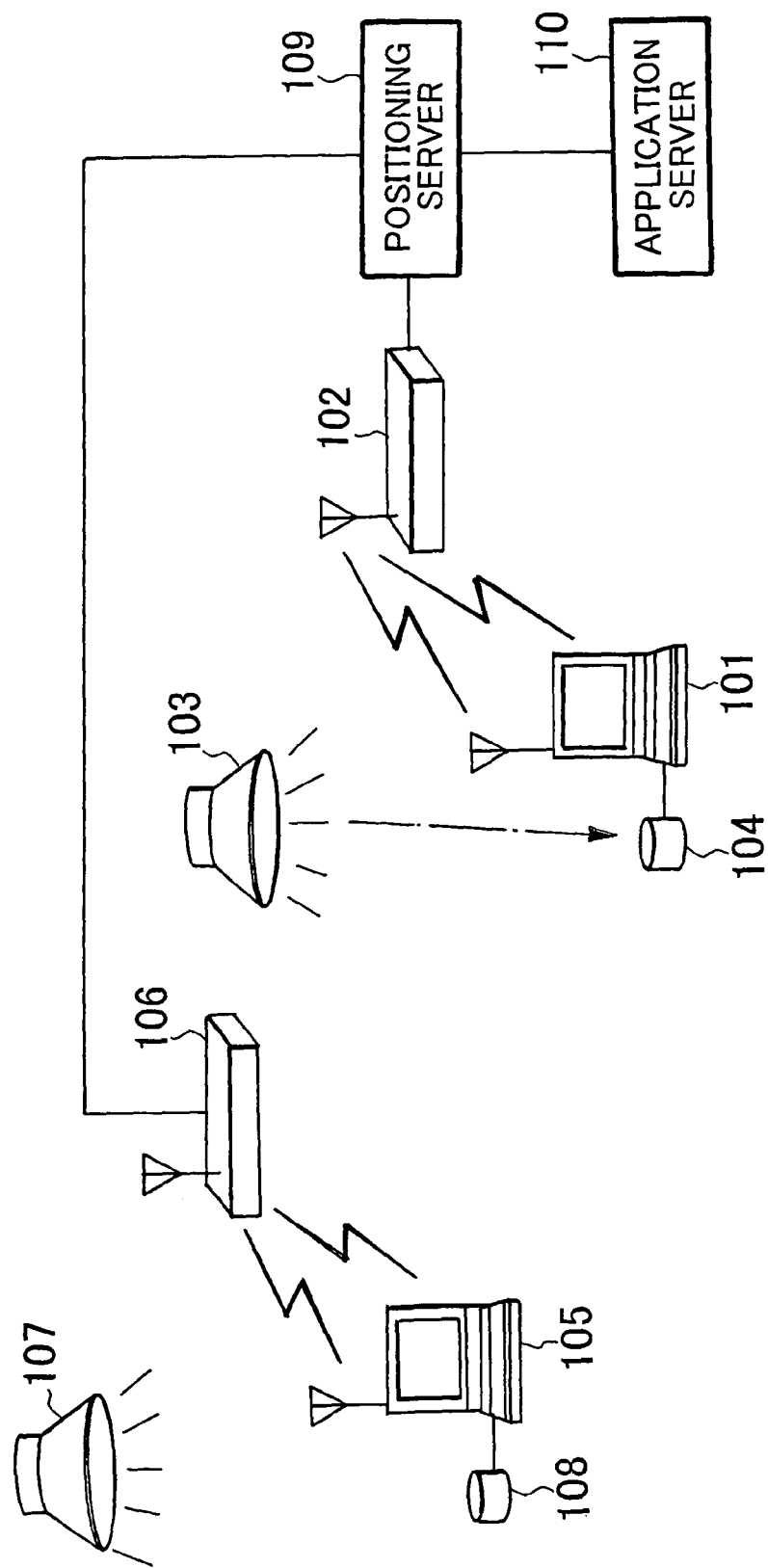
FIG. 1 is a view showing a configuration example of a positioning system in a first embodiment of the present invention.

FIG. 1 is a view showing the entire configuration of a positioning system according to a first embodiment. The positioning system of the first embodiment shown in FIG. 1 includes: a plurality of terminals 101 and 105 connected to light signal detection units 104 and 108; a plurality of base stations 102 and 106 which perform wireless communication between themselves and terminals 101 and 105; a plurality of illumination devices 103 and 107 which transmit unique information as a light signal capable of being detected by the light signal detection units 104 and 108; one or more positioning servers 109 (In FIG. 1, one positioning server 109 is provided) connected to the base stations 102 and 106 in a communicable manner; and one or more application servers 110 (In FIG. 1, one application server 110 is provided) connected to the positioning server 109 in a communicable manner. The positioning server 109 and application server 110 may be integrated as a single unit. Although not shown in FIG. 1, another network device or server unit may be used to constitute this system according to need.

The detailed configuration of the above components will be described with reference to the drawings.

Figure 2:
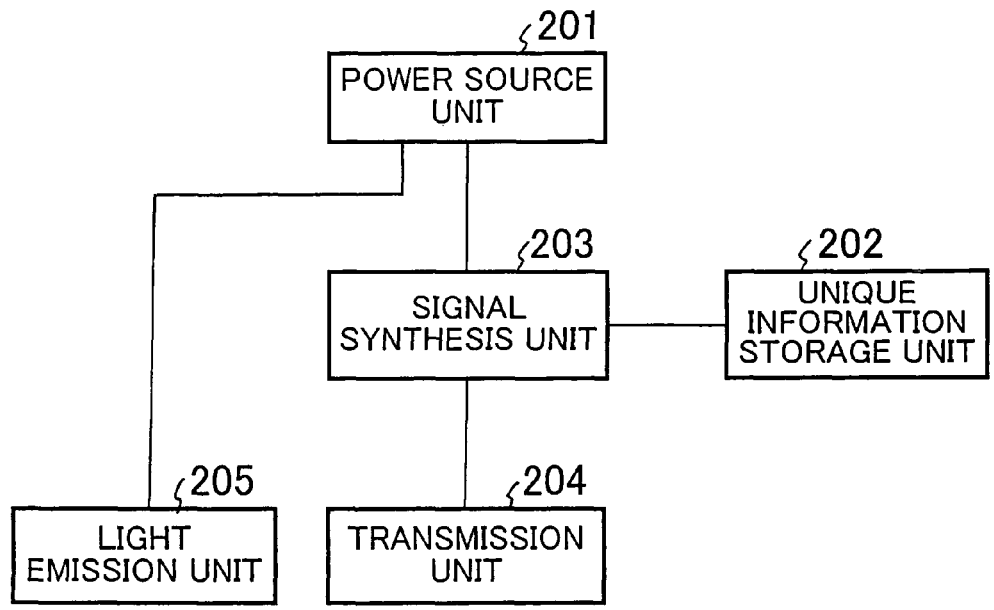
FIG. 2 is a view showing a configuration example of an illumination device in the first embodiment of the present invention.

FIG. 2 shows a configuration example of the illumination devices 103 and 107. As shown in FIG. 2, the light illumination device includes: a power source unit 201; a unique information storage unit 202 which retains and outputs unique information; a signal synthesis unit 203 which synthesizes an electrical power signal output from the power source unit 201 with the unique information output from the unique information storage unit 202; a transmission unit 204 which receives the electrical power signal with which the unique information has been synthesized and transmits the unique information as a light signal; a light emission unit 205 which emits a visible light as illumination; and other various required functions. The unique information may be number information for uniquely identifying the illumination devices or information indicating the position of the illumination device.

The transmission unit 204 uses an infrared LED or a white LED. The transmission unit 204 may transmit a radio signal in place of the light signal. In this case, the transmission unit 204 functions as a transmission unit that transmits a radio signal. The unique information that the transmission unit 204 transmits may be identification information for uniquely identifying the illumination device or information indicating the position of the illumination device.

The light emission unit 205 uses a white LED that emits the same white light as an ordinary illumination light. The light emission unit 205 may use an LED that emits a light having such a color that a user can visibly recognize that the illumination device includes the transmission unit 204.

Figure 32:
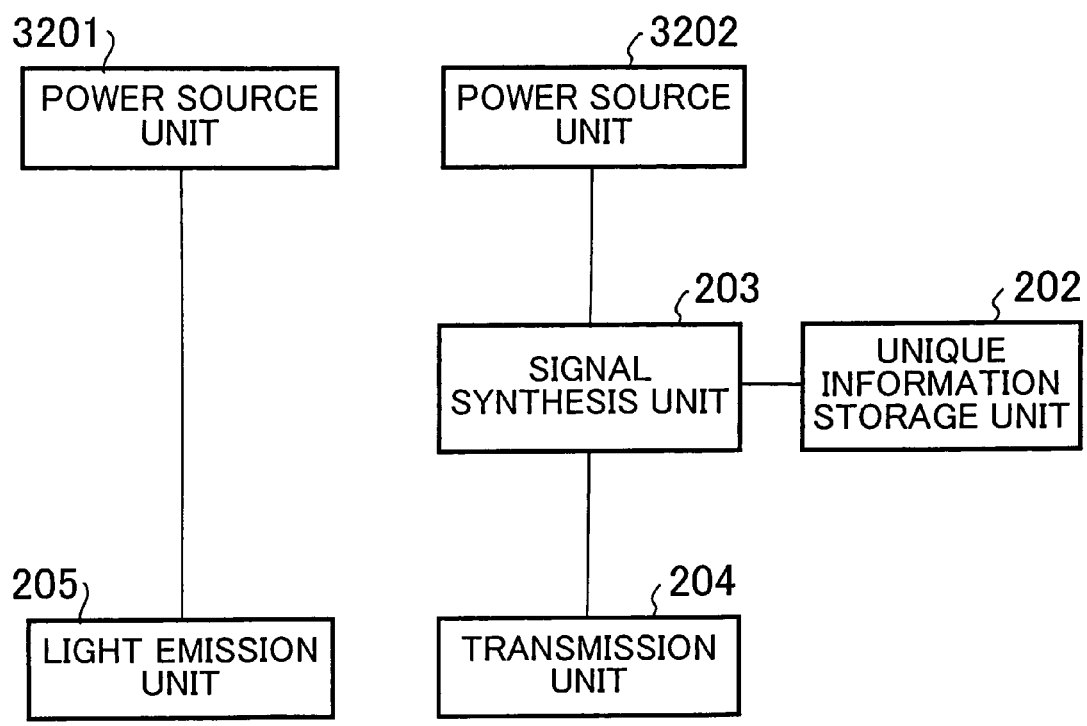
FIG. 32 is a block diagram showing another configuration example of the illumination device in the first embodiment of the present invention.

In the example of FIG. 2, the power source unit is shared by the transmission unit 204 and light emission unit 205. Alternatively, however, as shown in FIG. 32, the transmission unit 204 and light emission unit 205 may have power source units 3201 and 3202 respectively for individual use so as to be able to transmit the unique information even when the illumination device is turned off. Further, the illumination device may include a rechargeable battery. In this case, a power is supplied from the rechargeable battery to the transmission unit 204 during extinction. In the case where the transmission unit 204 uses a white LED, the light emission unit 205 can be omitted and, in this case, the transmission unit 204 uses the white LED to function also as the light emission unit 205.

Further, as an illumination device actually used, the components excluding the power source unit 201, i.e., the light emission unit 205, unique information storage unit 202, signal synthesis unit 203, and transmission unit 204 may be configured to be detachable like an existing fluorescent tube or light bulb in fluorescent light illumination or filament lamp illumination. In this case, a plurality of light emission units 205 are configured as detachable units and one of the units may be configured as a transmission device constituted by the unique information storage unit 202, signal synthesis unit 203, and transmission unit 204.

Further, a configuration may be adopted in which the light emission unit 205, unique information storage unit 202, signal synthesis unit 203, and transmission unit 204 are formed as a unit having the same shape as that of an existing fluorescent tube or light bulb, a connection part of the unit to the power source unit is made equal to that of an existing fluorescent tube or light bulb, and the unit having such a configuration is attached to an existing illumination device. Specifically, the unit is made attachable to a socket conforming to JIS C 8302 (supporting IEC 60238) or JIS C 8324 (supporting IEC 60400).

FIG. 19 shows another configuration of the illumination devices 103 and 107. In this configuration example, the unique information storage unit 202, signal synthesis unit 203, transmission unit 204, and light emission unit 205 are connected to a power source unit 1901 by means of a connection interface 1903.

The power conversion unit 1902 converts a power received through the connection interface 1903 into a specification that the light emission unit 205 and the like can use. For example, in the case where the connection interface 1903 has the same specification as the interface of an existing fluorescent tube, a power to be supplied through the connection interface 1903 is an AC power. While in the case where the light emission unit 205 uses a white LED, it uses a DC power, so that the power conversion unit 1902 converts an AC power into a DC power.

In the case where the connection interface 1903 has the same specification as the interface of an existing light bulb, a power to be supplied through the connection interface 1903 is a DC power of about 100V. While the light emission unit 205 and transmission unit 204 use a DC power at a lower voltage, so that the power conversion unit 1902 performs voltage conversion of the DC power.

Figure 34:
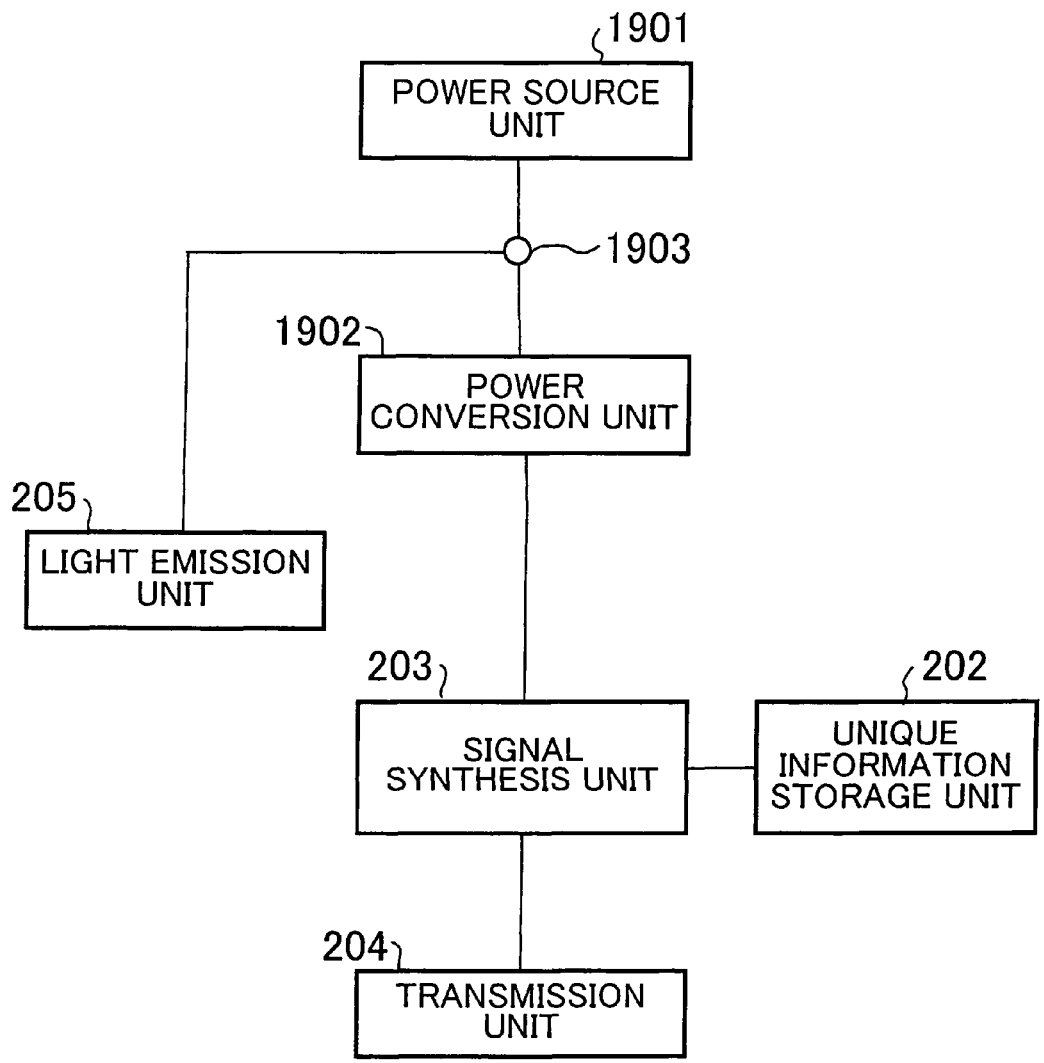
FIG. 34 is a view showing a configuration example of an illumination module part of the illumination device in the first embodiment of the present invention.

FIG. 34 shows still another configuration example of the illumination device 103 and 107. In this configuration example, the unique information storage unit 202, signal synthesis unit 203, transmission unit 204, light emission unit 205, and power conversion unit 1902 are connected to the power source unit 1901 by means of the connection interface 1903. A power to be supplied through the connection interface 1903 is directly supplied to the light emission unit 205. While a power to be supplied to the unique information storage unit 202, signal synthesis unit 203, and transmission unit 204 is converted into a specification that the light emitting unit 205 and the like can use by the power conversion unit 1902.

For example, in the case where the connection interface 1903 has the same specification as the interface of an existing fluorescent tube, a power to be supplied through the connection interface 1903 is an AC power. While in the case where the transmission unit 204 uses an LED, it uses a DC power, so that the power conversion unit 1902 converts an AC power into a DC power.

Figure 35:
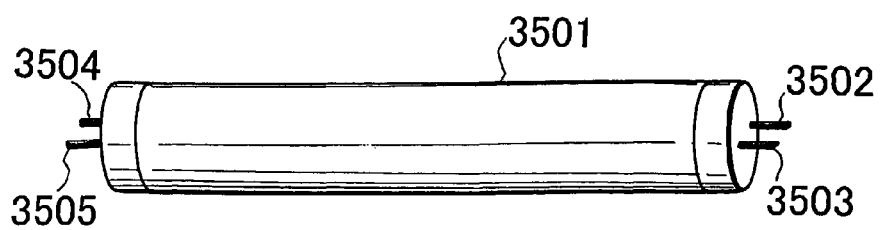
FIG. 35 is a view showing a configuration example of a straight fluorescent tube in the first embodiment of the present invention.
Figure 36:
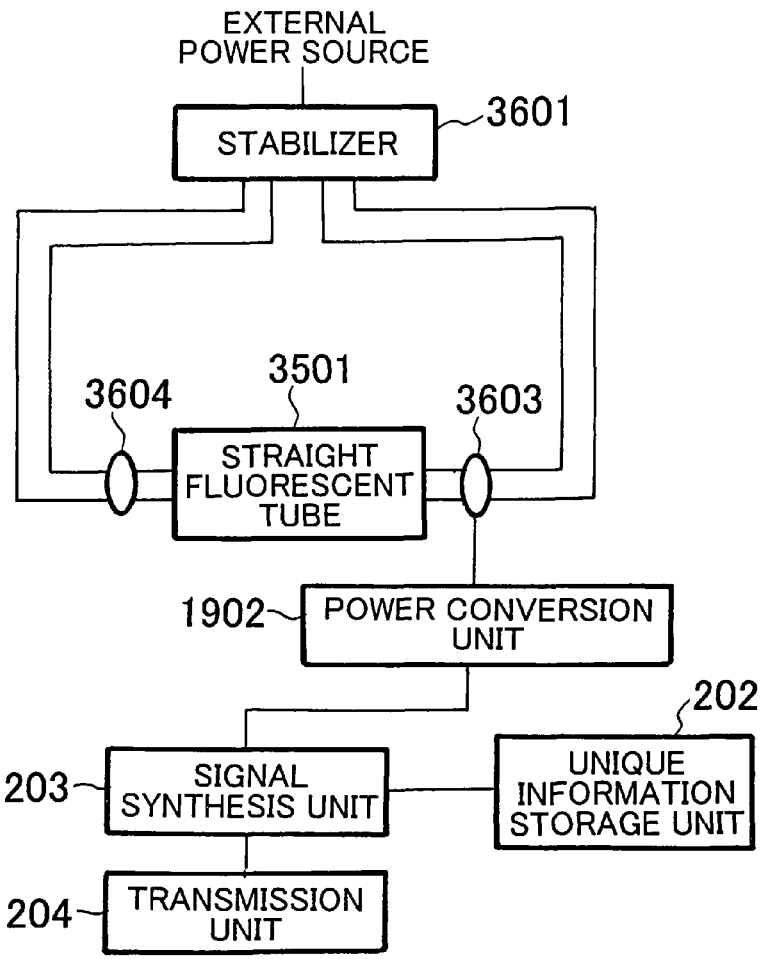
FIG. 36 is a detailed configuration example of the illumination device in the first embodiment of the present invention.

FIGS. 35 and 36 are views for explaining in more detail the configuration of the illumination device shown in FIG. 34. Assume that a fluorescent tube is used as the light emission unit 205 of FIG. 34 in the present embodiment. Although there are lots of different types of fluorescent tubes, a straight fluorescent tube 3501 shown in FIG. 35 is used as the light emission unit 205.

As shown in FIG. 35, two electrode terminals are formed respectively at both ends of the straight fluorescent tube 3501. Specifically, electrode terminals 3502 and 3503 are formed at one end of the straight fluorescent tube 3501 and electrode terminals 3504 and 3505 are at the other end thereof. Such a straight fluorescent tube 3501 is connected to a stabilizer 3601 through connectors 3603 and 3604, as shown in FIG. 36.

The stabilizer 3601 receives a power supply from an external power source and generates a voltage required for allowing the fluorescent tube 3501 to emit a light.

Figure 37:
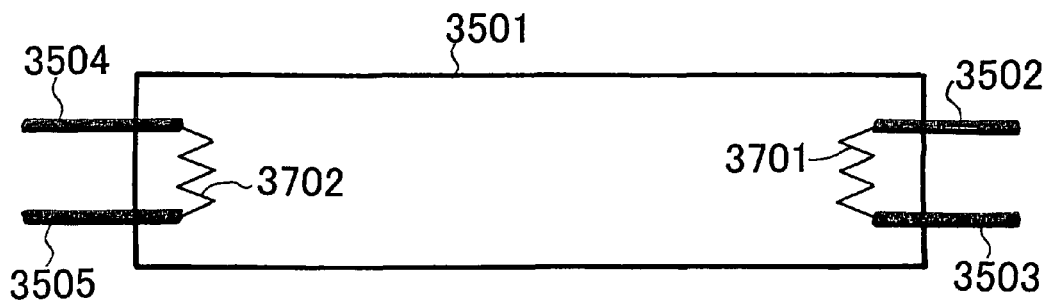
FIG. 37 is a view showing an internal configuration example of a straight fluorescent tube in the first embodiment of the present invention.

FIG. 37 is a view showing an internal configuration of the straight fluorescent tube 3501. As shown in FIG. 37, electrode terminals 3502, 3503, 3504, and 3505 of the straight fluorescent tube 3501 are connected respectively to coil filaments 3701 and 3702 in the interior of the straight fluorescent tube 3501.

Lighting operation of the straight fluorescent tube 3501 will be described. Firstly the stabilizer 3601 applies a residual heat voltage between the electrode terminals 3502 and 3503 and between the electrode terminals 3504 and 3505 to heat coil filaments 3701 and 3702 in the interior of the fluorescent tube. After a given time has elapsed, a high-voltage is applied between the electrode terminals 3502 on one side and 3503 and between the electrode terminals 3504 and 3505 on the opposite side to induce discharge between the electrodes at both ends of the straight fluorescent tube 3501 to light the fluorescent tube. The stabilizer continues applying a residual heat voltage between the electrode terminals 3502 and 3503 and between the electrode terminals 3504 and 3505 after the lightening of the straight fluorescent tube 3501.

In the present embodiment, a residual heat voltage applied between the electrode terminals 3502 and 3503 and between the electrode terminals 3504 and 3505 is used to activate the unique information storage unit 202, signal synthesis unit 203, and transmission unit 204 to transmit unique information as a light signal.

Figure 38:
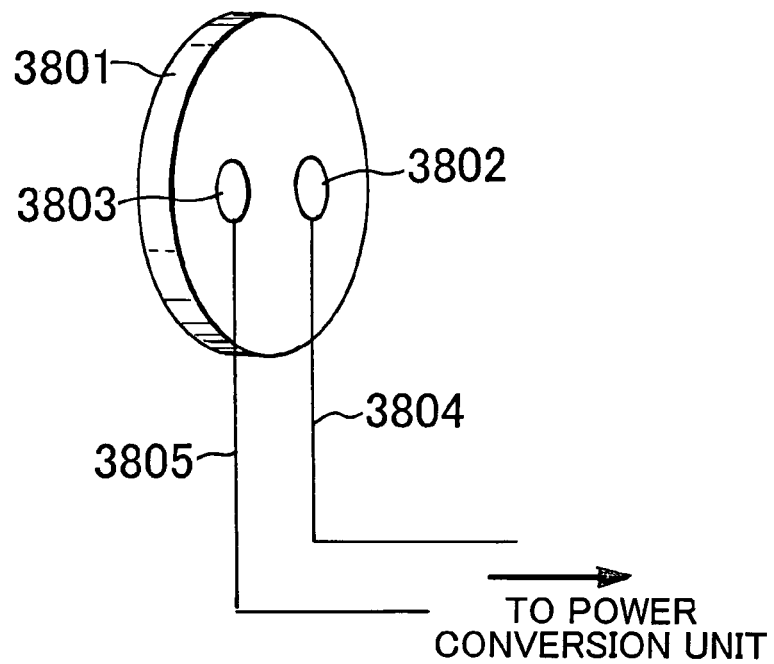
FIG. 38 is a view showing a configuration example of a power acquisition unit in the first embodiment of the present invention.

FIG. 38 shows a configuration of a power acquisition unit for acquiring a power used to activate the transmission unit 204 and the like from the connection portion between the straight fluorescent tube 3501 and stabilizer 3601. The power acquisition unit is a plate-like insulating body 3801 having two electrode insertion portions 3802 and 3803 serving as holes for inserting the electrode terminals 3502 and 3503 of the straight fluorescent tube 3501. The edges of the holes are formed as metal portions, which are brought into contact with the electrode terminals 3502 and 3503 respectively to establish electrical connection between the electrode insertion portion 3802 and electrode terminal 3502 and between the electrode insertion portion 3803 and electrode terminal 3503.

Power source lines 3804 and 3805 are connected to the electrode insertion portions 3802 and 3803 to connect the power conversion unit 1902 and electrode insertion portions 3802, 3803.

Figure 39:
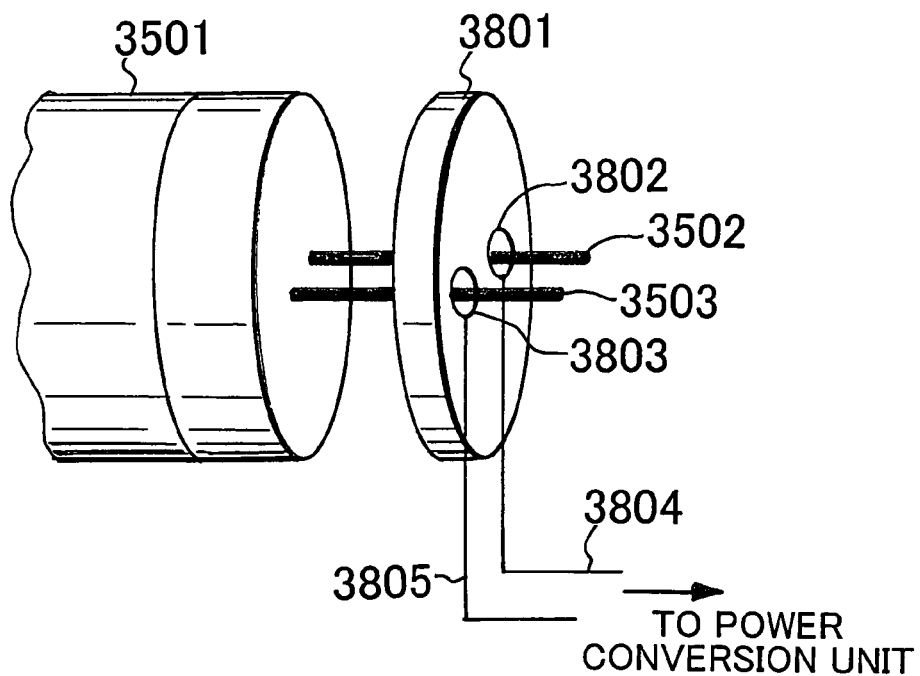
FIG. 39 is a view showing a state where the power acquisition unit is attached to the straight fluorescent tube in the first embodiment of the present invention.

FIG. 39 shows a state where the power acquisition unit shown in FIG. 38 is attached to the straight fluorescent tube 3501. Although the insulating body 3801 is inserted all the way when actually used, FIG. 39 shows a state where the insulating body 3801 has been inserted halfway so as to make attachment state understandable. A use of such power acquisition unit allows attachment of the transmission unit and the like in electrically parallel to the coil filament 3701 and the like to thereby allow the transmission unit 204 and the like to use a part of residual heat power.

Although the power acquisition unit is formed into a disk shape in FIGS. 38 and 39, it may be formed into any other shapes. When the diameter of the power acquisition unit, excluding the power source lines 3804 and 3805, is made smaller than the diameter of the fluorescent tube 3501, it becomes easier to attach the power acquisition unit to various types of fluorescent devices. The diameter of the fluorescent tube is specified by JIS C 7601.

It is preferable that the thickness of the insulating body 3801 be set to 1 mm or less. For example, JIS C 7601 specifies that the standard length of the main body of a starter-type 40-straight fluorescent tube is 1198.0 mm (maximum value: 1199.4 mm). Many fluorescent tube manufacturers manufacture fluorescent tubes according to the above standard length. Accordingly, the 40-straight fluorescent tube has a margin of 1.4 mm in specification. Thus, when the thickness of the insulating body 3801 is set to 1.4 mm or less, it is possible to allow the total length obtained by combining the length of the fluorescent tube and insulating body 3801 to fall within the specification of JIS C 7601, allowing attachment of the insulating body 3801 without modification of an existing fluorescent illumination devices. There is a margin of 1.3 to 1.4 mm between standard and maximum values in starter-type straight fluorescent of other sizes, rapid start type straight fluorescent tubes, and high frequency lighting type straight fluorescent tubes according to JIS C 7601. Thus, when the thickness of the insulating body 3801 is set to about 1 mm or less, the insulating body 3801 can correspond to various fluorescent tubes.

Although the hole-shaped electrode insertion portions 3802 and 3803 are used to connect the electrode terminals 3502 and 3503 in FIGS. 38 and 39, the electrode insertion portions may be formed into any shape as long as they can connect the power source lines 3804, 3805 and electrode terminals 3502, 3503 to establish electrical connection between them respectively so as to provide a power to the power acquisition unit.

Figure 40:
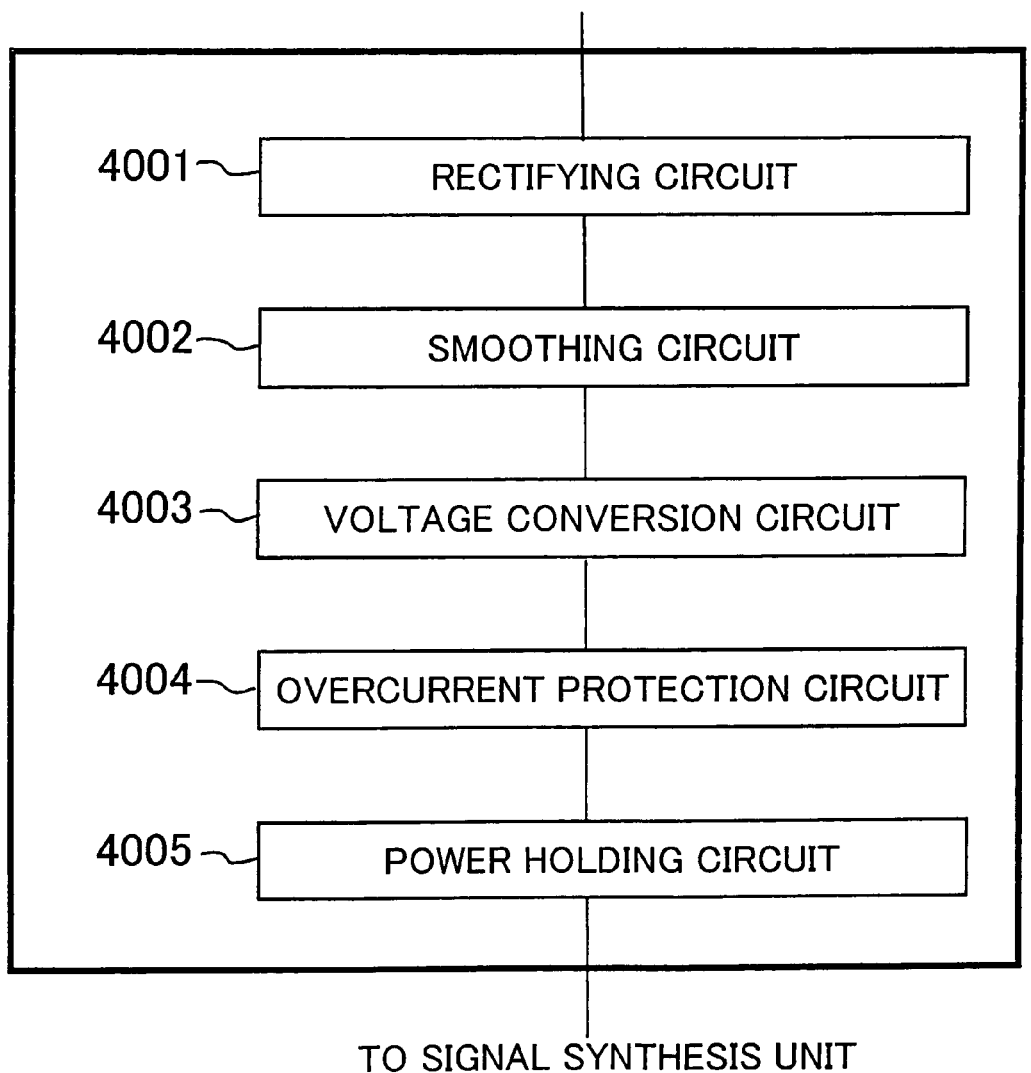
FIG. 40 is a configuration example of a power conversion unit in the first embodiment of the present invention.

FIG. 40 shows a detailed configuration example of the power conversion unit 1902 to be connected to the fluorescent tube circuit shown in FIG. 36. The residual heat power of the fluorescent tube that can be acquired using the power acquisition unit as shown in FIG. 38 is an AC power. Thus, a rectifying circuit 4001 is used to rectify the AC power into a DC power. Then, a smoothing circuit 4002 is used to smooth the rectified power waveform. After that, the power whose waveform has been smoothed is passed through a voltage conversion circuit 4003, where the power is converted into a voltage required for the transmission unit 2004 and the like. Then, the power is passed though an overcurrent protection circuit 4004 which restricts acquisition of an excess power in order to protect the stabilizer 3601 and stored in a power holding circuit 4005.

A current restricting resistor or a fuse may be used as the overcurrent protection circuit 4004. It is possible to dispose the overcurrent protection circuit 4004 not only at the position shown in FIG. 40, but also between the smoothing circuit 4002 and voltage conversion circuit 4003.

A capacitor or a secondary battery may be used as the power holding circuit 4005. The power holding circuit 4005 is a circuit for the transmission unit to store a power required for transmitting unique information while it does not perform the transmission of the unique information. Therefore, the power holding capability of the power holding circuit 4005 is determined based on a power required for transmission of the unique information and transmission interval of the unique information.

Figure 41:
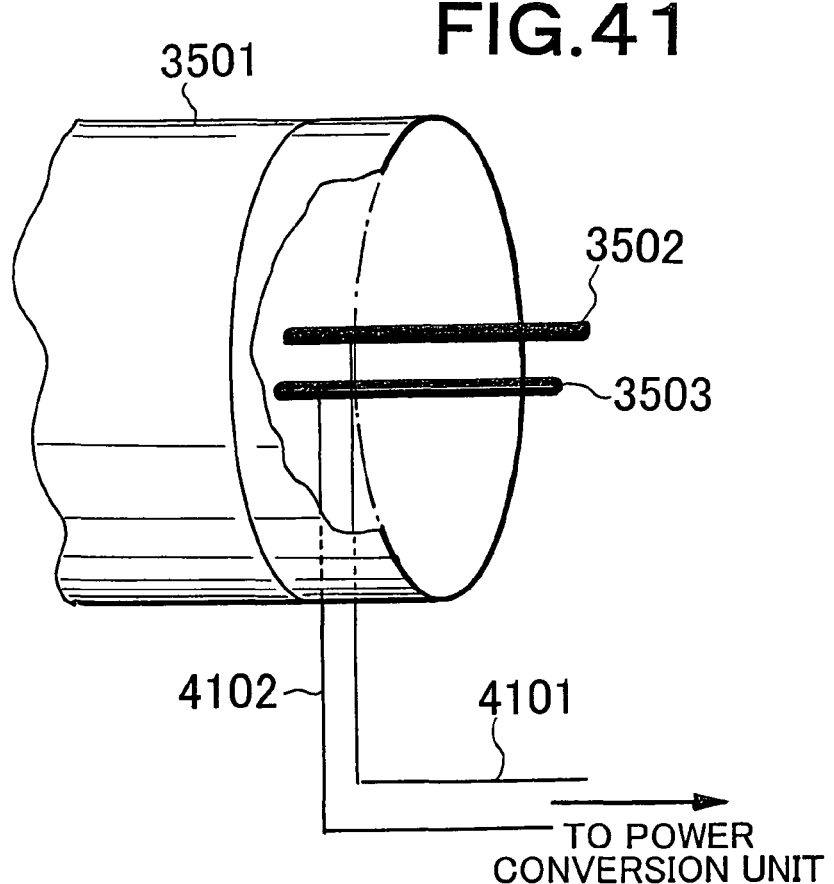
FIG. 41 is a configuration example of a straight fluorescent tube and connector in the first embodiment of the present invention.

FIG. 41 shows another configuration of the fluorescent tube 3501 and connector 3603 connected to the illumination device shown in FIG. 36. In FIG. 41, power lines 4101 and 4102 for power acquisition are connected respectively to the electrode terminals 3502 and 3503 in the interior of the straight fluorescent tube 3501.

Although the straight type fluorescent tube is used in FIGS. 35 to 41, fluorescent tubes having other shapes, such as circular tube, may allow a residual heat power to be utilized for the transmission of the unique information on the same principle as above.

Figure 3:
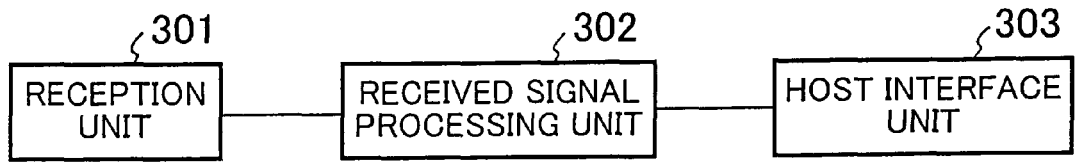
FIG. 3 is a configuration example of a light signal detection unit in the first embodiment of the present invention.

FIG. 3 shows a configuration example of the light signal detection units 104 and 108. Each of the light signal detection units 104 and 108 includes a reception unit 301 for receiving a light signal transmitted from each of the illumination devices 103 and 107, a received signal processing unit 302 for extracting unique information of the respective illumination devices from the received light signal, a host interface unit 303 for transferring the extracted unique information to the terminal, and other required functions. In the case where a radio signal is used as a transmission signal, the reception unit 301 serves as a reception unit for receiving a radio signal.

Figure 4:
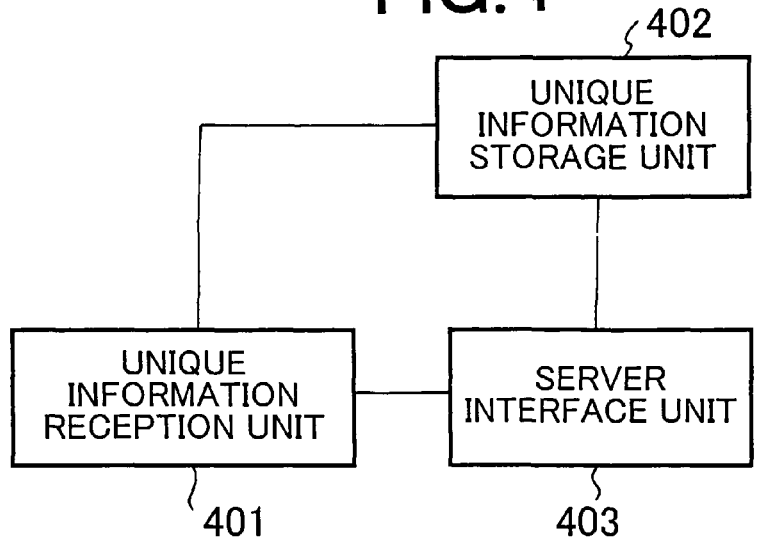
FIG. 4 is a view showing a configuration example of a terminal in the first embodiment of the present invention.

FIG. 4 shows a configuration example of the terminals 101 and 105. The terminal includes a unique information reception unit 401 for receiving the unique information notified from the light signal detection unit 104 or 108, a unique information storage unit 402 for storing the notified unique information, a server interface unit 403 for notifying the positioning server 110 of the unique information, and other required functions. FIG. 4 only shows a part of the terminal related to the present embodiment.

Figure 5:
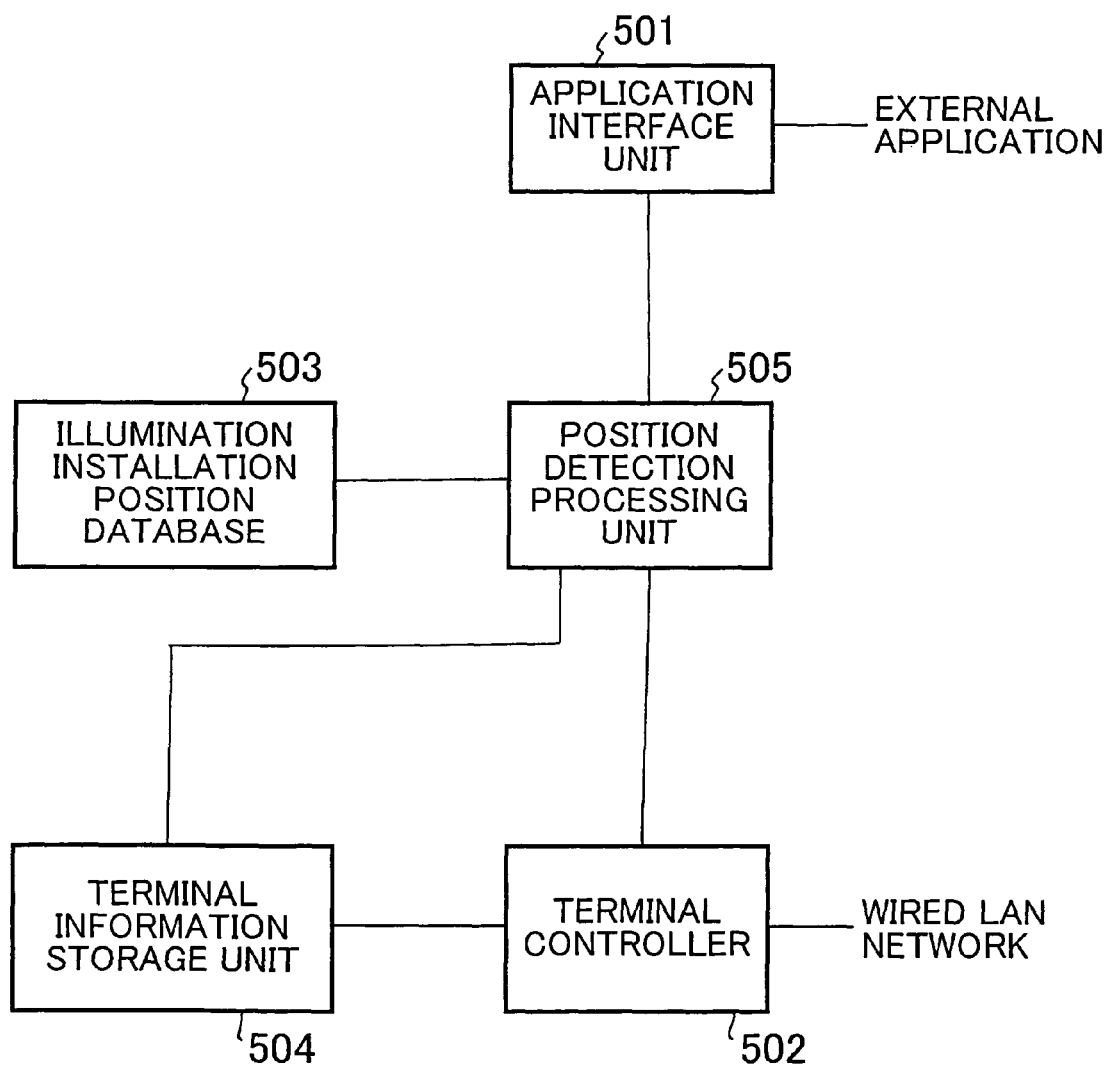
FIG. 5 is a view showing a configuration example of a positioning server in the first embodiment of the present invention.

FIG. 5 shows a configuration example of the positioning server 109. The positioning server 109 includes an application interface unit 501 for performing communication with the application server 110, a terminal controller 502 for performing communication with the terminal, an illumination installation position database 503 for storing illumination installation position information in which unique information of the respective illumination devices and installation positions thereof are associated with each other, a terminal information storage unit 504 for storing terminal information in which the terminal ID of the each terminal and unique information that each terminal has received are associated with each other; a position detection processing unit 505 for detecting the position information of the terminal based on information of the illumination installation position database 503 and terminal information storage unit 504; and other required functions.

Figure 6:
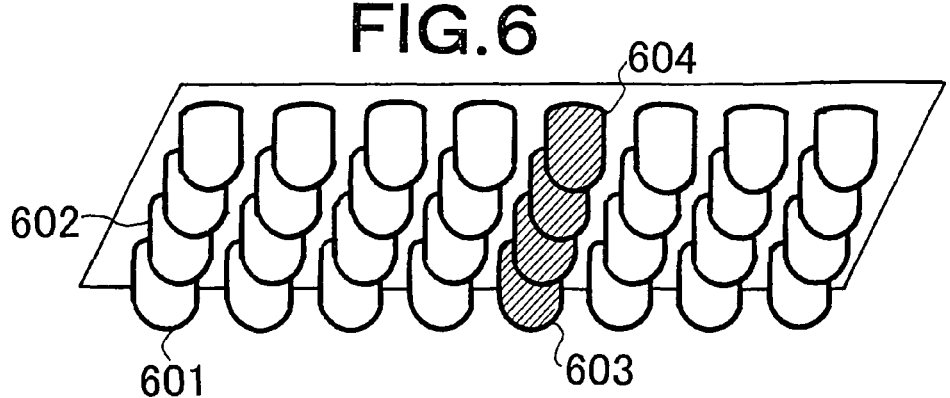
FIG. 6 is a view showing a configuration example of a transmission unit and light emission unit of the illumination device in the first embodiment of the present invention.

FIG. 6 shows a configuration example of the transmission unit 204 and light emission unit 205. In the example shown in FIG. 6, white LEDs 601, 602, and the like constituting the light emission unit 205, transmission LEDs 603, 604, and the like which constitute the transmission unit 204 and transmit a signal such as a red LED or a white LED are arranged in a plane. In the transmission unit 204 and light emission unit 205, LEDs may be arranged in a half cylinder shape or in a hemisphere. The white LEDs may be used as the transmission unit 204 and the light emission unit 205 and the transmission unit 204 may be commonly used. In this case, all LEDs shown in FIG. 6 are used both as the transmission unit and light emission unit.

FIG. 20 shows a configuration example of the illumination device shown in FIG. 19, excluding the power source unit 1901. In the example of FIG. 20, an interface of an existing fluorescent tube is used as the connection interface 1903 shown in FIG. 19.

An illumination module 2001 is attached to an existing fluorescent illumination device using connection interfaces 2002 to 2005 and receives a power using the same. The power supplied through the connection interfaces 2002 to 2005 is input to a power conversion unit 2008 where the power conversion is performed. The power conversion unit 2008 performs AC-DC conversion for the input power and supplies it to a transmission unit 2007 and light emission unit 2006. In FIG. 20, wirings for connecting the connection interfaces 2002 to 2005 and power conversion unit 2008 are omitted.

Further, in FIG. 20, the unique information storage unit 202 and signal synthesis unit 203, which are shown in FIG. 19, are omitted.

Figure 33:
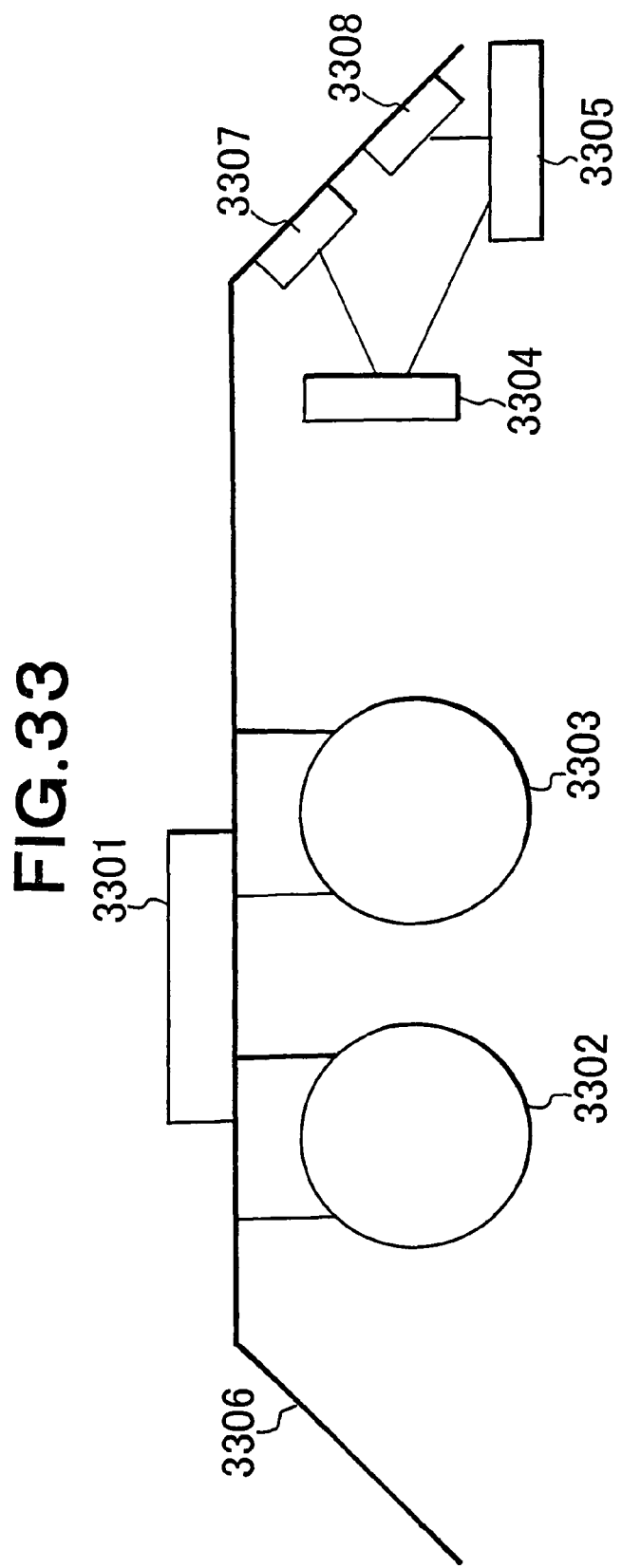
FIG. 33 is a configuration example of the illumination device in the first embodiment of the present invention.

FIG. 32 shows another example of the illumination devices 102 and 106. FIG. 33 is an example of the illumination device shown in FIG. 32 in which the power source unit is divided in two segments. In FIG. 33, the illumination device, which is installed to a ceiling or the like, is viewed from the side, and the unique information storage unit 202 and signal synthesis unit 203, which are shown in FIG. 32, are omitted.

In this example, light emission units 3302 and 3303 receive a power from a power source unit 3301 and emit light. A transmission unit 3305 transmits unique information using a power supplied from a solar battery unit 3304. The solar battery unit 3304 converts a light energy that the light emission units 3302 and 3303 into an electrical energy and supplies the electrical energy to the transmission unit 3305. The solar battery unit 3304 and transmission unit 3305 are attached to a lighting cover 3306 by means of attachment portions 3307 and 3308. In the case where the lighting cover 3306 is made of steel, magnets may be used as the attachment portions 3307 and 3308.

In the configuration shown in FIG. 33, a rechargeable battery may be incorporated in the solar battery unit 3304. In this case, an output of the rechargeable battery is used to allow the transmission unit 3305 to transmit unique information. If an electrical energy that has been converted from a light energy in the solar battery unit 3304 is insufficient for driving the transmission unit 3305 and the like, unique information is allowed to be transmitted after a sufficient electrical energy has been stored in the rechargeable battery.

Figure 7:
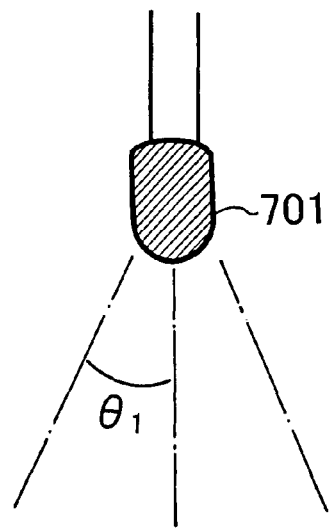
FIG. 7 is a view showing a configuration example of a transmission LED of the illumination device in the first embodiment of the present invention.

FIG. 7 shows a configuration of the transmission LED 603 and 604 shown in FIG. 6. Since the direction of light emitted from the LED is limited in general, the direction of a signal transmitted from the transmission LED is also limited. In FIG. 7, the angle at which a transmission LED 701 can transmit a signal is represented by $\theta_1$.

Figure 8:
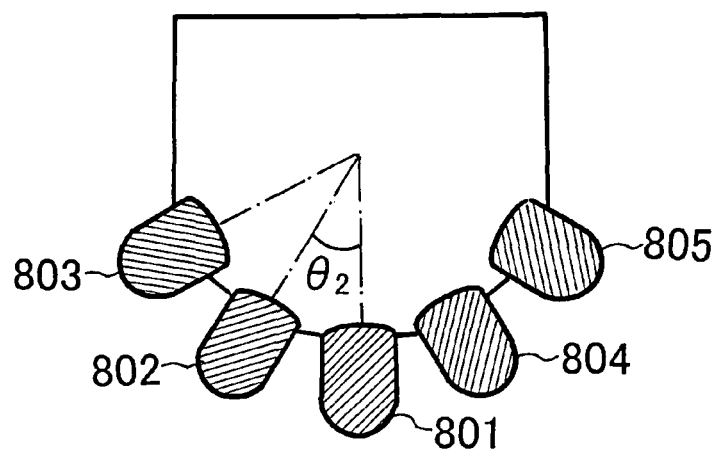
FIG. 8 is a view showing a configuration example of the transmission unit of the illumination device in the first embodiment of the present invention.

FIG. 8 shows an example in which the transmission unit 204 shown in FIG. 2 is constituted by a plurality of transmission LEDs. In the configuration example shown in FIG. 8, transmission LEDs including LEDs 801, 802, and the like are arranged at an angle of $\theta_2$ relative to one another for widening the transmission direction of a signal from the transmission unit 204. Although the $\theta_2$ is generally set to a value equal to $\theta_1$, it may be set to any value depending on usage. Although the LEDs are three-dimensionally arranged so as to control the transmission direction in FIG. 8, a configuration using a lens or LEDs having different light emission angles from the angle $\theta_1$ to control the transmission direction may be adopted.

Figure 9:
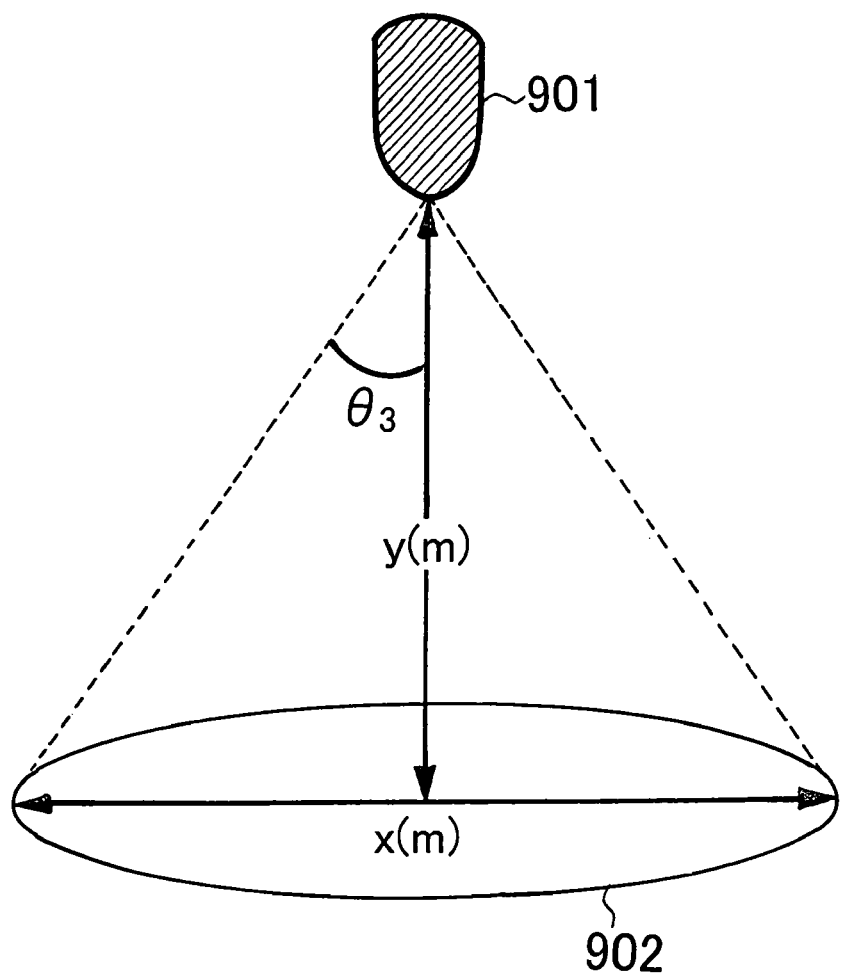
FIG. 9 is a view showing a configuration example of a transmission area of unique signal that the illumination device transmits in the first embodiment of the present invention.

FIG. 9 shows a state where a transmission unit 901 transmits unique information to a transmission area 902. In the example of FIG. 9, the diameter of the transmission area 902 is x(m) and the vertical distance from the transmission area 902 to illumination device 901 is y(m).

FIG. 13 is a table showing a configuration example of terminal information that the terminal information storage unit 504 shown in FIG. 5 stores. The terminal information associates terminal ID 1301 for uniquely identifying respective terminals with unique information 1302 of the illumination devices received by the respective terminals. In the terminal information, a plurality of unique information may be associated with one terminal ID. Further, reception time 1303 indicating the time at which the unique information 1302 is received may be stored as the terminal information. Further, in the case where reception time 1303 is stored in the configuration in which a plurality of unique information are associated with one terminal ID, reception time 1303 may be stored for each individual unique information.

FIG. 14 is a table showing a configuration example of illumination installation position information that the illumination installation position database 503 stores. The illumination installation position database 503 stores unique information 1401 that the individual illumination devices transmit and the position information of the positions at which the illumination devices are installed in association with each other. The position information includes logical information 1402 such as a name or number of the room at which the illumination device is installed, coordinate information 1403 indicating the installation position of the illumination device on a design drawing of a building or the like, area information 1404 indicating the size of the area at which the illumination device transmits a signal, and the like.

Hereinafter, the operation of the present embodiment will be described.

FIG. 10 is a time chart showing signal exchanged between devices in the present embodiment. Although a plurality of illumination devices, light signal detection units, terminals, and base stations are actually provided in this embodiment, the following description will be given using the illumination device 103, light signal detection unit 104, terminal 101, and base station 102.

The illumination device 103 notifies unique information (ID information) of each illumination device on a light signal. Instead of the light signal, a radio signal may be used for notification of the unique information. The notification of the unique information from the illumination device may be continuously repeated or periodically repeated. In this embodiment, the notification is periodically repeated (steps 1001 and 1002). In the case where the notification is periodically repeated, illumination devices perform notification at random frequencies or at frequencies unique to the respective illumination devices so as to prevent collision of the unique information issued from respective illumination devices. As the light signal carrying the unique information, an infrared light signal produced by an infrared LED or the like or a visible light signal produced by a white LED or the like may be used.

As a method of carrying the unique information on a light signal, there is available a method using a frame format compliant with IrDA (InfraRed Data Association) standard which defines the specification for existing infrared radio communication. More specifically, a use of a frame format compliant with IrDA ULTRA protocol which is defined for one-directional communication in IrDA standard allows the unique information to be carried on a light signal as transmission data.

After receiving a light signal periodically notified from the illumination device 103 and extracting unique information from the light signal, the light signal detection unit 104 or 106 transfers the extracted unique information to the terminal 101 (steps 1003 and 1004). In the case of receiving light signals from a plurality of illumination devices and extracting a plurality of unique information, the light signal detection unit 104 may transfer the plurality of unique information to the terminal 101. In this case, a received light intensity measurement unit is provided in the light signal detection unit 104, and the light signal detection unit 104 transfers received light intensity information from the respective illumination devices together with the unique information. In this case, the light signal detection unit 104 may transfer only the unique information of the illumination device whose light receiving intensity is highest. Further, the notification of the unique information from the light signal detection unit 104 to terminal 101 may be performed periodically, based on a request from the terminal, or every time the light signal detection unit 104 detects the unique information notified from the illumination device 103.

In the case where the unique information is transmitted on a frame format compliant with IrDA ULTRA protocol, the light signal detection unit 104 extracts the transmitted unique information from the received frame format in steps 1003 and 1004 and transfers the extracted unique information to the terminal 101.

The terminal 101 that has acquired the unique information notified from the illumination device 103 stores the acquired unique information therein (steps 1005 and 1006). When the application server 110 requires the positioning server 109 to transmit the position information of a specified terminal (terminal 101, in this example) (step 1007), the positioning server 109 transmits an inquiry about unique information to the terminal 101 through the base station 102 (steps 1008 and 1009).

The terminal 101 that has received the inquiry searches for the unique information of the illumination device stored in association with the identification information and returns the unique information to the positioning server 109 through the base station 102 as a reply (steps 1010 and 1011).

The positioning server 109 that has received the unique information from the terminal 101 as a reply converts the notified unique information into position information such as a number of the room at which the illumination device 103 is installed (step 1012). Then the positioning server 109 transmits the position information to the application server 110 as a reply (step 1013).

As the position information to be transmitted to the application server 110, coordinate information indicating the position inside a building at which the illumination device 103 is installed may be transmitted, or the unique information of the illumination device 103 may be transmitted directly. Although the notification of the position information to the application server 110 is performed based on a request from the application server 110 in the above example, it may be performed periodically or at the timing when the unique information of the illumination device 103 that the terminal has already received is changed.

Figure 72:
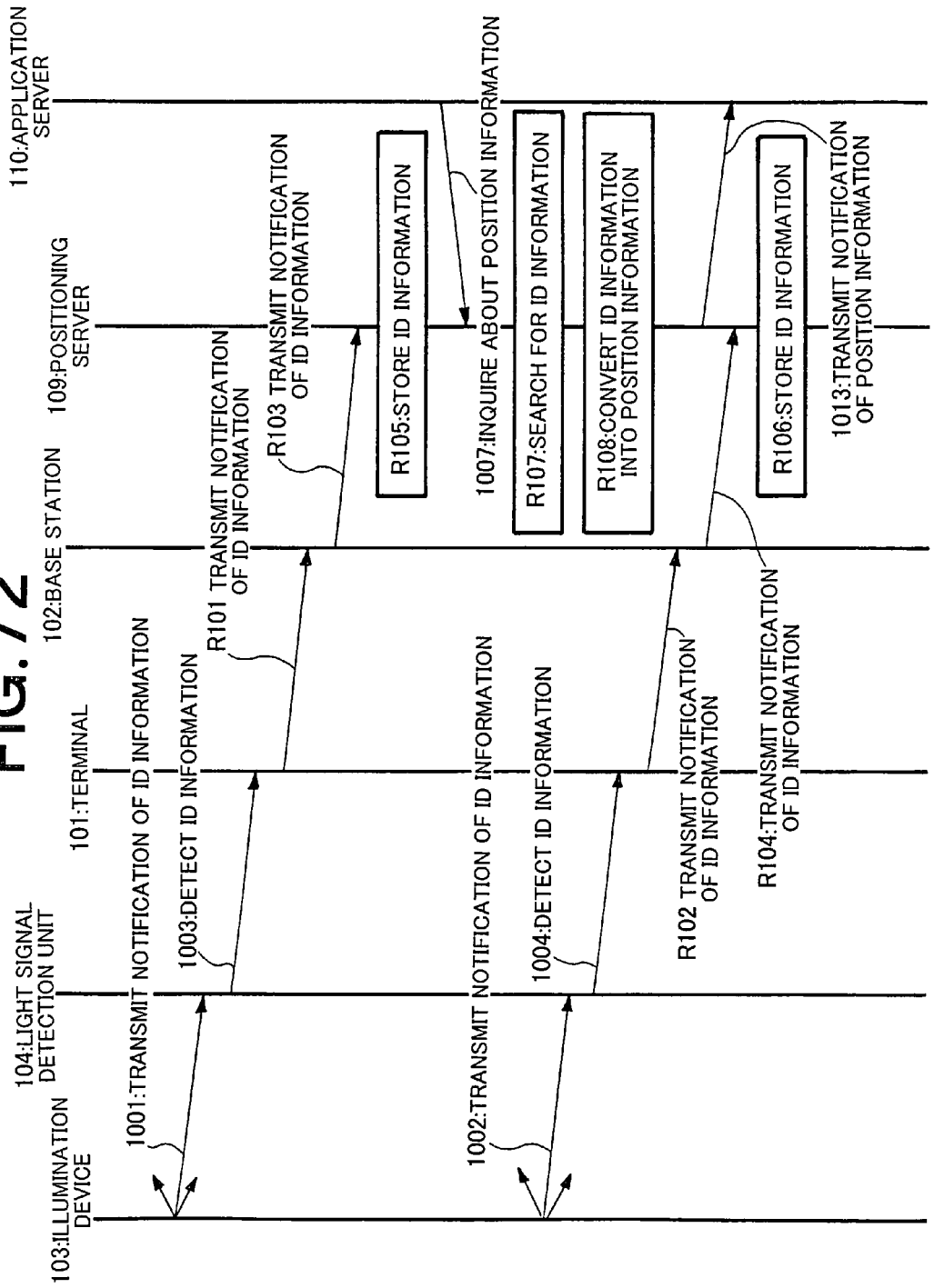
FIG. 72 is another example of a time chart showing signal exchanges between devices in the first embodiment of the present invention.

FIG. 72 is another example of a time chart showing signal exchanges between devices in the present embodiment. Although a plurality of illumination devices, light signal detection units, terminals, and base stations are actually provided in this embodiment, the following description will be given using the illumination device 103, light signal detection unit 104, terminal 101, and base station 102.

In FIG. 72, the process (steps 1001, 1002, 1003, and 1004) in which the light signal detection unit 104 detects the unique information (ID information) notified from the illumination device 103 and notifies the terminal 101 of the detected unique information is the same as the corresponding part of the operation example shown in FIG. 10.

The terminal 101 that has received the unique information notified from the illumination device 103 transmits the acquired unique information to the positioning server 109 through the base station 102 (steps R101, R102, R103, and R104). A wireless LAN and the like may be used for communication between the terminal 101 and base station 102. The notification of the unique information from the terminal 101 to the positioning server 109 may be performed periodically or based on a request from the positioning server 109. The positioning server 109 stores the unique information notified from respective terminals together with the identification information of respective terminals (steps R105 and R106). Examples of the identification information of respective terminals include an IP (Internet Protocol) address, MAC (Media Access Control) address, and a name of a user who uses the terminal.

Upon receiving a request for the position information of a specified terminal from the application server 110 (step 1007), the positioning server 109 searches for the unique information of the illumination device stored in association with the identification information of the required terminal (step R107) and converts the found unique information into position information such as a number of a room at which the illumination device is installed (step R108).

Then, the positioning server 109 transmits the position information to the application server 110 as a replay (step 1013). As the position information to be transmitted to the application server 110, coordinate information indicating the position inside a building at which the illumination device is installed may be transmitted, or the unique information of the illumination device may be transmitted without modification. Although the notification of the position information to the application server 110 is performed based on a request from the application server 110 in the above example, it may be performed periodically or at the timing when the unique information of the illumination device 103 that the terminal has already received is changed.

Figure 11:
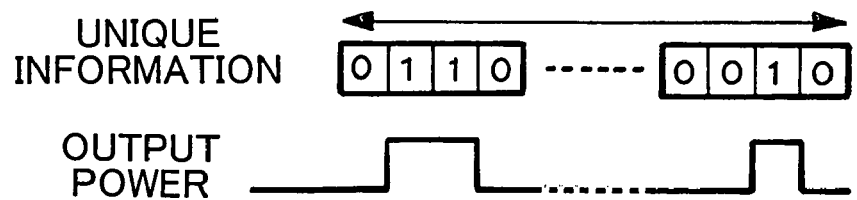
FIG. 11 is a view showing an example of output power control that a signal synthesis unit performs based on unique information in the first embodiment of the present invention.

Next, the operation of the illumination devices 103 or 107 will be described using FIGS. 1, 2, and 11.

The LED, which receives a power supply from the power source unit 201 and functions as the light emission unit 205, emits a visible light as an illumination light. Unique information output from the unique information storage unit 202 is added to a power to be supplied to the LED used as the transmission unit 204 by the signal synthesis unit 203.

As a method of synthesizing the unique information with a power to be supplied to the LED, any method can be used in the present embodiment. For example, there is available a method of controlling ON/OFF of a power to be supplied to the transmission unit 204 based on the unique information which is represented as binary data of 0 and 1 as shown in FIG. 11. Further, as for the synthesis timing of the unique information, any method can be used in the present embodiment including a method of performing synthesis periodically or at random timings. In order to facilitate the detection of the unique information on the receiving side, preamble information including a specified pattern of 0 and 1 may be added to the beginning of the unique information.

The transmission unit 204 uses a power that the signal synthesis unit 203 outputs to transmit a signal. In the case where the signal synthesis unit 203 is performing the ON/OFF control, the transmission unit 204 repeats blinking to perform notification of the unique information.

Next, the operation of the light signal detection units 104 or 108 will be described using FIGS. 1 and 3.

The reception unit 301 receives a light signal from the illumination device 103 and the like, converts the light signal into an electrical signal, and outputs the electrical signal corresponding to the intensity of the received light to the received signal processing unit 302.

Subsequently, the received signal processing unit 302 extracts the unique information of the illumination device 103 and the like from the input electrical signal and outputs it to the host interface unit 303. Examples of the extraction method of the unique information include a method of detecting the preamble information added by the illumination device side and extracting the unique information following the preamble information, and the like.

Subsequently, the host interface unit 303 outputs the extracted unique information to the terminal. The unique information may be output every time the host interface unit 303 extracts the unique information or based on a request from the terminal. In the present embodiment, the unique information may be output using either method.

Next, the operation of the terminals 101 or 105 will be described using FIGS. 1 and 4.

The unique information reception unit 401 receives the unique information transmitted from the light signal detection unit 104 and transmits it to the unique information storage unit 402. Further, the unique information reception unit 401 receives a request from the server interface unit 403 and, correspondingly, transmits a request for the light signal detection unit 104 to transmit the unique information.

Subsequently, the unique information storage unit 402 stores the unique information transmitted from the unique information reception unit 401 and outputs the unique information to the server interface unit 403 in response to a request from the server interface unit 403.

Next, the operation of the positioning server 109 will be described using FIGS. 1, 5, and 12.

The application interface unit 501 of the positioning server 109 receives a request for the position of the terminal which is issued from an application of the application server 110 and the like (Yes in step 1201) and, correspondingly, requires the position detection processing unit 505 to transmit the position information of the terminal.

Subsequently, the position detection processing unit 505 performs search processing to determine whether the terminal information storage unit 504 stores the unique information of the illumination device that has been received by the terminal whose position is requested (step 1202).

If it is determined that the unique information has not been found, (No in step 1203), the position detection processing unit 505 transmits a unique information request message to the terminal through the terminal controller 502 (step 1204). Although a method of performing a search to determine whether the terminal information storage unit 504 stores the unique information is shown in the flowchart of FIG. 12, the search processing in step 1202 may be omitted. In this case, when receiving the terminal position request from the application, the position detection processing unit 505 inevitably proceeds to step 1204 where it transmits the unique information request message to the terminal.

Subsequently, the terminal controller 502 that has received the unique information from the terminal notifies the position detection processing unit 505 of the unique information as well as writes the unique information in the terminal information storage unit 504. At this time, reception time of the unique information may be written in the terminal information storage unit 504.

Subsequently, the position detection processing unit 505 that has received the unique information from the terminal (YES in step 1205) uses the received unique information to search the illumination installation position database 503 for illumination installation position information (step 1206). If it is determined that the terminal information storage unit 504 stores the unique information that has previously received from the terminal and its reception time falls within a predetermined time measured from the current time (step 1203) as a result of the search processing of searching the unique information of the terminal whose position is requested from the terminal information storage unit 504 in step 1202, the position detection processing unit 505 may skip the unique information request process for the terminal (steps 1204 and 1205) and proceed to step 1206, where it uses the unique information stored in the terminal information storage unit 504 to search the illumination installation position database 503.

If it is determined that the terminal information storage unit 504 stores a plurality of unique information as a result of the search processing in step 1202, the position detection processing unit 505 may use respective unique information to search the illumination installation position database 503 or may use only unique information with the latest reception time to perform the search processing.

If it is determined that the illumination installation position information corresponding to the unique information could be acquired as a result of the search processing in step 1206 (YES in step 1207), the position detection processing unit 505 transmits the illumination position information acquired form the illumination installation position database 503 to the application through the application interface unit 501 as a replay (step 1208).

On the other hand, if it is determined that the unique information from the terminal could not be received in step 1205 (No in step 1205) or that illumination installation position information corresponding to the unique information could not be acquired as a result of search processing for the illumination installation position database 503 in step 1206 (No in step 1207), the position detection processing unit 505 transmits an error notification to the application as a replay through the application interface unit 501 (step 1209).

Next, extraction operation of the unique information performed in the case where the terminal information (FIG. 13) in the terminal information storage unit 504 stores a plurality of unique information corresponding to the terminal ID of a requested terminal when the unique information that the terminal has received is searched for in step R107 shown in the operation example of FIG. 72 will be described. FIG. 73 shows an example of the terminal information that the terminal information storage unit 504 stores in this case. In FIG. 73, the terminal information storage unit 504 stores three unique information of a terminal having terminal ID1 together with reception time corresponding to respective unique information.

In the case where the position detection processing unit 505 uses only unique information with the latest reception time to perform the search processing in step R107, illumination ID03 is extracted as unique information of the terminal having terminal ID1.

Further, as another example of the search processing of unique information in step R107, the unique information that has been received most often in the past predetermined time period may be extracted. Assuming that reception times corresponding to the three unique information that the terminal having terminal ID1 has received fall within the predetermined time period in the example of FIG. 73, illumination ID10 has been received twice while illumination ID03 has received only once. Therefore, in this case, illumination ID10 is extracted as a search result.

Further, there is another method that adds a weighting value to each received unique information such that the weighted value of newer unique information becomes greater and extracts the unique information having the greatest weighted value as a search result.

Further, there is still another method in which all the unique information that the terminal information storage unit stores are extracted together with the reception frequencies or weighted values corresponding to respective unique information and the reception frequencies or weighted values are used to obtain the position of the terminal in the position information conversion process (step R108). For example, in the case where two unique information have been extracted, they are converted into information indicating a position near the center of the installation positions of two illumination devices.

The above extraction process of the unique information is not only performed in step R107 of FIG. 72 but also performed in the case where the terminal 101 searches for the stored ID information upon receiving an ID information inquiry from the positioning server in step 1009 of FIG. 10.

Next, a method of controlling the transmission area of the unique information from the transmission unit 204 and the like will be described using FIGS. 1 and 7 to 9.

Assuming that the diameter of the transmission area 902 is x(m) and vertical distance between the transmission area 902 and transmission unit 901 is y(m) as shown in FIG. 9, the transmission unit 901 needs to transmit a signal at an angle of $\theta_3$ in order for the transmission signal to cover the entire transmission area 902. Assuming that the transmission angle of the LED 701 is $\theta_1$ as shown in FIG. 7 and attachment angle (difference in transmission direction) between the LEDs 801 and 802 of the transmission unit 901 is $\theta_2$ as shown in FIG. 8, the transmission angle $\theta_3$ of the transmission unit 901 can be represented by $\theta_2 \times n$ (n=the number of LEDs−1)+$\theta_1$. In the case the transmission unit 901 has the LED 801 facing directly downward and other two LEDs on both sides of the LED 801 as shown in FIG. 8, the transmission angle $\theta_3$ can be represented by $\theta_2 \times 2 + \theta_1$ at maximum (n=2).

In the case of using the LED 801 facing directly downward for signal transmission, the transmission angle is $\theta_1$. In the case of using the LED 801 and LEDs 802, 804 on both sides of the LED 801, the transmission angle $\theta_3$ is represented by $\theta_2 + \theta_1$. Although the required transmission angle $\theta_3$ is changed depending on the size (x) of the transmission area and attachment level (y) of the transmission unit 901, the above change of the number of LEDs to be used for signal transmission allows the transmission angle $\theta_3$ to be controlled. There is also available a method that uses LEDs having different transmission angles $\theta_1$ or uses a lens or mirror to control the transmission angle $\theta_3$.

Another method of controlling the transmission area of the unique information from the transmission unit 204 and the like will be described using FIGS. 62 to 65.

Figure 62:
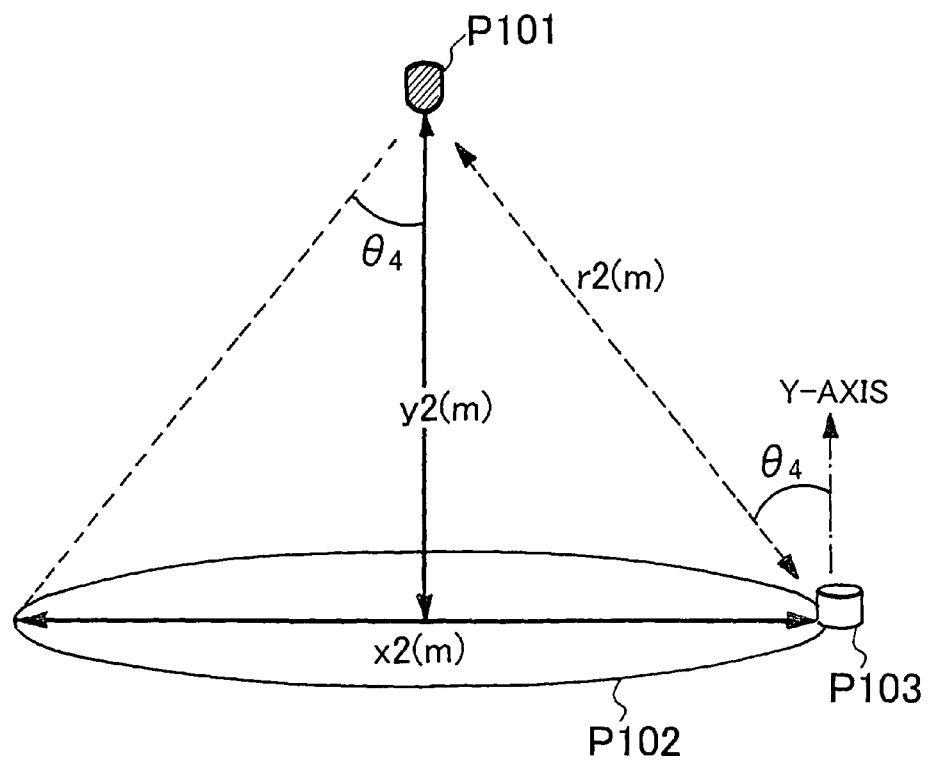
FIG. 62 is a view showing the transmission area of the unique information from the transmission unit in the case where another method of controlling the transmission area is used in the first embodiment of the present invention.

As shown in FIG. 62, it is assumed that the diameter of a transmission area P102 is x2(m) and vertical distance between the transmission area P102 and a transmission unit P101 is y2(m). Further, it is assumed that the angle at which the transmission unit P101 is viewed from the periphery of the transmission area P102 is $\theta_4$. $\theta_4$ can be obtained from x2 and y2. Assuming that the distance between a reception unit P103 located at the periphery of the transmission area P102 and transmission unit P101 is r2(m), r2 can also be obtained from x2 and y2.

Figure 63:
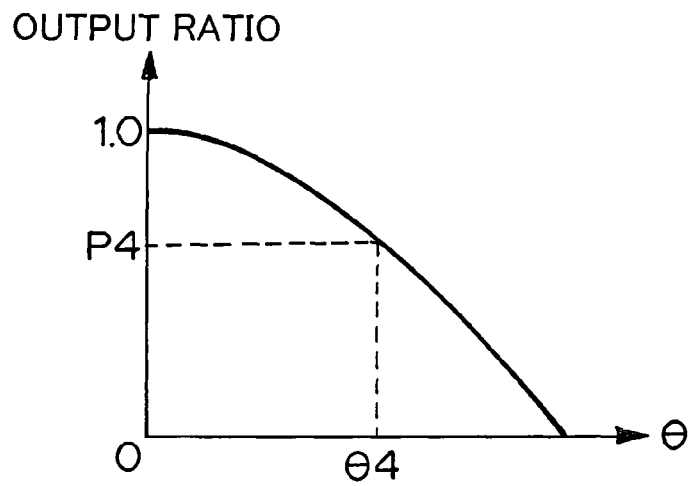
FIG. 63 is a graph showing output characteristics with respect to the angular direction of the LED in the case where another method of controlling the transmission area of the unique information from the transmission unit is used in the first embodiment of the present invention.
Figure 64:
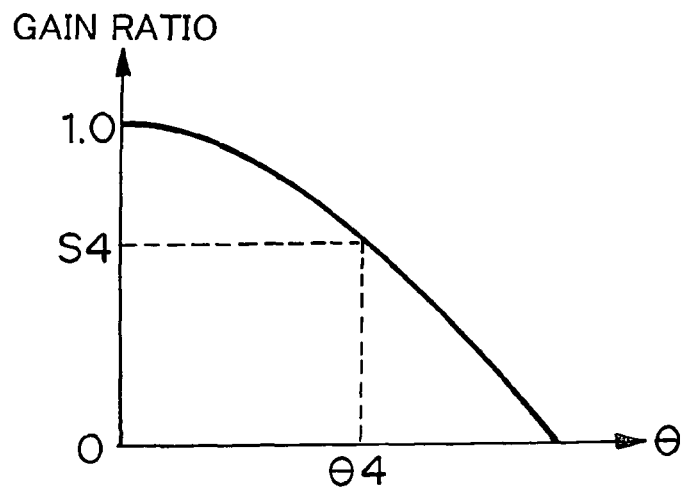
FIG. 64 is a graph showing gain characteristics with respect to the angular direction of the reception unit in the case where another method of controlling the transmission area of the unique information from the transmission unit is used in the first embodiment of the present invention.

FIG. 63 is a graph showing output characteristics with respect to the angular direction of the LED. In general, an LED exhibits the highest output power in the front direction ($\theta$=0). The output power is decreased as the angle with respect to the front direction increases. FIG. 63 shows an output ratio with respect to the angular direction. In this graph, output power in the front direction is set to 1. With regard to the characteristics of an LED, the angle at which the output power is reduced by half is defined as a half-value angle, in general. FIG. 64 is a graph showing gain characteristics with respect to the angular direction of the reception unit. In general, the reception unit obtains the highest gain in the front direction. The gain is decreased as the angle with respect to the front direction increases. FIG. 64 shows a gain ratio with respect to the angular direction. In this graph, gain in the front direction is set to 1.

It is assumed in FIG. 62 that the reception unit P103 located at the periphery of the transmission area P102 is disposed such that the front thereof faces perpendicular (in y-axis direction) to the transmission area. Assuming that the required reception power for the reception unit P103 to normally receive the unique information transmitted from the transmission unit P101 is Prx, output power Ptx in the front direction that is required for the transmission unit P101 is represented by the following equation:

$$Ptx = Prx/(P4 \times L(r2) \times S4) \quad \text{(Equation 1)}$$

P4 is the output ratio of the LED obtained at angle $\theta_4$ shown in FIG. 63. S4 is the gain ratio of the reception unit obtained at angle $\theta_4$ shown in FIG. 64. L(r2) is the attenuation dependent on the distance between the transmission unit P101 and reception unit P103. Since $\theta_4$ and r2 can be obtained from x2 and y2 as described above, the transmitter output Ptx for achieving the transmission area shown in FIG. 62 can be determined as the required reception power Prx of the reception unit, size of the transmission area x2, distance y2 between the transmission area and transmission unit P101, output ratio characteristics of the transmission unit shown in FIG. 63, gain characteristics of the reception unit shown in FIG. 64, and the like. After the value of Ptx has been obtained, the number n2 of LEDs to be used as the transmission unit P101 and output power Ptx1 per one LED can be determined by the following equation:

$$Ptx = Ptx1 \times n2 \quad \text{(Equation 2)}$$

In the case where the reception unit P103 is disposed such that the front thereof faces the transmission unit P101, the gain of the reception unit can be assumed to 1, so that Ptx can be obtained by assigning 1 to S4 in equation 1.

Figure 65:
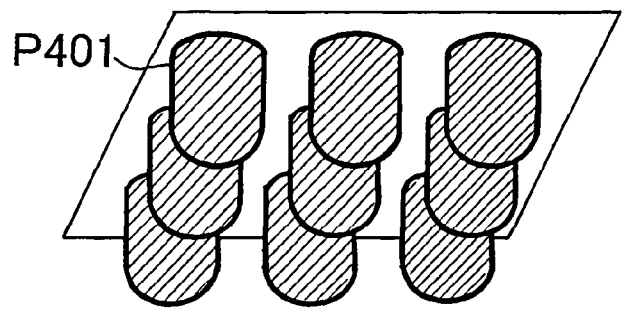
FIG. 65 is a view for explaining a configuration example of the transmission unit in the case where another method of controlling the transmission area of the unique information from the transmission unit is used in the first embodiment of the present invention.

FIG. 65 is a configuration example of the transmission unit P101. In the configuration example of FIG. 65, the transmission unit P101 includes nine LEDs (P401, etc). Unlike the example shown in FIG. 8, all LEDs are not tilted but face the same direction. This configuration facilitates the manufacturing of the transmission unit P101.

Next, an operation mode of the entire system (FIG. 1) according to the first embodiment will be described.

As an example of the operation mode to which the present system is applied, it can be assumed that a plurality of the illumination devices 103 and 107 are provided in, e.g., each meeting room in an office building. The emission color of the illumination devices 103 and 107 may be differentiated from that of other illumination devices commonly used. By adopting a different color for the illumination devices 103 and 107, it is possible to explicitly inform a user of the installation position of the illumination device having a signal transmission function, allowing the user to know a location where he or she can receive a service using the position information of the terminal. Further, the use of a different color allows the user to visually grasp the area within which he or she can acquire the position information, so that it is possible for the user to easily know to which area he or she should move the terminal in order to acquire the position information. A different emission color may be used for each service provider providing a service using the position information of the terminal, or may be used for each service type.

A creation method of the illumination installation position database 503 shown in FIGS. 5 and 14 will be described.

The simplest method of collecting the unique information that the illumination device transmits and information corresponding to the installation position of the illumination device is as follows: storing unique information for uniquely identifying the illumination device in the illumination device or the transmission unit attached to the illumination device; reading out the stored unique information at or after the installation time of the illumination device; and relating the unique information to the installation position of the illumination device that transmits the relevant unique information. Further, another method of creating the illumination installation position database 503 may be employed in which the installation location of the illumination device is investigated using a terminal provided with the light signal detection unit after the installation of the illumination device and a correspondence between the unique information that the terminal has received and location that has been investigated is stored.

First Modification

The power conversion unit 1902 in the above embodiment is configured in consideration of protection against short-circuit, which may occur in the signal synthesis unit 203, unique information storage unit 202, transmission unit 204, and power conversion unit 1902 itself due to some reason. However, protection against disconnection between the power conversion unit 1902 and signal synthesis unit 203, which may occur due to some reason, is unconsidered. In particular, in the case where the power conversion unit 1902 and signal synthesis unit 203 are provided respectively as an individual component and they are connected by a cable or the like, there is a possibility that the power conversion unit 1902 and signal synthesis unit 203 may be disconnected due to a cable break or connector disengagement. If someone erroneously touches the broken cable or disengaged connector, he or she may get an electrical shock.

Figure 59:
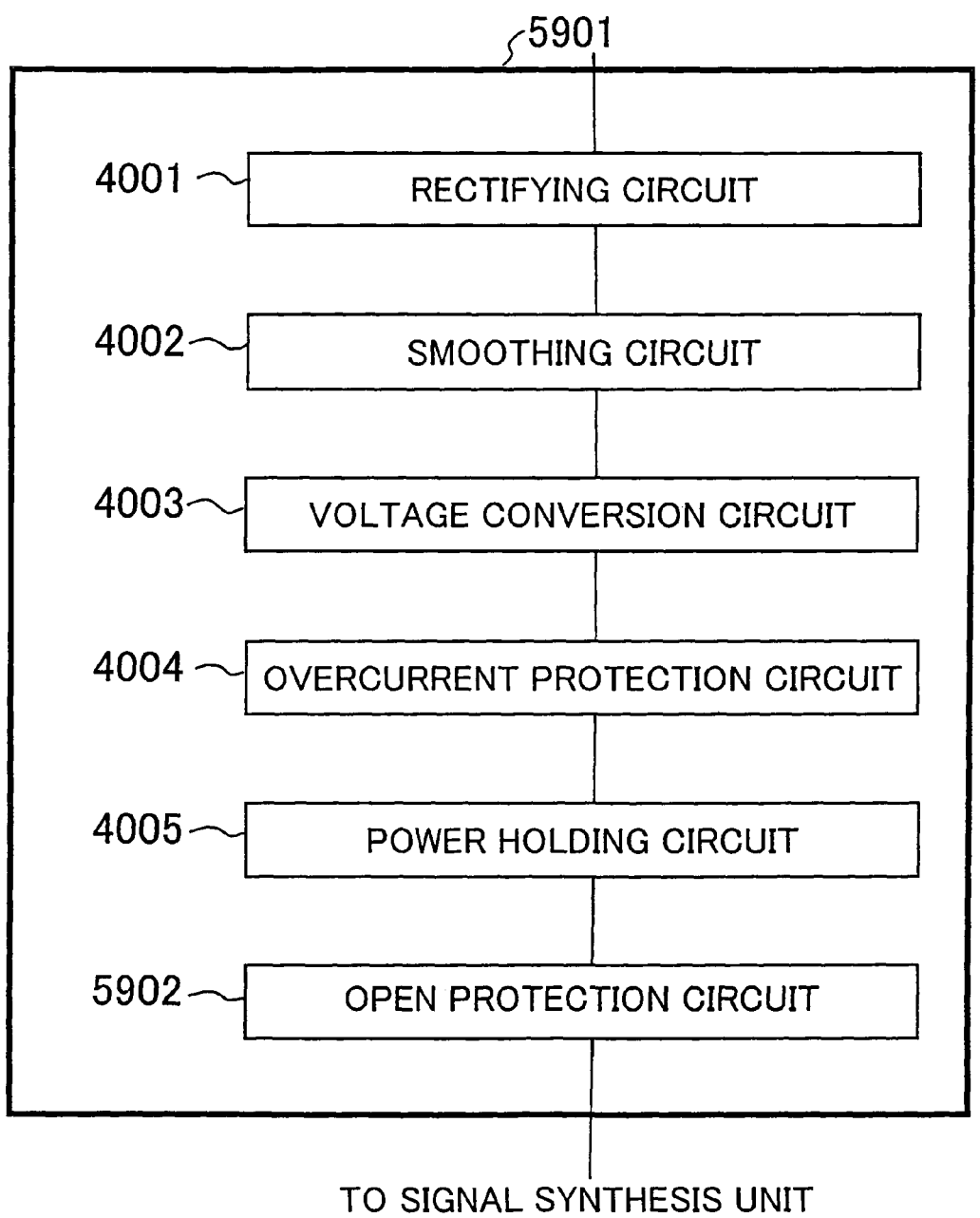
FIG. 59 is a view showing a configuration of a power conversion unit in a first modification of the first embodiment.

FIG. 59 is a view showing a configuration of a power conversion unit 5901 according to the first modification.

The power conversion unit 5901 includes the rectifying circuit 4001, smoothing circuit 4002, voltage conversion circuit 4003, overcurrent protection circuit 4004, power holding circuit 4005, and an open protection circuit 5902. The components other than the open protection circuit 5902 are the same as those in the above first embodiment, and the descriptions thereof are omitted here.

The open protection circuit 5902 detects whether the power conversion unit 5901 and signal synthesis unit 203 are disconnected from each other (i.e., whether open state is formed between them). If detecting an open state, the open protection circuit 5902 releases a connection between itself and power holding circuit.

Figure 60:
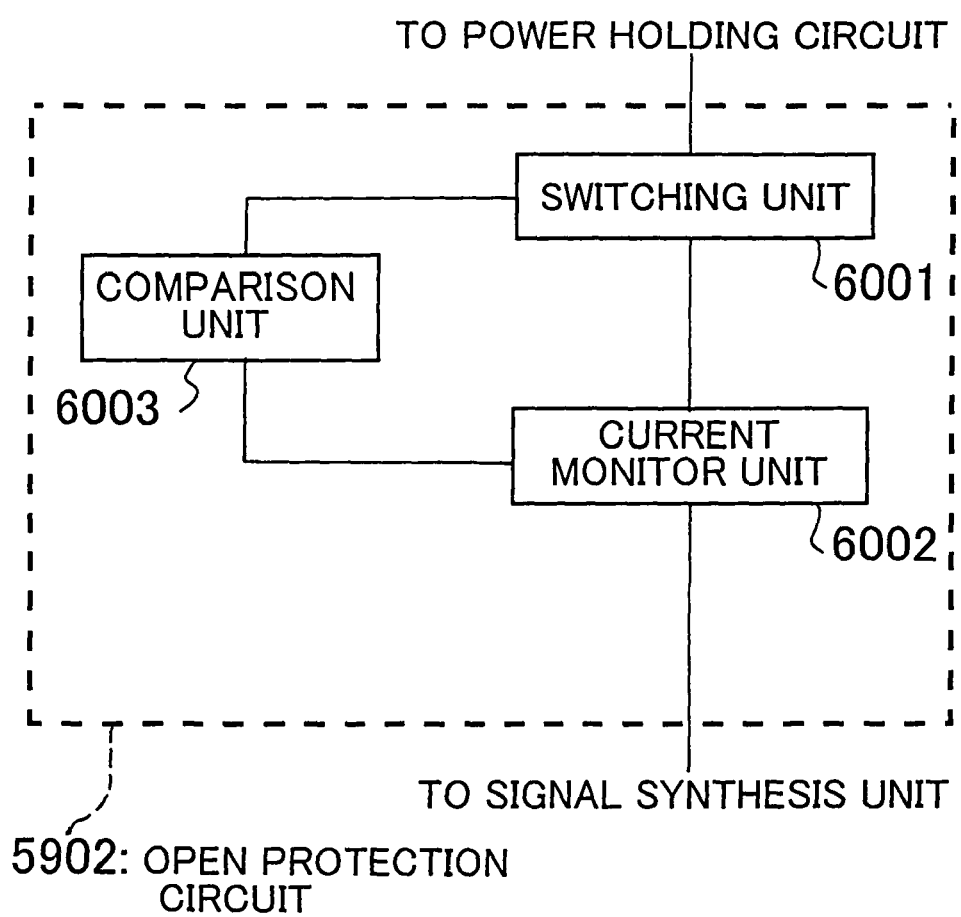
FIG. 60 is a view showing a configuration of an open protection circuit in the first modification of the first embodiment.

FIG. 60 is a view schematically showing a configuration of the open protection circuit 5902.

The open protection circuit 5902 includes a switching unit 6001, a current monitor unit 6002, and a comparison unit 6003. The current monitor unit 6002 measures the value of a current flowing through the circuit and notifies the comparison unit 6003 of a result of the measurement. The comparison unit 6003 compares the current value notified by the current monitor unit and a previously determined threshold value. If the notified current value is less than the threshold value, the comparison unit 6003 instructs the switching unit 6001 to disconnect an electrical connection between the open protection circuit 5902 and power holding circuit 4005. If the notified current value is less than the threshold value, the comparison unit 6003 instructs the switching unit 6001 to establish an electrical connection between the open protection circuit 5902 and power holding circuit 4005. As described above, the switching unit disconnects or establishes an electrical connection between the open protection circuit and power holding circuit depending on an instruction from the comparison unit 6003.

Second Modification

There is a simple method that prevents the electrical shock in the case where the power conversion unit 1902 and signal synthesis unit 203 are connected to each other by a cable. This method does not use the abovementioned open protection circuit 5902 but uses an insulating body to cover a cable connection part in the signal synthesis unit 203.

Figure 61:
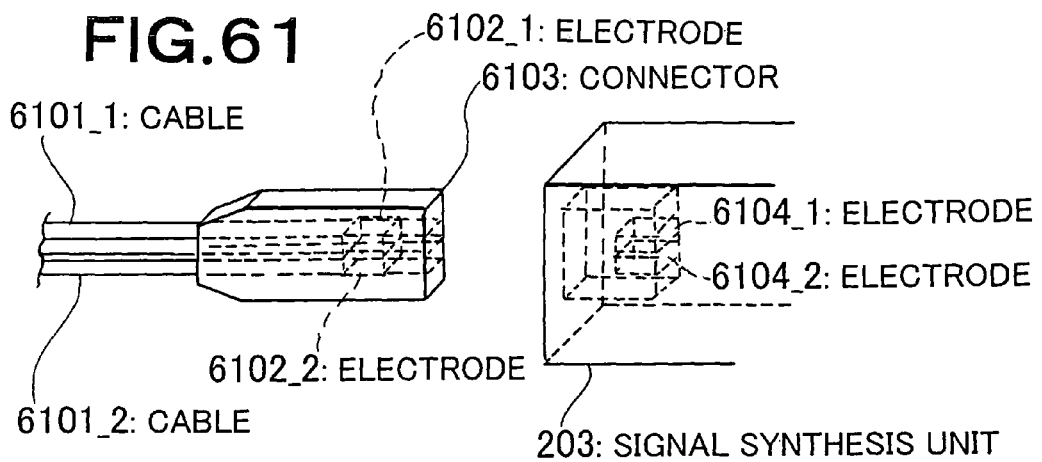
FIG. 61 is a view for explaining a connector used in the case where the power conversion unit and signal synthesis unit are connected to each other by a cable in a second modification of the first embodiment.

FIG. 61 is a view for explaining a connector used in the present modification.

Cables 6101_1 and 6101_2 are covered with an insulting body. One ends of the cables 6101_1 and 6101_2 are connected to a connector 6103, and the other ends thereof are connected to the power conversion unit 1902. The connector 6103 is also formed of an insulating body and incorporates electrodes 6102_1 and 6102_2. Although a hole extends from the electrodes toward the outside of the connectors, it is not easy to touch this hole portion from the outside.

The connector 6103 can be inserted into the cable connection part of the signal synthesis unit 203. Electrodes 6104_1 and 6104_2 are incorporated in the cable connection part. When the connector 6103 is inserted into the cable connection part of the signal synthesis unit 203, the electrodes 6102_1, 6102_2 and electrodes 6104_1, 6104_2 are connected to each other, establishing an electrical connection between the power conversion unit 1902 and signal synthesis unit 203.

Further, the above first modification and present modification may be used together.

Second Embodiment

As an embodiment different from the above first embodiment, a configuration that allows a positioning system using a wireless LAN and positioning system using an illumination device to work together in a switchable manner will be described as a second embodiment. In this embodiment, the same reference numerals as the first embodiment are given to the components which are common to the first embodiment, and the overlapped description is omitted. Since the second embodiment is basically the same as the first embodiment, the description will be given focusing on the differences from the first embodiment. The second embodiment differs from the first embodiment in the internal configuration of the positioning server 109 shown in FIG. 1.

Figure 15:
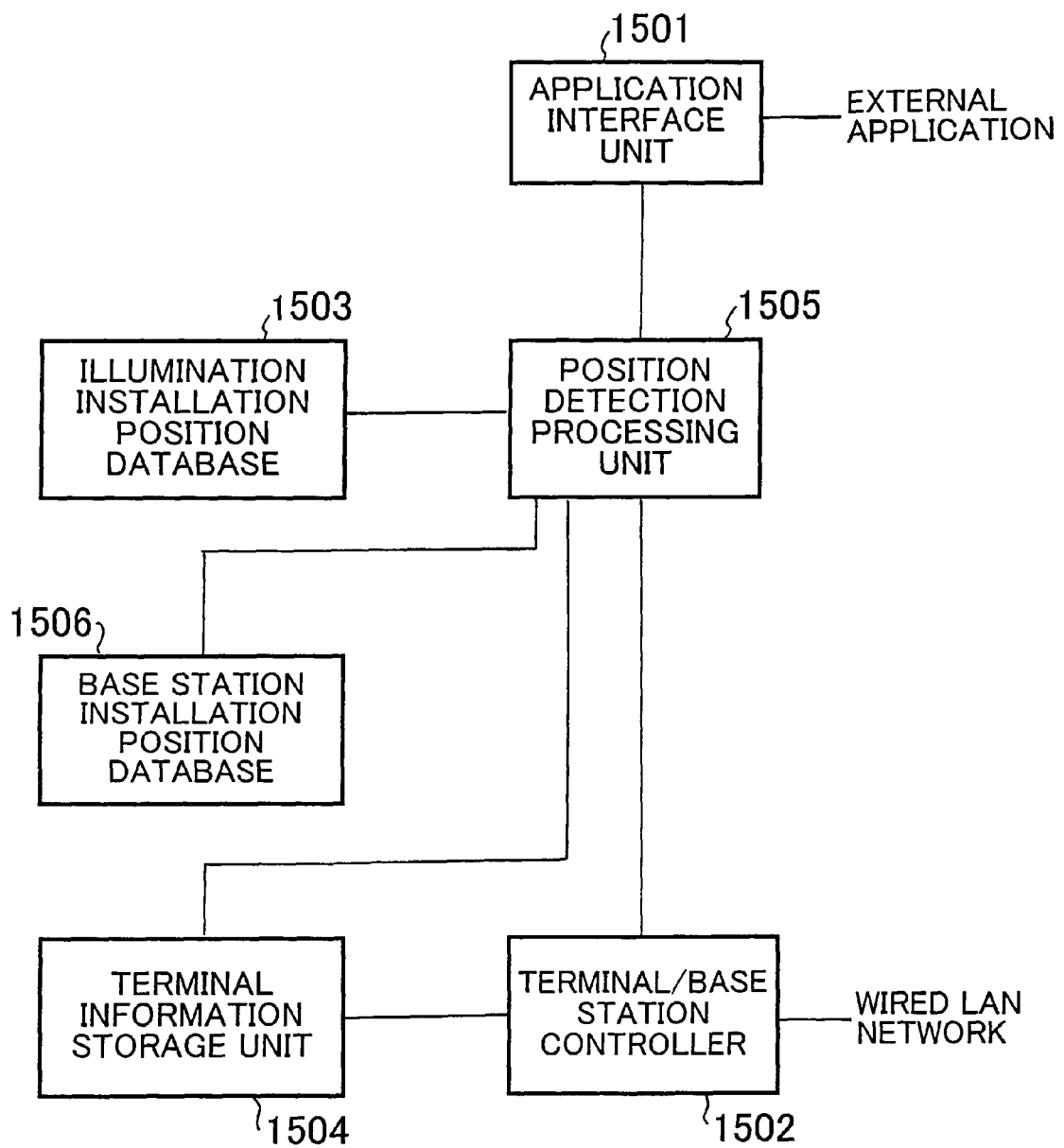
FIG. 15 is a view showing another configuration example of the positioning server in a second embodiment of the present invention.

FIG. 15 shows a configuration example of the positioning server 109 used in the case where a positioning system using a wireless LAN and positioning system using an illumination device are allowed to work together.

The positioning server 109 shown in FIG. 15 includes an application interface unit 1501 for performing communication with the application server; a terminal/base station controller 1502 for performing communication with the terminal and base station; an illumination installation position database 1503 for storing illumination installation position information in which unique information of the respective illumination devices and installation positions thereof are associated with each other; a base station installation position database 1506 for storing base station installation position information in which the IDs of respective wireless LAN base stations and installation positions thereof are associated with each other; a terminal information storage unit 1504 for storing terminal information in which the ID of each terminal, unique information of the illumination device that the terminal has received, ID of the wireless LAN base station to which the terminal is connected are associated with each other; a position detection processing unit 1505 for detecting the position information of the terminal based on information of the illumination installation position database 1503, base station installation position database 1506, and terminal information storage unit 1504; and other required functions.

FIG. 16 shows a configuration example of the terminal information that the terminal information storage unit 1504 of FIG. 15 stores.

The terminal information storage unit 1504 shown in FIG. 16 stores ID 1601 of the base station to which the terminal is connected in addition to terminal ID 1301, unique information 1302 of the illumination device, and unique information reception time 1303. The terminal information storage unit 1504 may store time information 1602 indicating the time point at which the terminal is connected to the base station.

FIG. 17 shows a configuration example of information that the base station installation position database 1506 of FIG. 15 stores.

The base station installation position database 1506 stores ID information 1701 of each base station and position information of the location at which the base station is installed in association with each other. The position information includes logical information 1702 such as a name or number of the room at which the base station is installed and coordinate information 1703 indicating the installation position of the base station on a design drawing of a building or the like. The position information may further include area information 1704 indicating the size of the area within which the terminal can be connected to the base station.

A configuration in which the application server 110 displays seating positions will be described.

FIG. 22 shows a configuration example of the application server 110 according to the second embodiment. The application server 110 includes a display condition input unit 2201, a user information processing unit 2202, a user information management unit 2203, a terminal information management unit 2204, a positioning server interface unit 2205, a floor map management unit 2206, a user position display unit 2207, and other required functions.

The display condition input unit 2201 receives an input of information concerning a terminal user to be displayed from a viewer of seating positions. The user information processing unit 2202 collects information concerning display condition, user, terminal, and floor map and generates information used for display of seating positions based on the collected information. The user information management unit 2203 manages information concerning the terminal that a user uses. The terminal information management unit 2204 manages information such as a terminal position and a login account (user ID) used when the terminal accesses a wireless LAN. The positioning server interface unit 2205 requests the terminal position from the positioning server. The floor map management unit 2206 stores a floor map and manages registration and deletion of the floor map. The user position display unit 2207 displays the position of the user to a viewer.

Although the display condition input unit 2201 and user position information display unit 2207 are incorporated in the application server 110 in the above configuration, they may be incorporated in a client machine that a viewer uses.

FIG. 23 is a configuration example of the user information that the user information management unit 2203 stores. The user information management unit 2203 stores a user ID for uniquely identifying a user in the system, a user name for display purpose, a department name which indicates the department to which the user belongs as the attribute information of the terminal, a list of terminals that the user uses, a terminal type indicating whether the terminal is connected to a wireless LAN or wired LAN, and the like. The user name may include a term indicating duty positions such as "Department manager" or "Unital chief". The information stored as terminal list may include information capable of uniquely identifying the terminal, such as IP address or MAC address of the terminal, in addition to the terminal name. In the case where the terminal type indicates a terminal connected to the wired LAN, it may include the installation position of the terminal. Further, in addition to the department name, information representing the attribute of the user may be stored as the user information.

FIG. 24 shows a configuration example of the terminal information that the terminal information management unit 2204 shown in FIG. 22 stores. The terminal information management unit 2204 stores information such as terminal name, position information, position accuracy, and position acquisition time. As the terminal name, information for uniquely identifying the terminal is stored. The information for uniquely identifying the terminal may include IP address or MAC address of the terminal.

A plurality of such information for identifying the terminal may be registered for one terminal. As the position information, a result of measurement of the terminal position is stored. In the example shown in FIG. 24, the position within a floor is represented by XY coordinates. "F=2, X=10, Y=30" means that the terminal is located in the second floor (F=2) and at the position 10 m apart from a reference point previously determined within a floor in X direction and 30 m apart therefrom in Y direction. As the part (F=2) indicating the floor information, a floor name or a file name of a floor map may be specified.

As the position accuracy, information indicating the accuracy of the terminal position information is stored. Although a position error within a floor is registered in units of meter in the example of FIG. 24, the information concerning the position accuracy is not limited to this. In place of the position accuracy information represented in units of meter, a value represented using a positioning technique for position information acquisition may be used. In this case, information such as "illumination positioning" "wireless LAN base station positioning" may be stored as the position accuracy information. As the position acquisition time, the time at which the position of the terminal is measured is stored.

Figure 26:
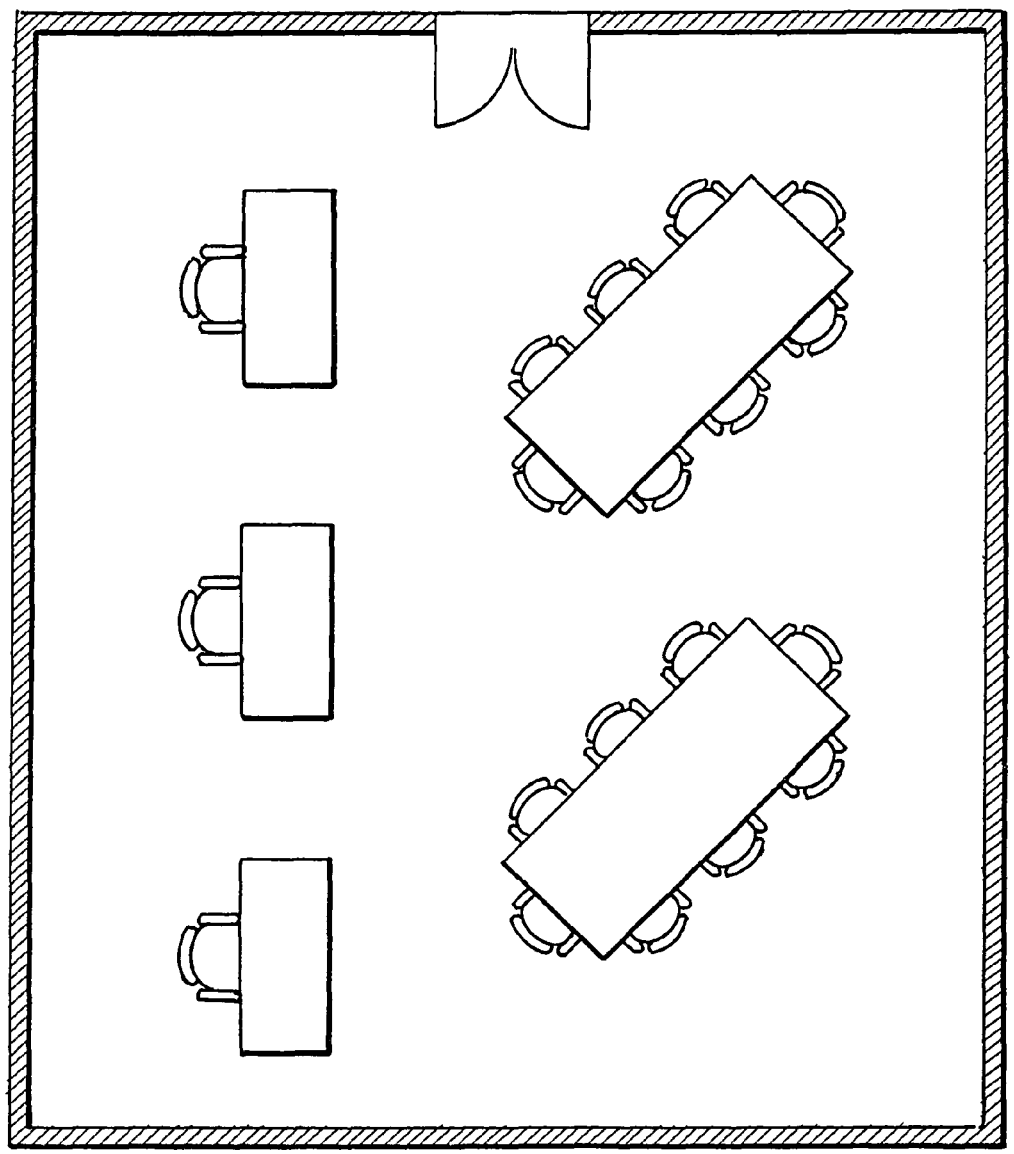
FIG. 26 is a view showing an example of a floor map in the second embodiment.

FIG. 25 shows a configuration example of the floor information that the floor map management unit 2206 stores. The floor information includes floor name, file name of floor map, floor ID for uniquely identifying the floor, and area depicted on the floor map. For example, 4Fmap.jpg in the table of FIG. 25 targets fourth floor (floor ID F=4) and depicts the position starting from 20 m point apart from a predetermined reference point to 50 m point therefrom in X direction and position starting from 0 m point apart from the reference point to 40 m point therefrom in Y direction. FIG. 26 shows an example of the floor map stored as a file.

Next, the operation of the positioning server 109 will be described using FIGS. 15 and 18.

Figure 18:
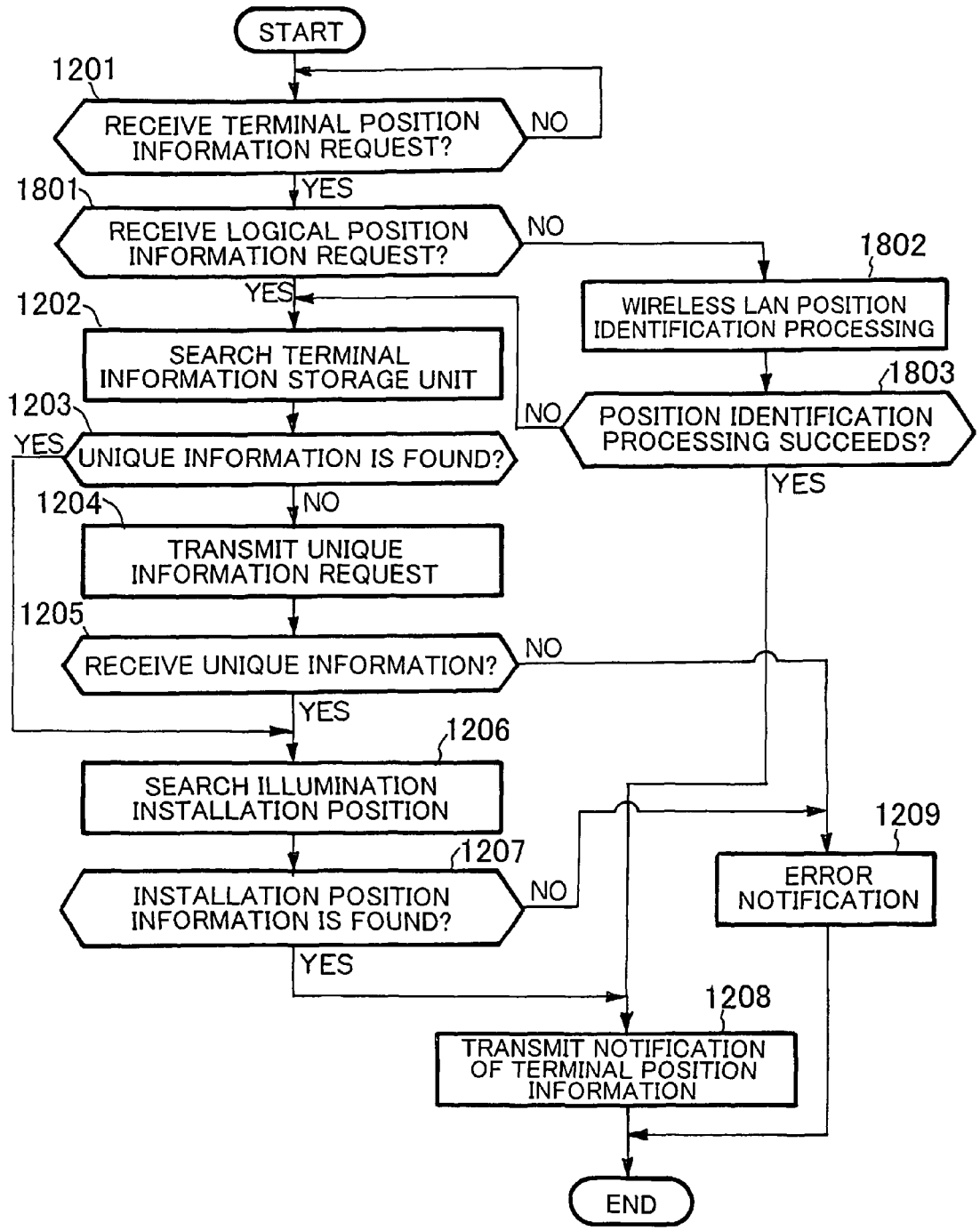
FIG. 18 is a flowchart showing another example of a process flow of the positioning server in the second embodiment of the present invention.

Steps 1201 to 1209 shown in FIG. 18 are the same as those shown in FIG. 12. Upon receiving a request for terminal position information from an application of the application server 110 or the like, the application interface unit 1501 of the positioning server 109 transmits a terminal position information request in which the type of the requested position information has been written to the position detection processing unit 1505 (YES in step 1201).

Upon receiving the terminal position information request, the position detection processing unit 1505 determines the type of the requested position information and determines whether the requested position information is the logical position information such as room number (step 1801).

If the requested position information is not the logical position information such as room number but coordinate information (NO in step 1801), the position detection processing unit 1505 performs terminal position identification processing using a wireless LAN (step 1802). For example, a wireless LAN signal is measured in the terminal or a plurality of base stations to detect the signal level or signal propagation time between the terminal and base stations and, based on the detection result, the position of the terminal is identified. During the terminal position identification processing using a Wireless LAN, the position detection processing unit 1505 searches the terminal information storage unit 1504 so as to acquire information concerning the base station to which the terminal is connected or searches the base station installation position database 1506 so as to acquire information of the installation position coordinate of wireless LAN base stations.

If the terminal position identification processing using a wireless LAN has succeeded (YES in step 1803), the position detection processing unit 1505 transmits the terminal position information to the application through the application interface unit 1501 as a reply (step 1208).

If the requested position information is the logical position information such as room name (YES in step 1801) or if the terminal position identification processing using a wireless LAN has failed (NO in step 1803), the position detection processing unit 1505 searches the terminal information storage unit 1504 to determine whether it stores the unique information that the requested terminal has received (step 1202) in the same manner as described in FIG. 12.

If the terminal information storage unit 1504 does not store the unique information that the requested terminal has received (NO in step 1203), the position detection processing unit 1505 transmits a unique information request message to the terminal through the terminal controller 1502 (step 1204). The search processing of the terminal, in step 1202 may be omitted. In this case, when receiving the terminal position request from the application, the position detection processing unit 1505 inevitably proceeds to step 1204 where it transmits the unique information request message to the terminal. The terminal controller 1502 that has received the unique information from the terminal notifies the position detection processing unit 1505 of the unique information as well as writes the unique information in the terminal information storage unit 1504. At this time, reception time of the unique information may be written in the terminal information storage unit 1504.

The position detection processing unit 1505 that has received the unique information from the terminal (YES in step 1205) uses the received unique information to search the illumination installation position database 1503 (step 1206). If it is determined that the terminal information storage unit 1504 stores the unique information that has previously received from the terminal and its reception time falls within a predetermined time measured from the current time (YES in step 1203) as a result of the search processing in step 1202, the position detection processing unit 1505 may skip the unique information request process for the terminal (steps 1204 and 1205) and use the unique information stored in the terminal information storage unit 1504 to search the illumination installation position database 1503 (step 1206 in FIG. 18).

If it is determined that the illumination installation position information corresponding to the unique information is acquired as a result of the search processing for the illumination installation position database 1503 (YES in step 1207), the position detection processing unit 1505 transmits the illumination installation position information acquired form the illumination installation position database 1503 to the application through the application interface unit 1501 as a replay (step 1208). If it is determined that the unique information from the terminal could not be received in step 1205 (No in step 1205) or that illumination installation position information corresponding to the unique information could not be acquired as a result of search processing for the illumination installation position database 1503 in step 1206 (No in step 1207), the position detection processing unit 1505 transmits an error notification to the application as a replay through the application interface unit 1501 (step 1209).

As a method other than the above operation example, a method may be adopted in which a wireless LAN is used to perform terminal position identification processing in the case where the position identification processing using the unique information of the illumination device cannot be performed or has failed.

An operation example of the application server 110 will be described using FIGS. 22 to 27.

Figure 27:
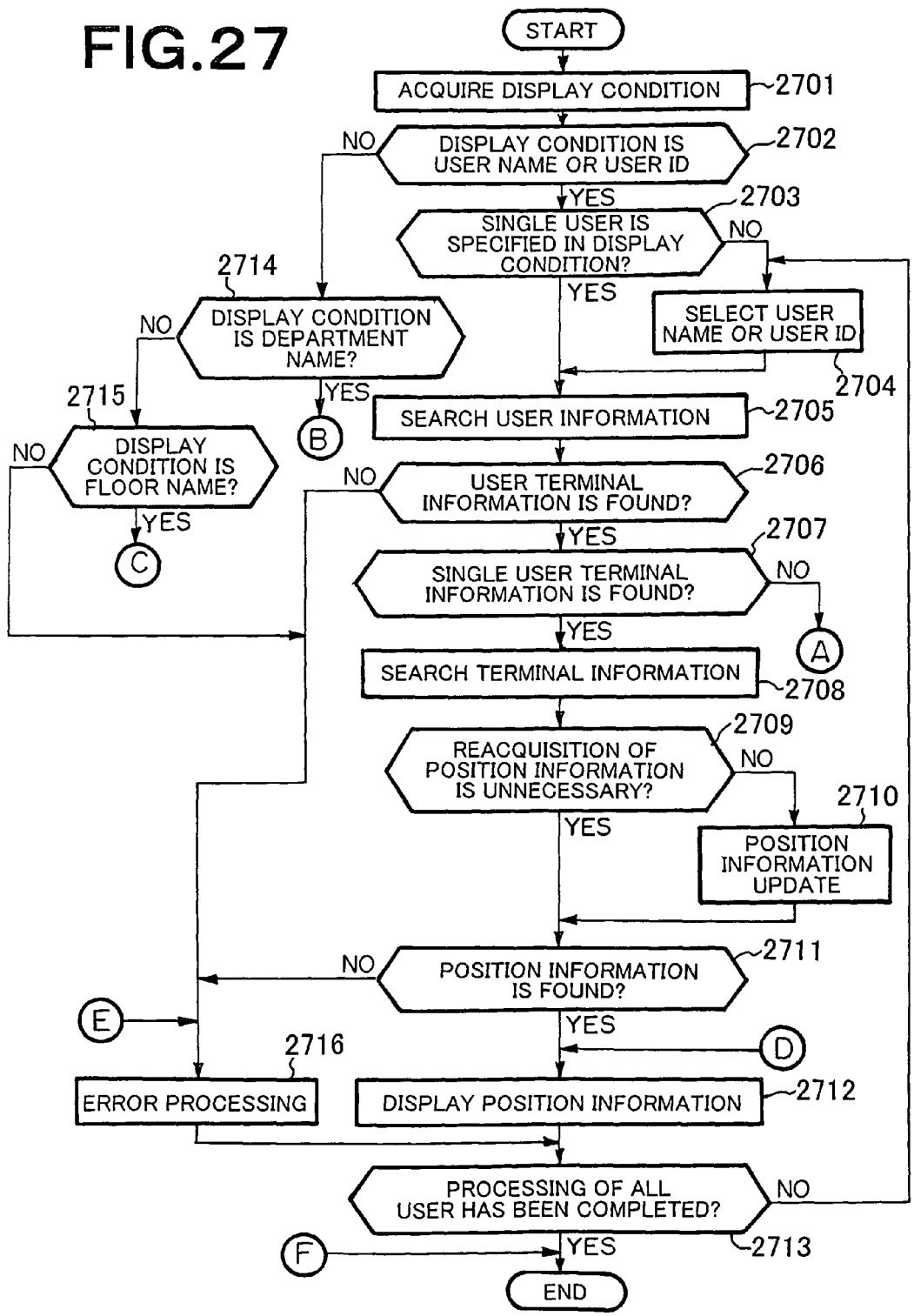
FIG. 27 is a flowchart for explaining the operation in the second embodiment of the present invention.

FIG. 27 is a flowchart for explaining an operation example of the application server 110.

The display condition input unit 2201 of the application server 110 receives an input of the display condition concerning a user to be displayed from a viewer (step 2701). As the display conditions, user name, user ID, department name, or floor name is specified. A plurality of user names or user IDs may be specified. When specifying user name or user ID, the viewer may further specify a name of the floor in which the viewer is present. In this case, in the case where it is determined that the user is present in a floor different from the viewer as a result of the position search processing, a message such as "Absence" is allowed to be displayed or a result of the position search processing is not displayed.

Hereinafter, a case where the viewer instructs the application server 110 to display a user name "Taro Tanaka" will be described.

The display condition input unit 2201 notifies the user information processing unit 2202 of the display condition specified by the viewer. The user information processing unit 2202 checks whether the received display condition is user name or user ID (step 2702).

If it is determined that the received display condition is user name or user ID as a result of the check (YES in step 2702), the user information processing unit 2202 determines whether a single user or a plurality of users are specified in the display condition (step 2703).

If it is determined that only a single user is specified (YES in step 2703), the user information processing unit 2202 notifies the user information management unit 2203 of the user name or user ID. On the bother hand, if it is determined that a plurality of user names are specified (NO in step 2703), the user information processing unit 2202 selects unprocessed one from a plurality of user names or user IDs specified as the display condition (step 2704) and notifies the user information management unit 2203 of the selected user name or user ID. In this example, user name "Taro Tanaka" is notified to the user information management unit 2203.

The user information management unit 2203 that has received the user name or user ID searches for user terminal information corresponding to the notified user name or user ID (step 2705) and transmits the found user terminal information to the user information processing unit 2202 as a reply. In the example of FIG. 23, as a terminal corresponding to user name "Taro Tanaka", "tanaka_pc" is obtained as a search result and this "tanaka_pc" is notified to the user information processing unit 2202. If it is determined that the user information management unit 2203 does not store the user terminal information corresponding to the notified user name or user ID, the user information management unit 2203 performs necessary error processing such as transmission of an error message (step 2716).

If the user terminal information is notified from the user information management unit 2203 (YES in step 2706), the user information processing unit 2202 determines whether a plurality of user terminal information have been notified (step 2707). If it is determined that only a single user terminal information has been notified (YES in step 2707), the user information processing unit 2202 notifies the terminal information management unit 2204 of this user terminal information.

Upon receiving the notification of the user terminal information, the terminal information management unit 2204 searches the stored terminal information to extract the position information of the notified terminal (step 2708). In the example of FIG. 24, position information of user terminal "tanaka_pc" [F=2, X=10, Y=30], position accuracy [3m] and position acquisition time [2003/1/10 17:20] are extracted by the terminal information management unit 2204.

If the terminal information management unit 2204 does not store the position information of the notified terminal or it is determined that the position information needs to be reacquired (No in step 2709), the terminal information management unit 2204 performs update processing of the position information (step 2710).

For example, the terminal information management unit 2204 compares the acquisition time of the position of the specified user terminal with the current time when receiving the notification from the user information processing unit 2202. If this acquisition time is older than a predetermined time point, it is determined that the reacquisition of the position information needs to be performed. Assume that information 15 minutes or more before the current time is subject to update and the current time is [2003/10/10 17:40]. In this case, if the position acquisition time of the stored position information is [2003/1/10 17:20], it is determined that the reacquisition of the position information needs to be performed.

With regard to the update method of the terminal information that the terminal information management unit 2204 stores, although the need of the update is determined when the display request is transmitted from the viewer in the above example, the application server may periodically perform the update processing of the position information. Further, in the case where the terminal type of the user terminal that the user information management unit stores is wired LAN terminal, the update processing of the position information need not be performed.

In the update processing of the position information, the terminal information management unit 2204 instructs the positioning server 109, through the positioning server interface unit 2205, to transmit the positioning of the terminal. Then the positioning server 109 transmits information specifying the terminal position to the positioning server interface unit 2205. The positioning server interface unit 2205 then transfers the information to the terminal information management unit 2204. The transferred information includes position information of the terminal, position accuracy, and the like. Upon receiving the information, the terminal information management unit 2204 updates position information, position accuracy, position acquisition time, and the like. A configuration may be adopted in which if the position identification processing fails, only the position acquisition time may be updated with columns of position information and position accuracy kept in blank or stored position information may not be updated.

If the terminal information management unit 2204 acquires the position information of the notified user terminal after the search processing of the terminal information or update processing of the position information stored therein, (YES in step 2711), the terminal information management unit 2204 transmits position information, position accuracy, position acquisition time to the user information processing unit 2202 as a replay. If the terminal information management unit 2205 could not acquire the position information of the notified user terminal (NO in step 2711), the terminal information management unit 2204 performs necessary error processing (step 2716).

The user information processing unit 2202 may check whether a response from the terminal can be received in step 2711. In this case, a network protocol such as PING (Packet Internet Groper) may be used to check whether the terminal is normally connected to a network. In the case where a response from the terminal could normally be acquired, it may be determined that the position information could not be acquired even though the position information is actually acquired.

Since the position of the user specified by user name can be specified, the user information processing unit 2202 that has acquired the position information of the terminal from the terminal information management unit 2204 acquires display information represented by a text or corresponding floor map from the floor map management unit 2206 based on the acquired information, generates information in which an icon is displayed on the floor map, and transmits the generated information to the user position display unit 2207 to allow it to display the information (step 2712).

The user information processing unit 2202 determines display of the position information of all users that have been specified is completed or not (step 2713). If processing of all users has been completed (YES in step 2713), this flow is ended. If processing of all users has not been completed (NO in step 2713), step 2704 and subsequent steps are repeated.

The position information display processing in step 2712 may be performed for each user or after the position information acquisition processing of all users has been completed (YES in step 2713 or later). The user position display unit 2207 may display information indicating that the specified user is absent even in the case where the position information of the specified user could not be acquired. Further, in step 2701, a configuration may be adopted in which if a name of the floor in which the viewer is present is specified and acquired position information of the user differs from the floor in which the viewer is presented, display processing is not performed or information indicating that the specified user is absent is displayed.

Figure 28:
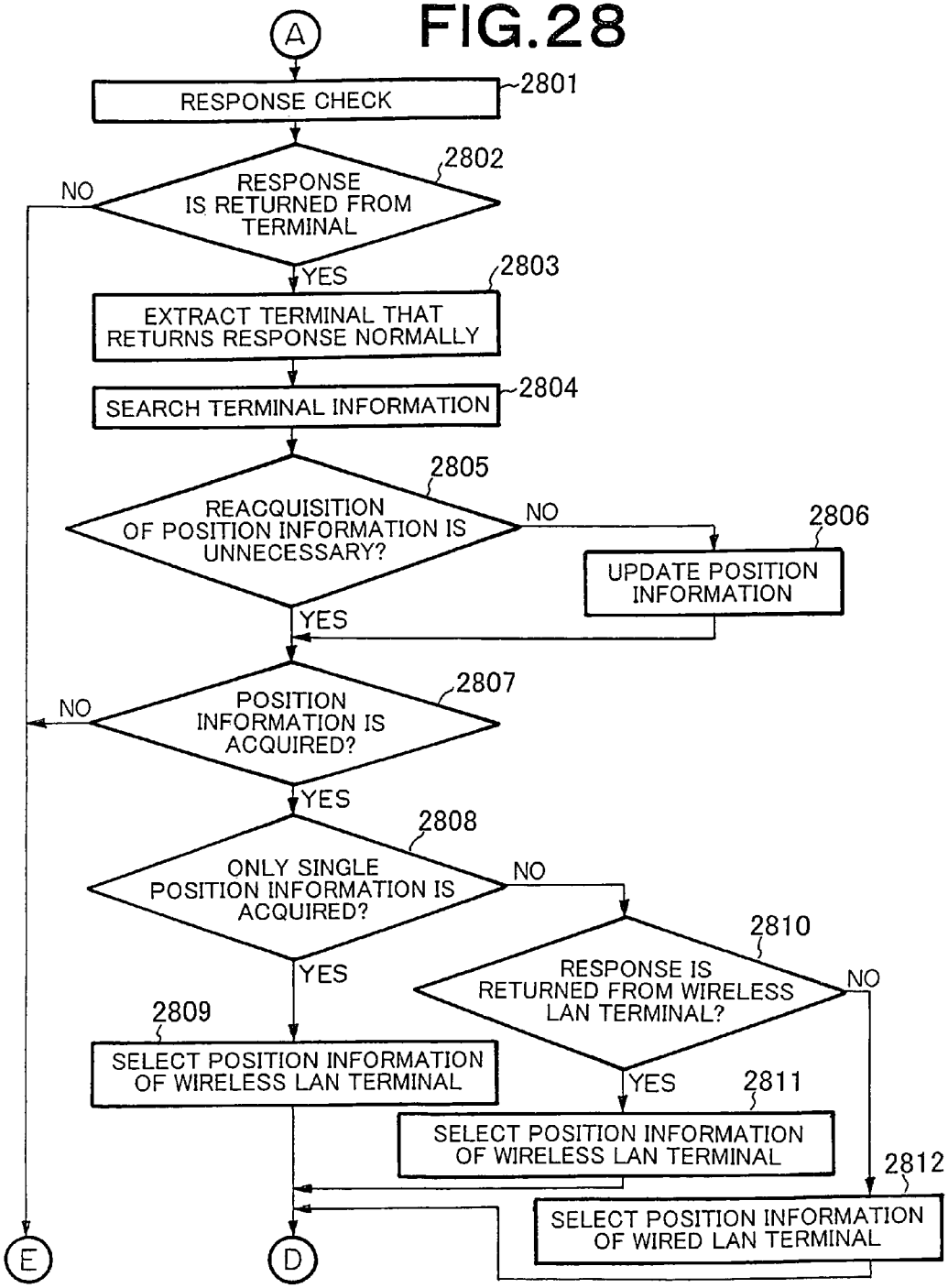
FIG. 28 is a flowchart for explaining the operation in the second embodiment of the present invention.

The operation of the application server 110 in the case where the user specified by the viewer uses a plurality of terminals will be described using FIGS. 27 and 28. It is assumed in this example that user name "Jiro Sato" is specified.

After the user information management unit 2203 has extracted the user terminal information corresponding to user name or user ID specified by the user information processing unit 2202, a plurality of user terminal information are obtained (NO in step 2707). In the example of FIG. 23, "sato_pc" and "sato_pc2" are specified as the user terminal information corresponding to user name "Jiro Sato". These user terminal information and terminal type are notified to the user information processing unit 2202.

Upon receiving the notification, the user information processing unit 2202 checks whether a response from the respective terminals can be received (step 2801). In this case, a network protocol such as PING may be used to check whether the terminals are normally connected to a network.

If a response could be received from the terminal (YES in step 2802), the user information processing unit 2202 extracts the user terminal that made a response normally (step 2803) and notifies the terminal information management unit 2204 of the extracted user terminal. Upon receiving the notification, the terminal information management unit 2204 searches whether the position information of the user terminal is held or not and determines whether update of the position information is necessary or not (step 2805).

If it is determined that update of the position information is necessary (NO in step 2805), the position information is updated (step 2806). The processing in steps 2805 and 2806 are the same as those in steps 2709 and 2710.

If it is determined that update of the position information is not necessary, or if the position information of the user terminal could be acquired after the update of the position information (YES in step 2807), the terminal information management unit 2204 determines whether only a single user terminal could acquire the position information (step 2808).

If it is determined that only a single user terminal could acquire the position information (YES in step 28708), the terminal information management unit 2204 selects the position information of the single user terminal (step 2809). On the other hand, if it is determined that a plurality of user terminals could acquire the position information (NO in step 2808), terminal information management unit 2204 determines whether the position information of the user terminal whose terminal type is a wireless LAN terminal could be acquired (step 2810).

If the position information of the user terminal whose terminal type is a wireless LAN terminal could be acquired (YES in step 2810), the terminal information management unit 2204 selects the position information of the above user terminal (step 2811). In the case where a plurality of user terminals whose terminal type is a wireless LAN terminal in step 2811, the terminal information management unit 2204 selects one from them. In this case, the terminal information management unit 2204 may collect information, such as a key input operation, indicating the operation state of the terminal and select the position information of the user terminal on which a key input operation is made most recently.

If the position information of the user terminal whose terminal type is a wireless LAN terminal could not be acquired (NO in step 2810), the terminal information management unit 2204 selects the position information of the user terminal whose terminal type is a wired LAN terminal (step 2812). In the case where there are a plurality of user terminals in step 2812, the terminal information management unit 2204 selects one from them. In this case, the terminal information management unit 2204 may collect information, such as a key input operation, indicating the operation state of the terminal and select the position information of the user terminal on which a key input operation is made most recently.

The operation of the application server 110 in the case where the viewer specifies department name as the display condition will be described using FIGS. 27 and 28.

In the case where the viewer specifies the display by department name in the display condition input unit 2201 (YES in step 2714), the user information processing unit 2202 transmits a request to the user information management unit 2203 for a list of users corresponding to the specified department name.

Upon receiving the request, the user information management unit 2203 searches the managed information using the department name as a key and acquires a list of users corresponding to the department name and a list of user terminals of the users (step 2901).

Figure 29:
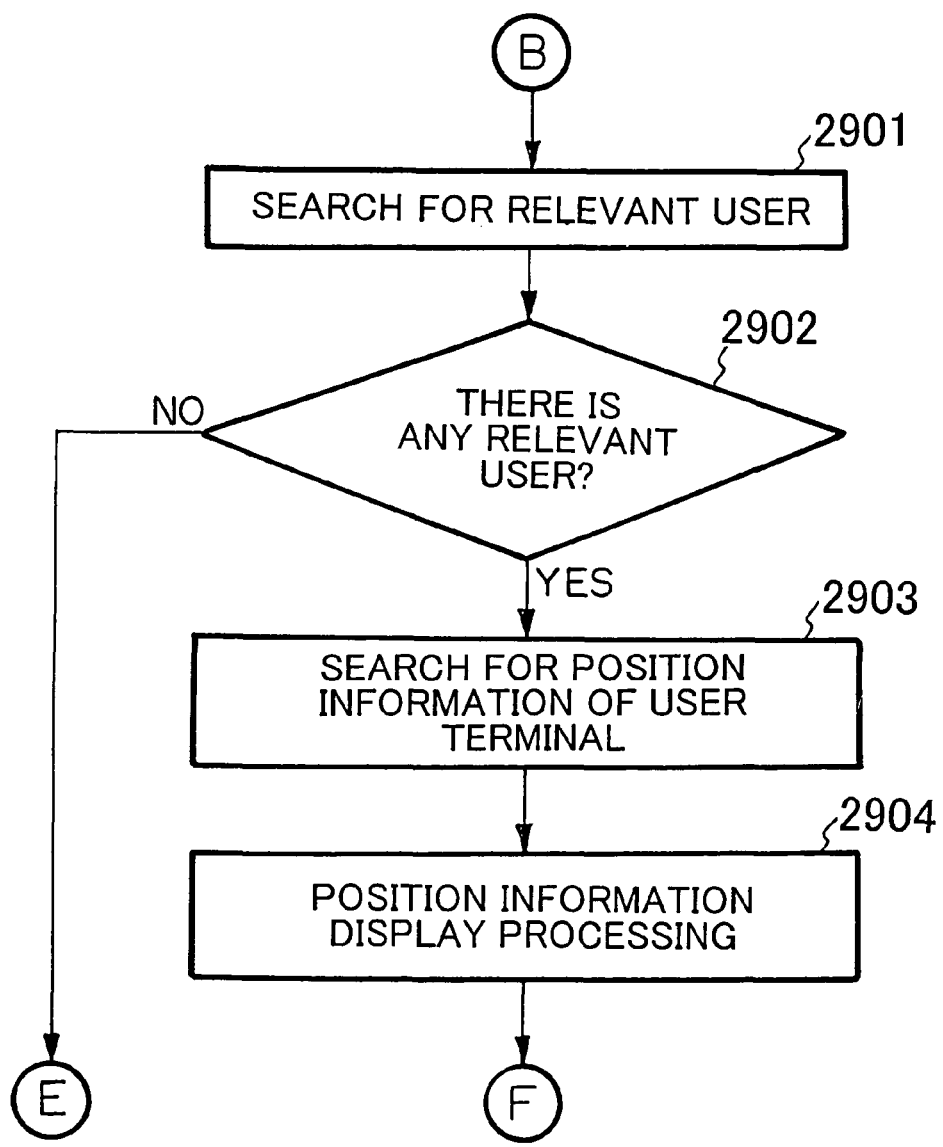
FIG. 29 is a flowchart for explaining the operation in the second embodiment of the present invention.

If there is any user belonging to the specified department (YES in step 2902), the user information processing unit 2202 acquires the position information of the user terminal of the user (step 2903). The acquisition method of the position information of the user terminal in step 2903 of FIG. 29 is the same as those described in steps 2706 to 2711 of FIG. 27 and FIG. 28.

In order to display the position information of the users, the user information processing unit 2202 that has acquired the position information of the user belonging to the specified department acquires display information represented by a text or corresponding floor map from the floor map management unit 2206, generates information in which an icon is displayed on the floor map, and transmits the generated information to the user position display unit 2207 to allow it to display the information (step 2904).

Figure 30:
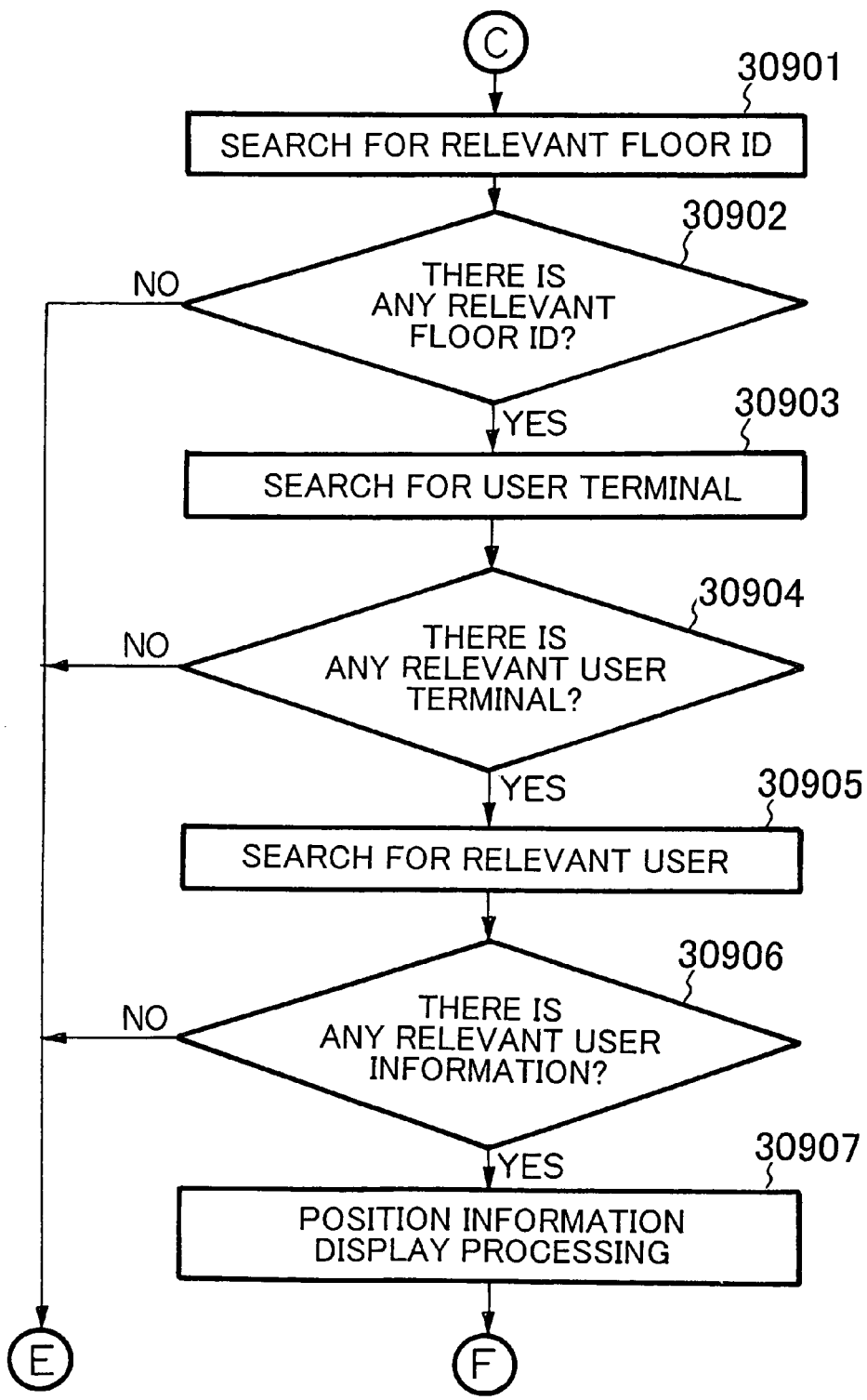
FIG. 30 is a flowchart for explaining the operation in the second embodiment of the present invention.

The operation of the application server 110 in the case where the viewer specifies floor name as the display condition will be described using FIGS. 27 and 30.

In the case where the viewer specifies the display by floor name in the display condition input unit 2201 (YES in step 2715), the user information processing unit 2202 transmits a request to the floor map management unit 2206 for a floor ID corresponding to the specified floor name (step 3001).

If the floor ID corresponding to the specified floor name could be acquired (YES in step 3002), the user information processing unit 2202 transmits a request to the terminal information management unit 2204 for a list of user terminals corresponding to the acquired floor ID. Upon receiving the request, terminal information management unit 2204 searches the managed terminal information using the floor ID as a key and acquires a list of user terminals corresponding to the floor ID and a list of position information of the user terminal, position accuracy information, and the like (step 3003), and transmits them to the user information processing unit 2202 as a reply.

If there is any user terminal corresponding to the specified floor ID (YES in step 3004), the user information processing unit 2202 that has received the user terminal information transmits a request to the user information management unit 2203 for the user information corresponding to the acquired user terminal.

Upon receiving the request, the user information management unit 2203 searches the managed user information using the user terminal information as a key (step 3005) and transmits the relevant user name, terminal type of the user terminal, and the like to the user information processing unit 2202 as a replay.

In order to display the position information of the users, the user information processing unit 2202 that has acquired the user name that uses the user terminal extracted in step 3003 (YES in step 3006) acquires display information represented by a text or corresponding floor map from the floor map management unit 2206, generates information in which an icon is displayed on the floor map, and transmits the generated information to the user position display unit 2207 to allow it to display the information (step 3007).

The creation of the display information from the position information of the user performed by the user information processing unit 2202 in step 2712 of FIG. 27, step 2904 of FIG. 29, and step 3007 of FIG. 30 will be described in more detail using FIG. 31.

As described above, the user information processing unit 2202 generates display information represented by a text or information in which an icon is displayed on the floor map and transmits the generated information to the user position display unit 2207 to allow it to display the information. In the case where the user position is displayed on the floor map using an icon, it is possible to express accuracy of the information by selectively using a display method according to the position accuracy information or positioning technique information associated with the acquired position information.

Figure 31:
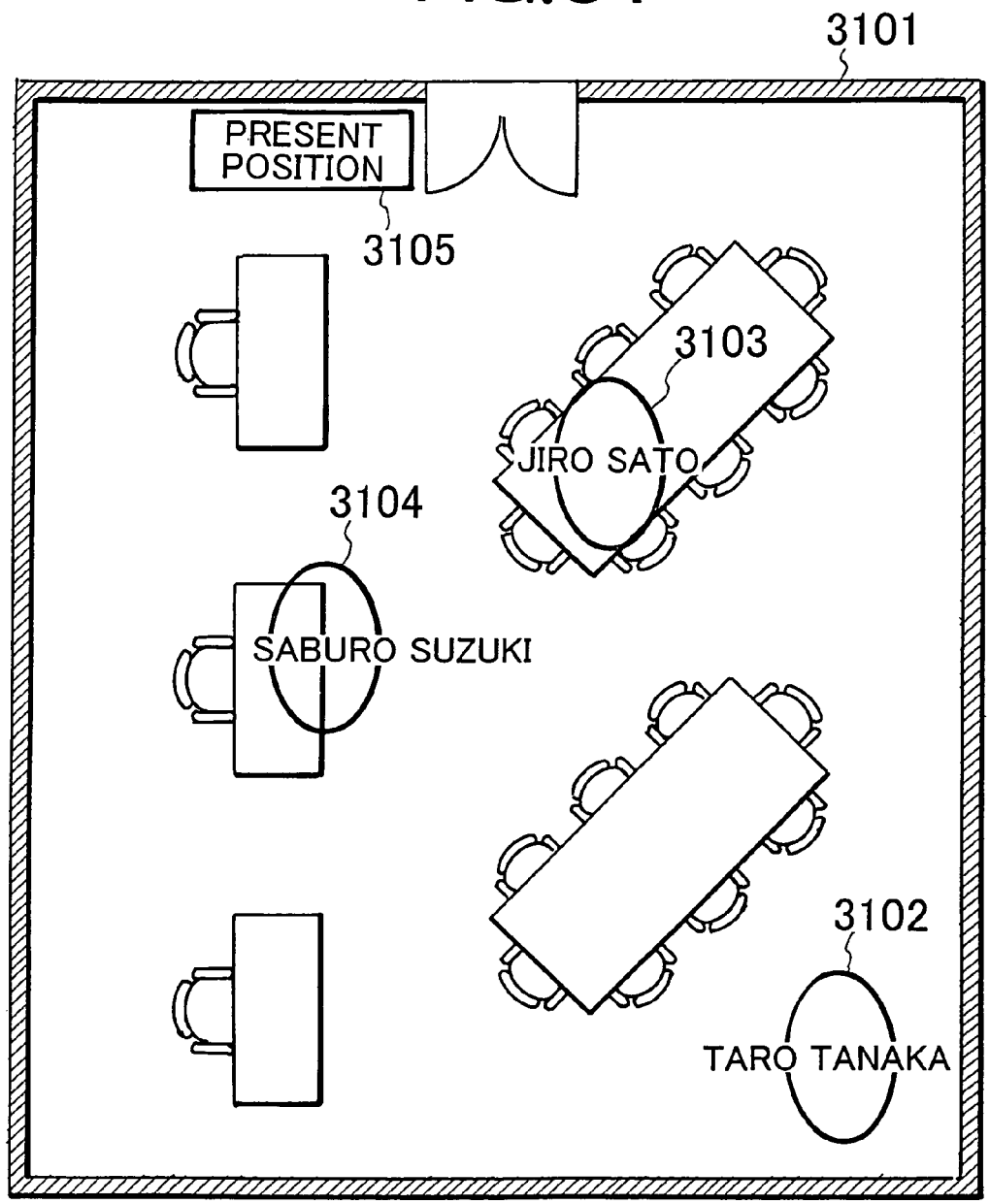
FIG. 31 is a view showing an example of display information in the second embodiment of the present invention.

In the example of FIG. 31, a difference in the positioning accuracy information is expressed between an icon 3102 indicating user "Taro Tanaka" and an icon 3103 indicating user "Jiro Sato" which are disposed on a floor map 3101 by circling the icon 3102 indicating user "Taro Tanaka". Further, the present position of the viewer may be displayed on the floor map. For example, a present position 3105 is displayed on the floor map in the example of FIG. 31.

In order to display the present position of the viewer, a method may adopted in which the installation position of the application server or installation position of the terminal that accesses the display condition input unit 2201 and user position display unit 2207 is previously registered, or in which the display condition input unit 2201 acquires the terminal information of the terminal that has accessed the display condition input unit 2201 and user information processing unit 2202 inquires to the terminal information management unit about the position information of the viewer's terminal.

Third Embodiment

As is clear from the above description, the positioning server according to the present invention can be realized not only by hardware, but also by a computer program.

FIG. 21 is a block diagram showing a configuration example of an information processing system that implements the positioning server according to the present invention.

The information processing apparatus shown in FIG. 21 includes a processor 2101, a program memory 2102, and a recording medium 2103. As the recording medium, a magnetic recording medium such as a hard disk can be employed.

Fourth Embodiment

As an embodiment different from the above first to third embodiments, a system that uses a positioning system including an illumination device to identify the position of a remainder in a building will be described in detail with reference to the drawings.

Figure 42:
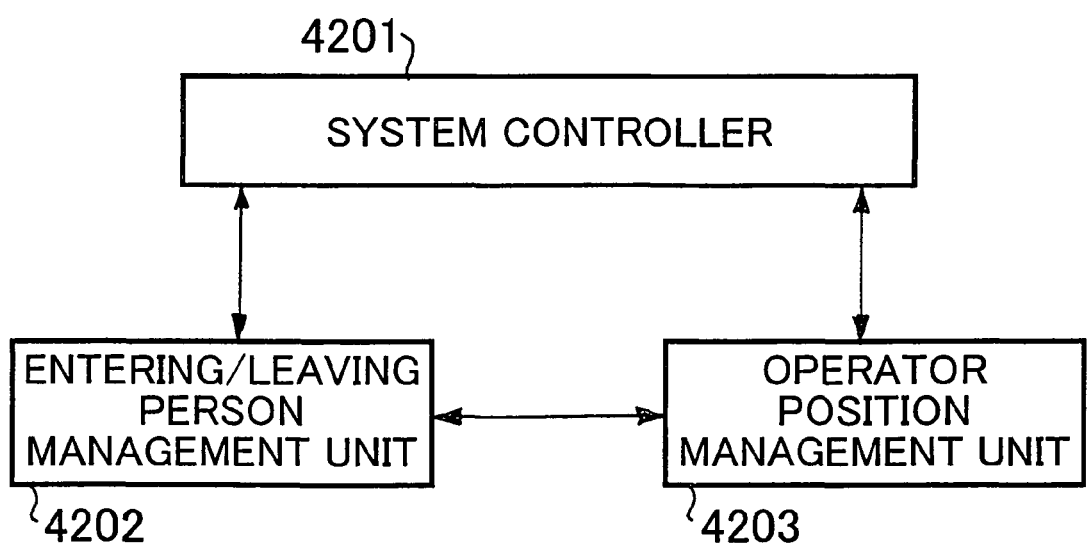
FIG. 42 is a view schematically showing a configuration of the positioning system in a fourth embodiment of the present invention.

FIG. 42 is a view schematically showing a configuration of the system according to the fourth embodiment. The system includes a system controller 4201, an entering/leaving person management unit 4202, and an operator position management unit 4203.

The system controller 4201 identifies a remainder within a building based on information from the entering/leaving person management unit 4202 and uses the operator position management unit 4203 to identify the position of the remainder within the building.

The entering/leaving person management unit 4202 detects the number of persons entering the building based on the information from the operator position management unit 4203 to create a list of entering persons and detects the number of persons leaving the building to create a list of leaving persons. In response to a request from the system controller 4201, the entering/leaving person management unit 4202 notifies the system controller 4201 of the lists of entering persons and leaving persons.

The operator position management unit 4203 identifies the positions of persons within the building. In response to a request from the system controller 4201, the operator position management unit 4203 notifies the system controller 4201 of the positions of specified persons.

Figure 51:
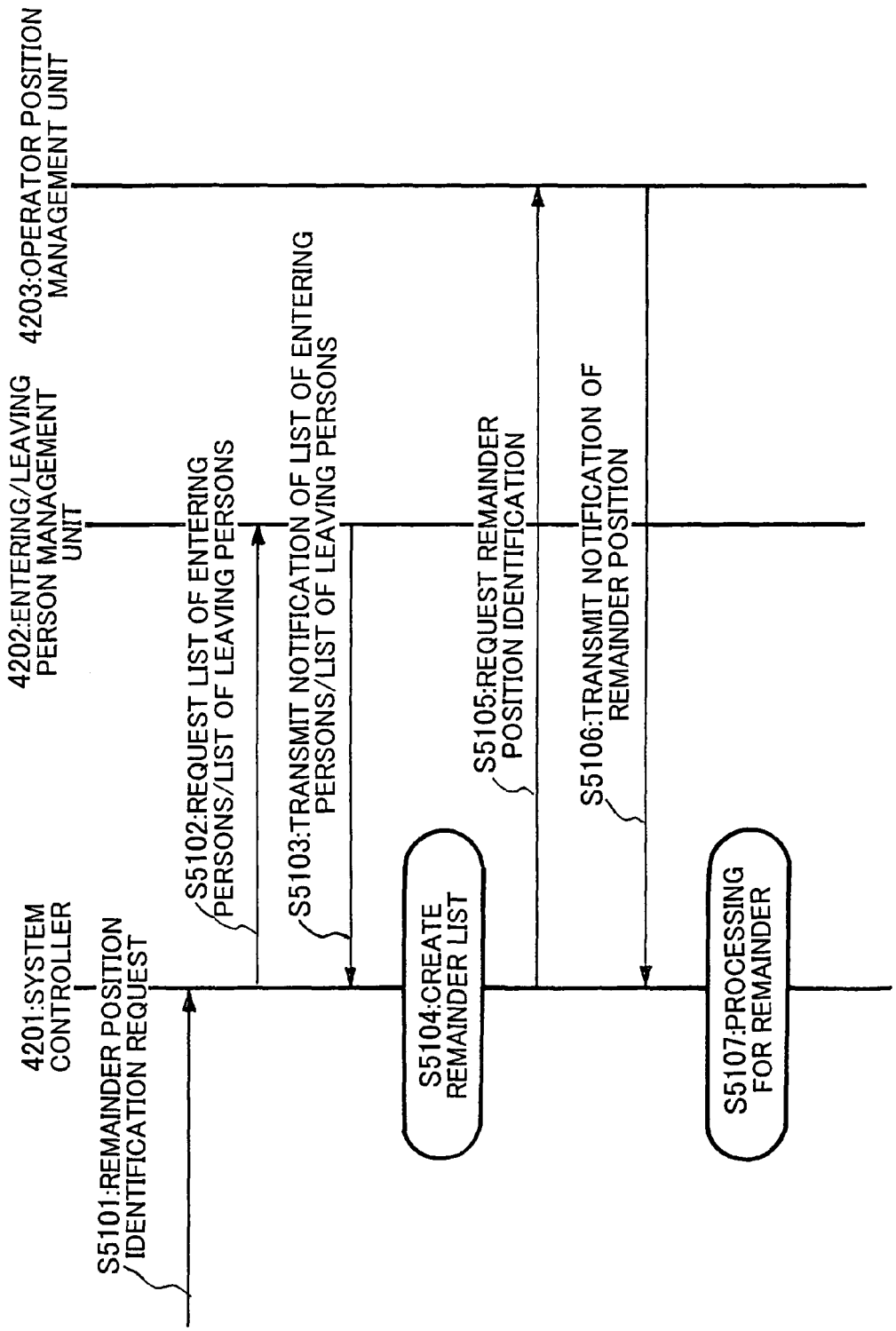
FIG. 51 is a view schematically showing an operation sequence of the positioning system in the fourth embodiment of the present invention.

FIG. 51 is a view schematically showing a processing sequence of the system according to the fourth embodiment.

An identification of the position of a remainder is requested from an external device to the system controller 4201 (S5101). Upon receiving the request, the system controller 4201 requires the entering/leaving person management unit 4202 to transmit a list of entering persons and a list of leaving persons (S5102). Upon receiving the request, the entering/leaving person management unit 4202 notifies the system controller 4201 of the lists (S5103). The system controller 4201 that has received the notification creates a remainder list from the received lists of entering persons and leaving persons (S5104).

After that, the system controller 4201 requires the operator position management unit 4203 to identify the positions of the persons listed in the remainder list (S5105). Upon receiving the request, the operator position management unit 4203 identifies the position of the remainder and notifies the system controller 4201 of the result (S5106). Upon receiving the notification, the system controller 4201 executes processing for the remainder (S5107). An example of the processing for the remainder includes emergency relief activity in the case of disaster.

FIG. 43 is a view showing concrete configuration of the entering/leaving person management unit 4202 and operator position management unit 4203.

The operator position management unit 4203 includes a transmitter 4301, a terminal 4303, a PHS base station 4307, a switching system 4308, a positioning server 4309, an illumination installation position information DB 4310, and a terminal position information DB 4311.

The transmitter 4301 is installed near the illumination device 4302 installed to the ceiling for illuminating a room and transmits unique information associated therewith using an infrared ray.

The terminal 4303 includes a light signal detection unit 4303, a PHS transmitter 4305, and an operation controller 4306. The light signal detection unit 4303 receives the unique information that the transmitter 4301 transmits using an infrared ray and notifies the operation controller 4306 of the reception of the unique information and unique information itself. The PHS transmitter 4305 communicates with the PHS base station 4307 in response to a request from the operation controller 4306.

The operation controller 4306 stores the unique information (hereinafter, referred to as position ID) notified from the light signal detection unit 4304. When receiving the position ID different from the previously notified position ID, the operation controller 4306 requires the PHS transmitter 4305 to transmit information (hereinafter, referred to as terminal ID) for identifying the terminal 4303 and position ID that the light signal detection unit 4304 has received.

The PHS base station 4307 relays a signal received from the terminal 4303 to the switching system 4308. The switching system 4308 transfers the signal from the PHS base station 4307 to the positioning server 4309.

Upon receiving the signal from the terminal 4303, the positioning server 4309 refers to the illumination installation position information DB 4310 and converts the position ID notified from the terminal 4303 into the position information indicating the position within the building. After that, the positioning server 4309 associates the terminal ID of the terminal 4303 and position information so as to store them in the terminal position information DB 4311.

Figure 44:
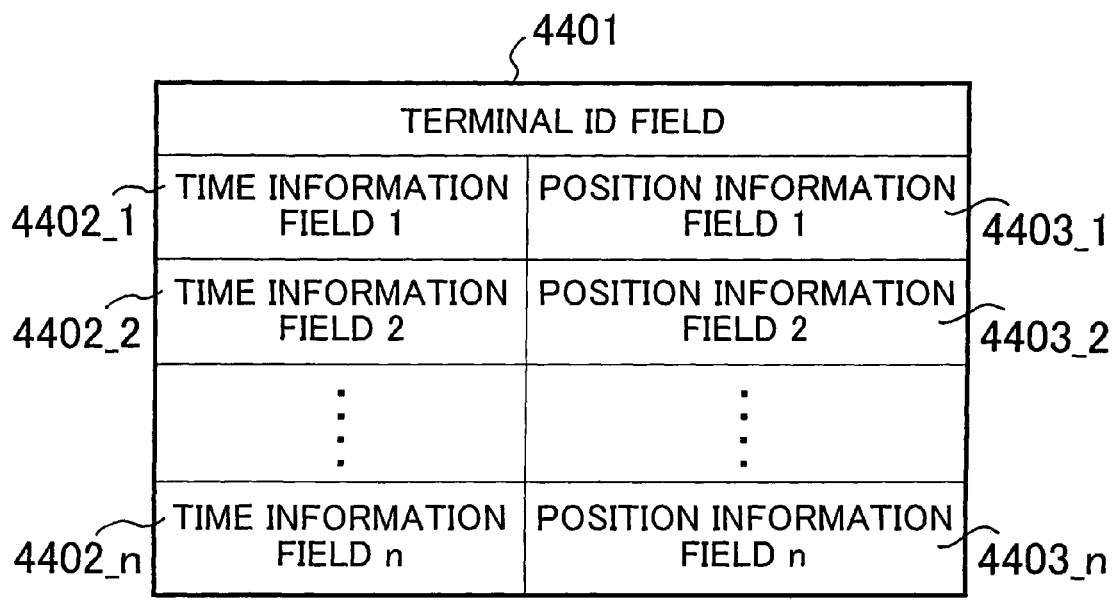
FIG. 44 is a table showing a format of information stored in a terminal position information DB in the forth embodiment of the present invention.

FIG. 44 is a view showing a format of information stored in the terminal position information DB 4311.

A terminal ID field 4401 stores a terminal ID for identifying a terminal. Time information fields 4402_1 to 4402_n store time at which the in-building position information has been recorded. The in-building position information and position ID are stored in position information fields 4403_1 to 4403_n.

The entering/leaving person management unit 4202 includes the above operator position management unit 4203 and an entering/leaving person management server 4312.

At the time when storing the in-building position information, the positioning server 4309 that constitutes the operator position management unit 4203 refers to the information that has existed in the terminal position information DB 4311 immediately before the in-building position information is stored. If the position information referred to and information to be stored are different from each other, the positioning server 4309 notifies the entering/leaving person management server 4312 of the relevant terminal ID.

The entering/leaving person management server 4312 refers to the record of the position information based on the terminal ID notified from the positioning server 4309 and creates a list of entering persons and a list of leaving persons.

Figure 45:
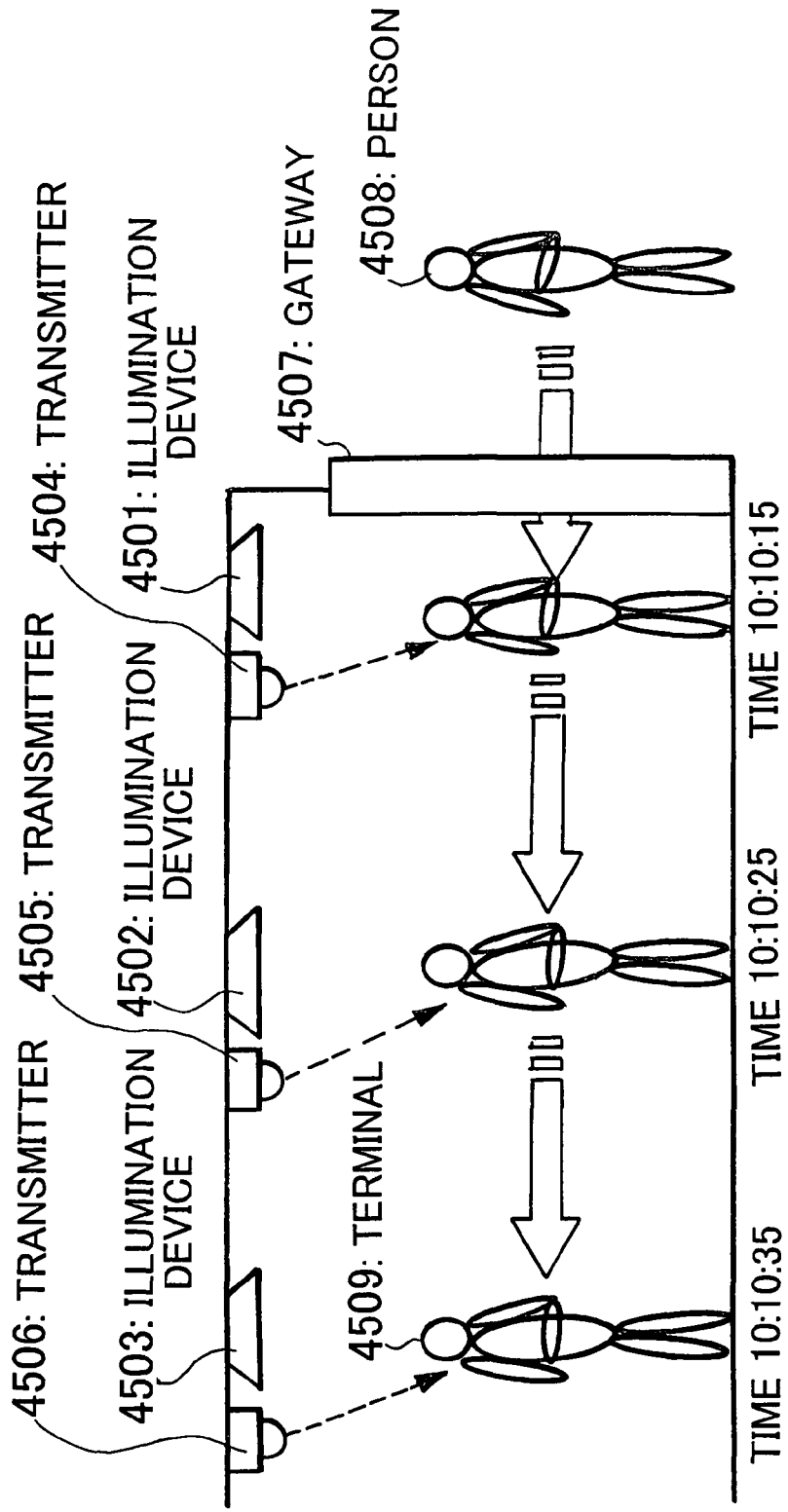
FIG. 45 is a view showing the principle of detection of entering persons in the fourth embodiment of the present invention.

FIG. 45 is a view for explaining the principle of detection of entering persons.

Figure 46:
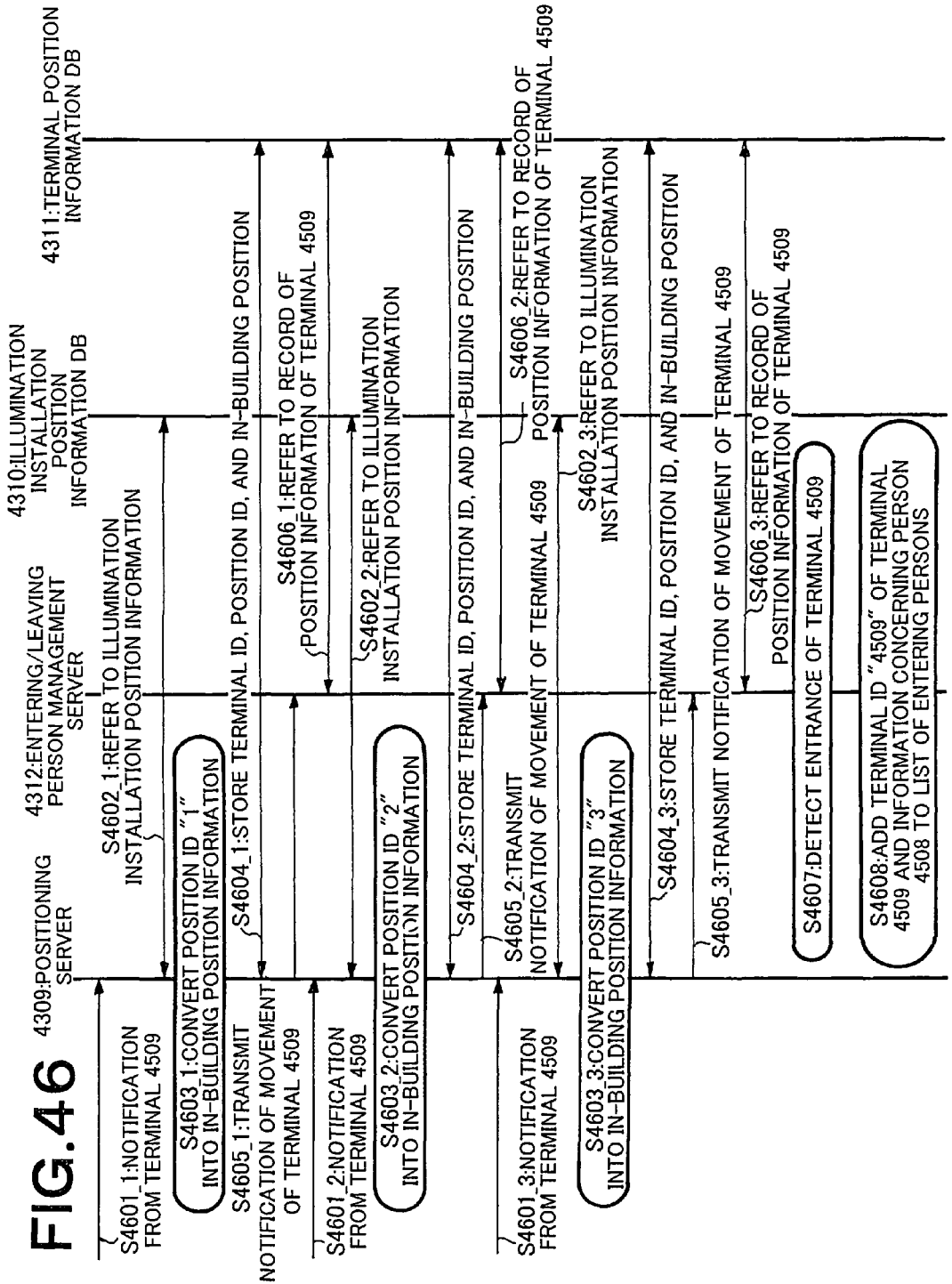
FIG. 46 is a view showing an operation sequence occurring at the entering person detection time in the fourth embodiment of the present invention.

FIG. 46 is a view showing an overview of an operation sequence of the positioning server 4309 and entering/leaving person management server 4312 occurring when a person 4508 enters the building, and FIG. 47 is a table showing the information of the terminal 4509 stored in the terminal position information DB 4311 at that time.

Transmitters 4504 to 4506 are installed to the ceiling near the entrance of the building. Using an infrared ray, the respective transmitters transmit a position ID. The transmitter 4504 transmits "1", transmitter 4505 transmits "2", and transmitter 4506 transmits "3" as the position ID.

It is assumed that a person 4508 enters the building from outside. The person 4508 carries a terminal 4509 having a terminal ID "4509".

When the person 4508 enters the building through a gateway 4507, the terminal 4509 receives the position ID "1" that the transmitter 4504 is transmitting and notifies the positioning server 4309 of the terminal ID "4509" and position ID "1" (S4601_1). The positioning server 4309 refers to the illumination installation position information DB 4310 (S4602_1) and converts the position ID "1" into the in-building position information "just near gate way 4507" (S4603_1).

After that, the positioning server 4309 stores the position ID and in-building position information in the terminal position information DB 4311 in association with the terminal ID (S4604_1). Since the information of the terminal 4509 is not stored in the terminal position information DB 4311 at this time, the positioning server 4309 notifies the entering/leaving person management server 4312 of the movement of the terminal 4509 (S4605_1). Upon receiving the notification, the entering/leaving person management server 4312 refers to the terminal position information DB 4311 to confirm the record of the position information of the terminal 4509 (S4606_1). Data is stored only the fields 4702_1 and 4703_1 at this stage, and the entering/leaving person management server 4312 recognizes that the terminal 4509 has been detected at the position near the gateway 4507 at 10:10:15.

When the person 4508 moves in the building and enters a predetermined area, the terminal 4509 receives position ID "2" that the transmitter 4505 is transmitting. The same sequence (S4601_2 to S4606_2) as that described above is executed at this time. At this stage, data is added to the fields 4702_2 and 4703_2 in the terminal position information DB, and the entering/leaving person management server 4312 detects that the terminal 4509 that had been detected at the position near the gateway 4507 at 10:10:15 has moved 5 m inward 10 seconds after the first detection.

When the person 4508 further moves in the building and enters a predetermined area, the terminal 4509 receives position ID "3" that the transmitter 4506 is transmitting. The same sequence (S4601_3 to S4606_3) as that described above is executed at this time. At this stage, data is added to the fields 4702_3 and 4703_3 in the terminal position information DB, and the entering/leaving person management server 4312 detects that the terminal 4509 that had been detected near the gateway 4507 at 10:10:15 has moved 5 m inward 10 seconds after the first detection and has further moved 5 m inward 10 seconds after the second detection. At this stage, the entering/leaving person management server 4312 determines that the terminal 4509 has entered the building (S4607) and adds the terminal ID "4509" and time (in this case, 10:10:35) at which the entrance of the terminal 4509 has been determined to the list of entering persons.

Figure 48:
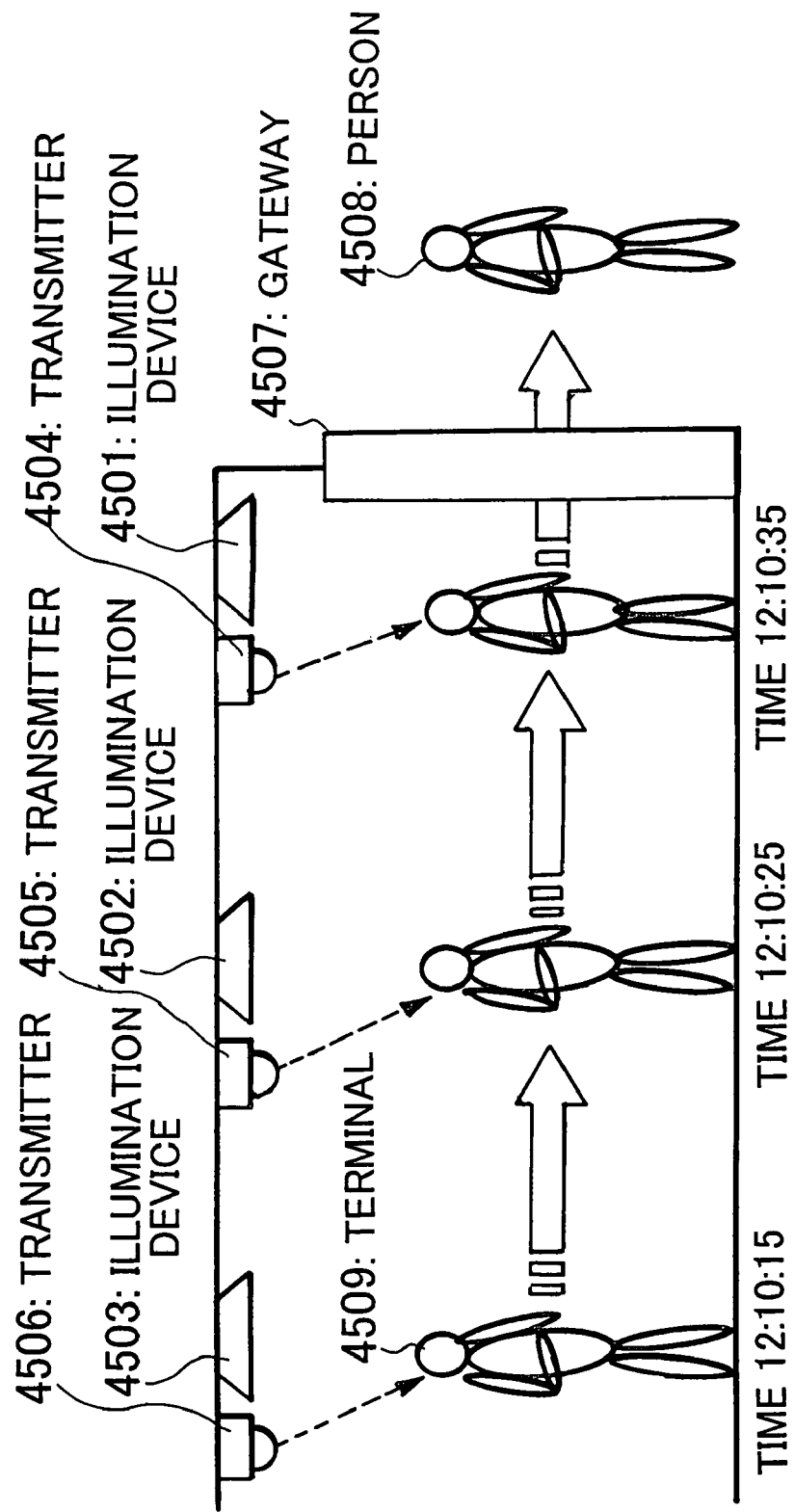
FIG. 48 is a view for explaining the principle of detection of entering persons in the fourth embodiment of the present invention.

FIG. 48 is a view for explaining the principle of detection of leaving persons.

Figure 49:
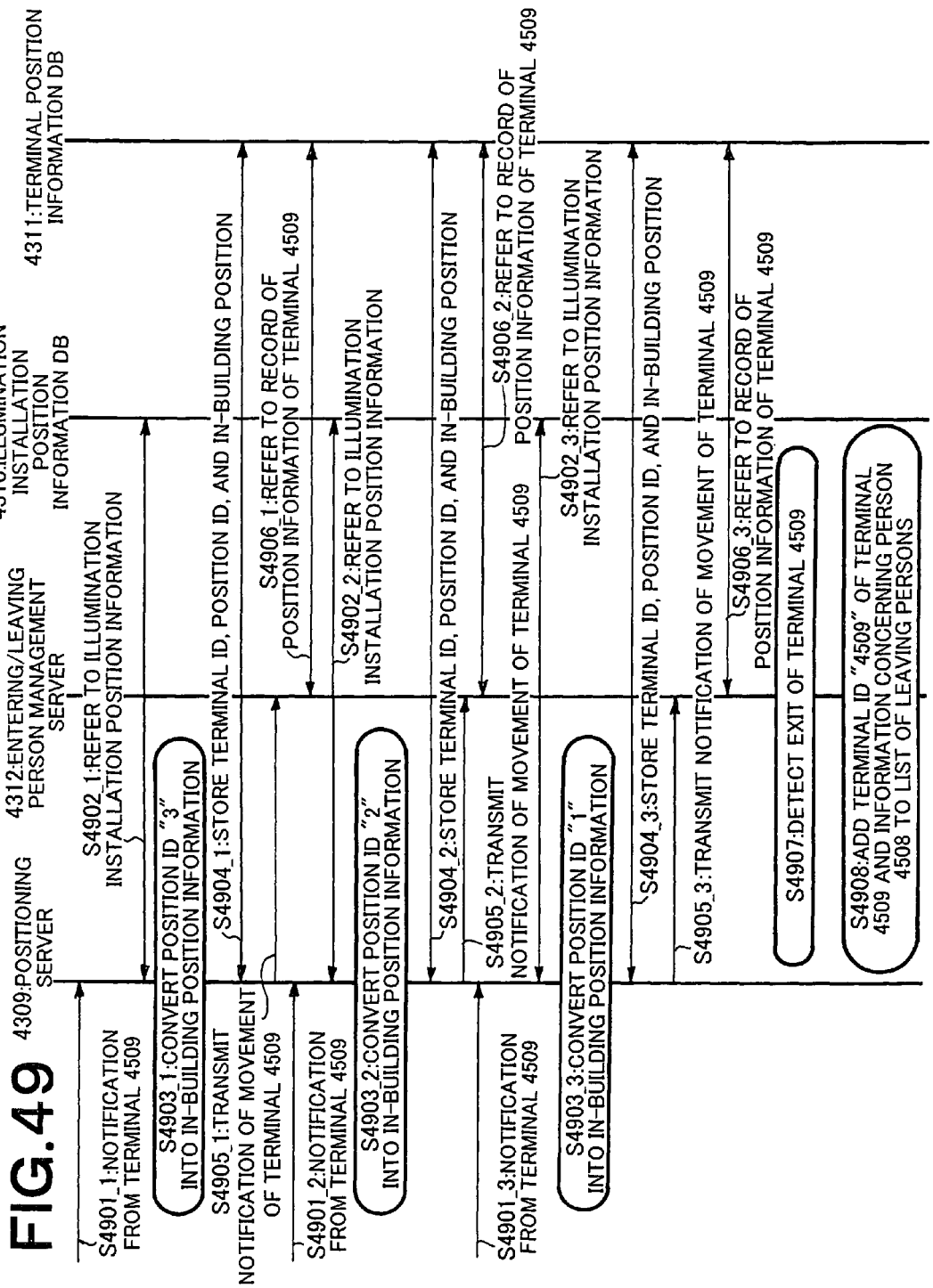
FIG. 49 is a view showing an operation sequence occurring at the leaving person detection time in the fourth embodiment of the present invention.

FIG. 49 is a view showing an overview of an operation sequence of the positioning server 4309 and entering/leaving person management server 4312 occurring when the person 4508 leaves the building, and FIG. 50 is a table showing the information of the terminal 4509 stored in the terminal position information DB 4311 at that time.

When the person 4508 moves from the interior of the building to the gateway 4507 and enters a predetermined area, the terminal 4509 receives the position ID "3" that the transmitter 4506 is transmitting and notifies the positioning server 4309 of the terminal ID "4509" and position ID "3" (S4901_1). The positioning server 4309 refers to the illumination installation position information DB 4310 (S4902_1) and converts the position ID "3" into the in-building position information "10 m from gate way 4507" (S4903_1).

After that, the positioning server 4309 stores the position ID and in-building position information in the terminal position information DB 4311 in association with the terminal ID (S4904_1). At the same time, the positioning server 4309 notifies the entering/leaving person management server 4312 of the movement of the terminal 4509 (S4905_1).

Upon receiving the notification, the entering/leaving person management server 4312 refers to the terminal position information DB 4311 to confirm the record of the position information of the terminal 4509 (S4906_1). Data is added to the fields 5002_1 and 5003_1 at this stage, and the entering/leaving person management server 4312 recognizes that the terminal 4509 has been detected at the position 10 m from the gateway 4507 at 12:10:15.

When the person 4508 further moves toward the gateway 4507 and enters a predetermined area, the terminal 4509 receives position ID "2" that the transmitter 4505 is transmitting. The same sequence (S4901_2 to S4906_2) as that described above is executed at this time. At this stage, data is added to the fields 5002_2 and 5003_2 in the terminal position information DB, and the entering/leaving person management server 4312 detects that the terminal 4509 that had been detected at the position 10 m from the gateway 4507 at 12:10:15 has moved 5 m toward the gateway 10 seconds after the first detection.

When the person 4508 further moves toward the gateway 4507 and enters a predetermined area, the terminal 4509 receives position ID "1" that the transmitter 4504 is transmitting. The same sequence (S4901_3 to S4906_3) as that described above is executed at this time. At this stage, data is added to the fields 5002_3 and 5003_3 in the terminal position information DB, and the entering/leaving person management server 4312 detects that the terminal 4509 that had been detected at the position 10 m from the gateway 4507 at 12:10:15 has moved 5 m toward the gateway 4507 10 seconds after the first detection and has reached the position just near the gateway 4507 10 seconds after the second detection. At this stage, the entering/leaving person management server 4312 determines that the terminal 4509 has left the building (S4907) and adds the terminal ID "4509" and time (in this case, 12:10:35) at which the exit of the terminal 4509 has been determined to the list of leaving persons.

Figure 52:
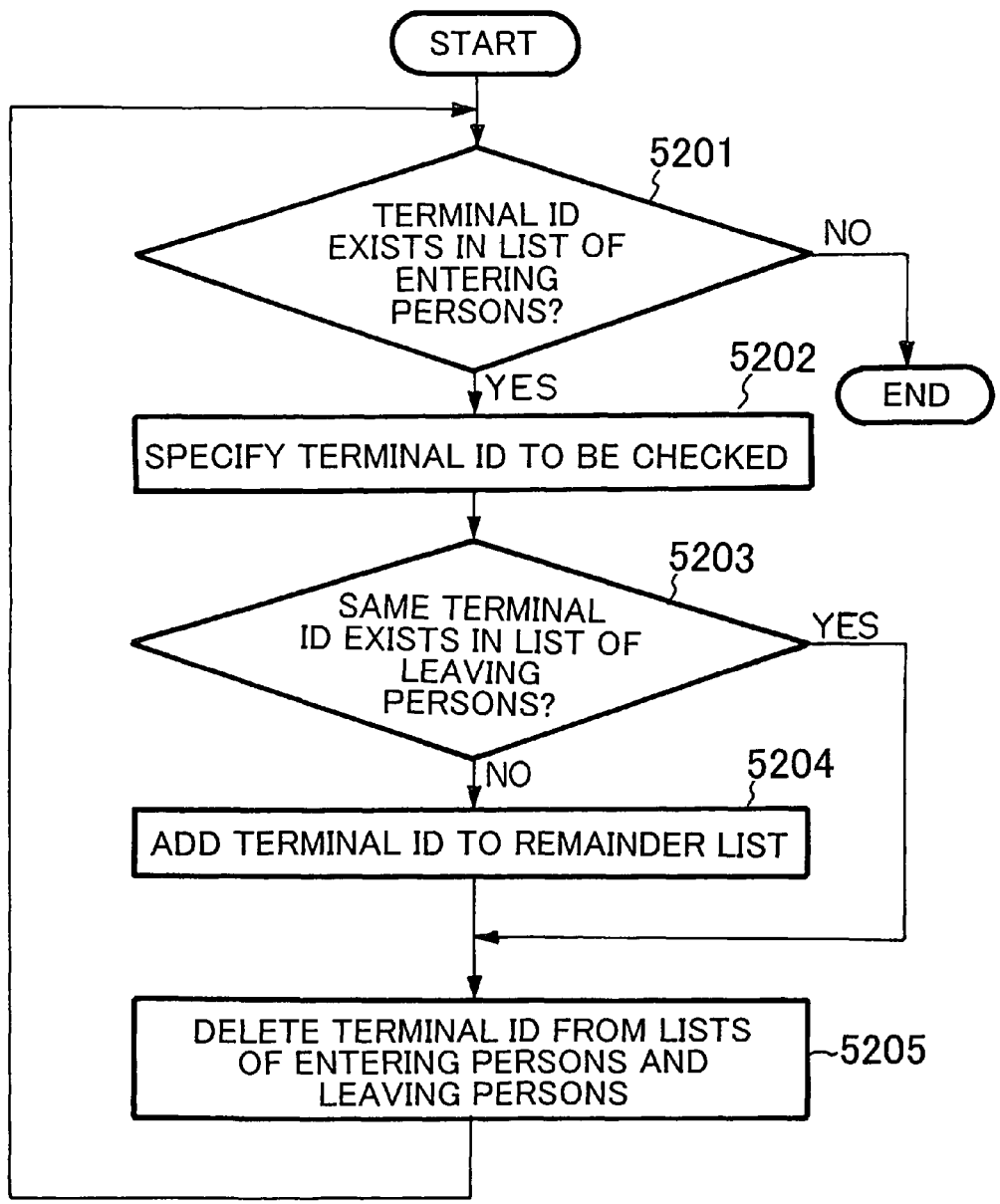
FIG. 52 is a process flow occurring when a system controller creates a remainder list in the fourth embodiment of the present invention.

FIG. 52 is a process flow occurring when the system controller 4201 creates a remainder list.

The system controller 4201 refers to the list of entering persons to check whether any terminal ID exists in the list (5201). In the case where any terminal ID is listed in the list of entering persons, the system controller 4201 specifies the terminal ID to be checked (5202) and checks whether the same terminal ID is listed in the list of leaving persons (5203). In the case where the same terminal ID is listed in the list of leaving persons, the system controller 4201 deletes the checked terminal ID from the lists of entering persons and leaving persons and returns to step 5201 (5205). In the case where the same terminal ID is not listed in the list of leaving persons, the system controller 4201 records the checked terminal ID in the remainder list (5204) and executes processing of step 5205.

The system controller 4201 refers to the terminal position information DB 4311 to thereby identify the position of the remainder. Specifically, the system controller 4201 searches information using the terminal ID added to the remainder list as a key and specifies the latest one from the position information associated with the terminal ID as the present position.

First Modification

As a modification, a configuration in which it is determined that a person has left the building when it is detected that the person exists at a given point outside the building may be adopted.

Figure 53:
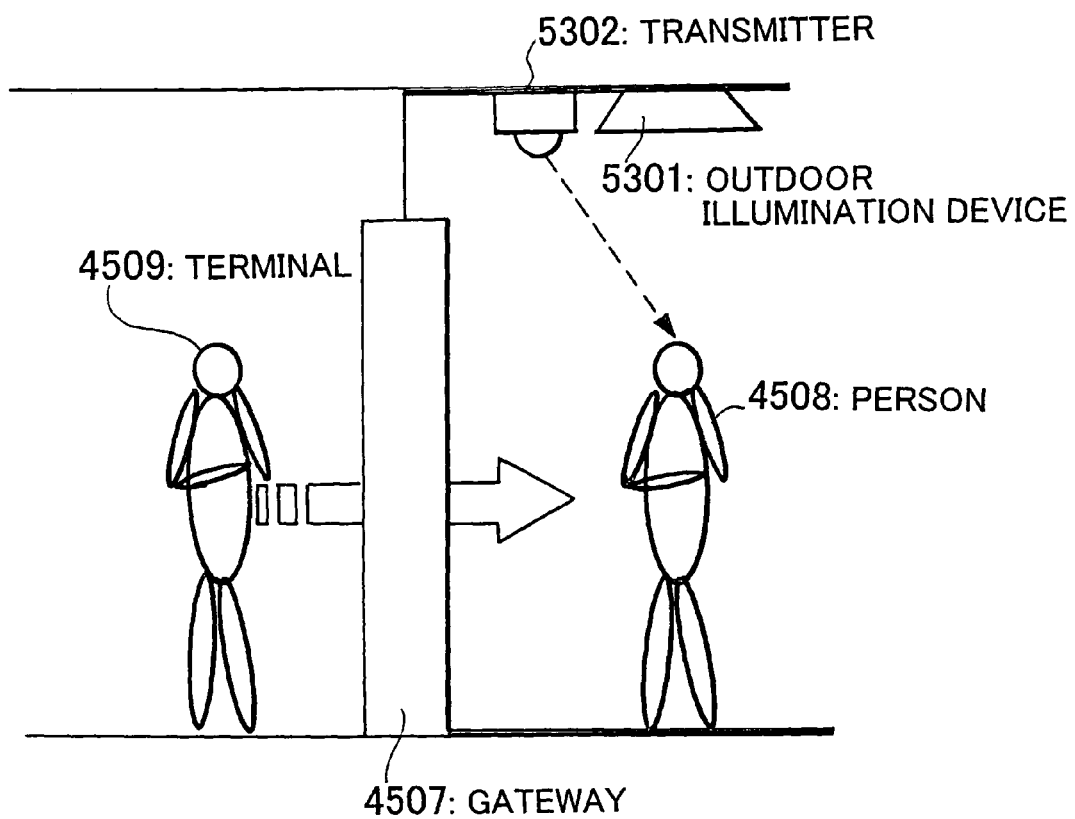
FIG. 53 is a view showing the principle of detection of leaving persons in a first modification of the fourth embodiment.

FIG. 53 is a view for explaining the method of detecting the leaving persons according to the present modification.

An outdoor illumination device 5301 is provided outside the gateway 4501 of the building, and transmitter 5302 is set adjacent to the illumination device.

When the person 4508 passes through the gateway 4507 and leaves the building, the terminal 4509 receives the position ID that the transmitter 5302 is transmitting. The terminal 4509 notifies the positioning server 4309 of the received position ID. The positioning server 4309 detects that the terminal 4509 has received a signal from the transmitter 5302 set outside the building and notifies the entering/leaving person management server 4312 of the detected information.

Upon receiving the notification, the entering/leaving person management server 4312 determines that terminal 4509 has left the building and adds the detection time and terminal ID of the terminal 4509 to the list of leaving persons.

Second Modification

In the fourth embodiment, the position ID that the transmitter set outside the building is transmitting is received by the terminal carried by the person, then notified to the positioning server, and converted into the in-building position information to thereby identify the position of the person existing in the building. However, there is a possibility that the terminal cannot receive the position ID for some reason. In order to detect the position of the terminal even in such a case, a method that uses the position of the PHS base station with which the terminal communicates is available.

Figure 54:
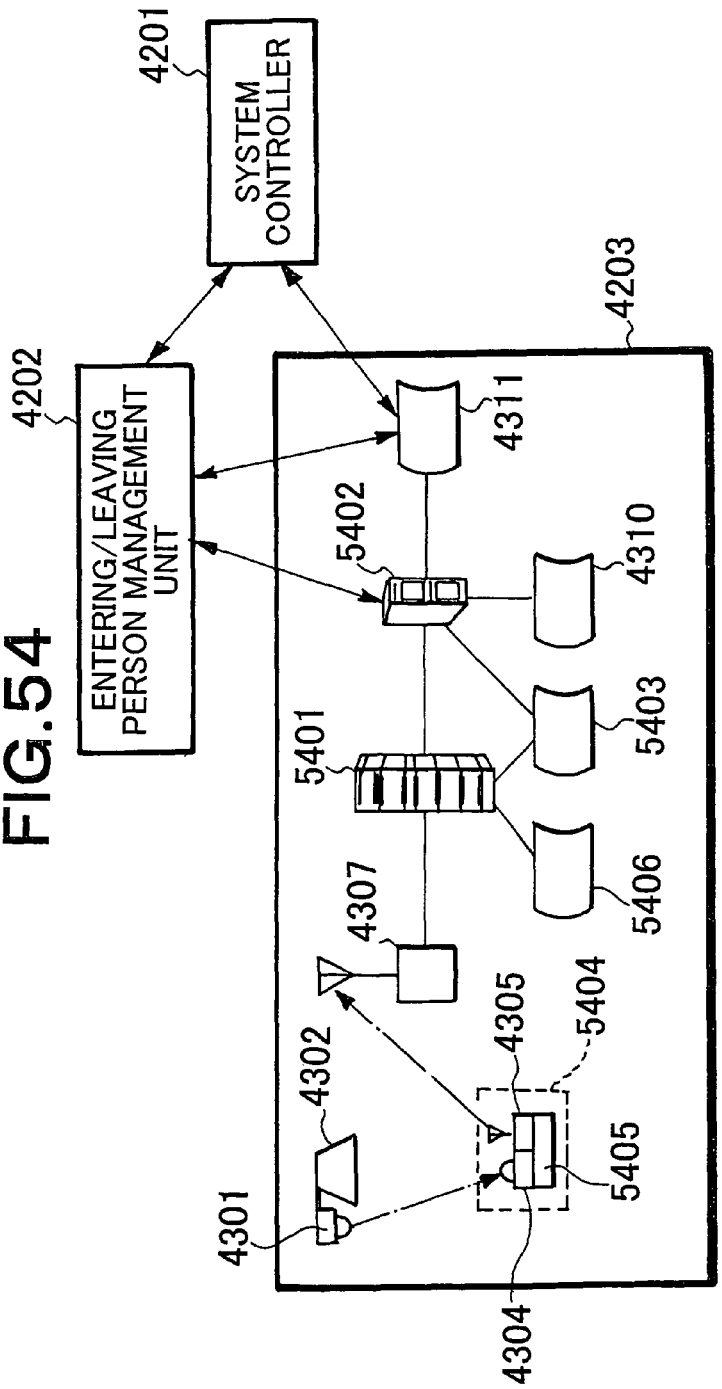
FIG. 54 is a view showing a configuration of the operator position management unit in a second modification of the fourth embodiment.

FIG. 54 is a view showing a configuration of the operator position management unit in the present modification. The components other than the switching system 5401, positioning server 5402, PHS position information DB 5403, and terminal 5404 are the same as those described in the fourth embodiment, and descriptions thereof are omitted here.

In the present modification, the terminal 5405 operates as follows.

The light signal detection unit 4304 notifies the operation controller 5405 of reception of the received position ID and the received position ID itself.

The operation controller 5405 stores the time (hereinafter, referred to as reception time) at which the position ID has been notified from the light signal detection unit 4303 and the position ID itself.

The operation controller 5405 requires the PHS transmitter 4305 to transmit the stored reception time and position ID. This transmission request is made at specified intervals.

The operation controller 5404 requests the PHS transmitter 4350 to transmit the signal even when it does not hold the information of reception time and position ID. In this case, a signal representing "NULL" is transmitted.

A signal from the terminal 5405 is relayed by the PHS base station 4307 and received by the switching system 5401. At this time, the switching system 5401 recognizes that the PHS base station 4307 relays the signal and refers to the base station installation position DB 5406 to acquire the installation position of the PHS base station 4307. After that, the switching system 5401 combines the terminal ID of the terminal 5404 and installation position information of the PHS base station 4307 so as to store them in the PHS position information DB 5403.

After being relayed by the PHS base station 4307 and received by the switching system 5401, the signal from the terminal 5404 is transferred to the positioning server 5402. In the case where the position ID is included in the signal notified from the terminal 5404, the positioning server 5402 performs the same operation as that of the positioning server 4309 in the fourth embodiment.

In the case where the signal transmitted from the terminal 5405 is "NULL", the positioning server 5402 refers to the PHS position information DB 5403 to acquire the information of the installation position of the PHS base station 4307 that has relayed the signal from the terminal 5405. After that, the positioning server combines the terminal ID of the terminal 5404 and installation position of the PHS base station 4307 so as to store them in the terminal position information DB 4311.

Although the illumination device is installed to the ceiling for illumination purpose in the present embodiment and the modification thereof, it may be, e.g., an emergency exit sign lighting that is not used for illumination purpose. Further, the transmitter and illumination device may be independently provided.

Fifth Embodiment

Although the entering or leaving is detected based on the record of a change in the position of the person in the fourth embodiment, there is a possibility that the terminal cannot receive the position ID that the transmitter is transmitting near the gateway for some reason. In this case, the entering persons and leaving persons cannot accurately be detected with the result that the lists of entering persons and leaving persons become inaccurate. It follows that the remainder list becomes inaccurate. This problem can be solved by combining an entering/leaving person management system using a noncontact card and a system of detecting the leaving persons using a record of a change in the position of the persons.

Figure 55:
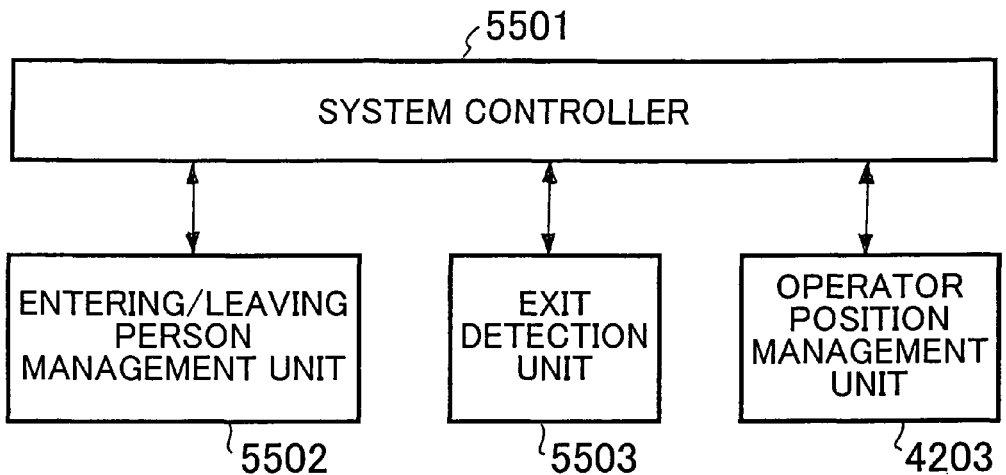
FIG. 55 is a view schematically showing the positioning system in a fifth embodiment of the present invention.

FIG. 55 is a view schematically showing a system according to the fifth embodiment of the present invention.

The system according to the fifth embodiment includes a system controller 5501, an entering/leaving person management unit 5502, and operator position management unit 4203. The operator position management unit 4203 is the same as that described in the fourth embodiment, and the description thereof is omitted here.

Figure 56:
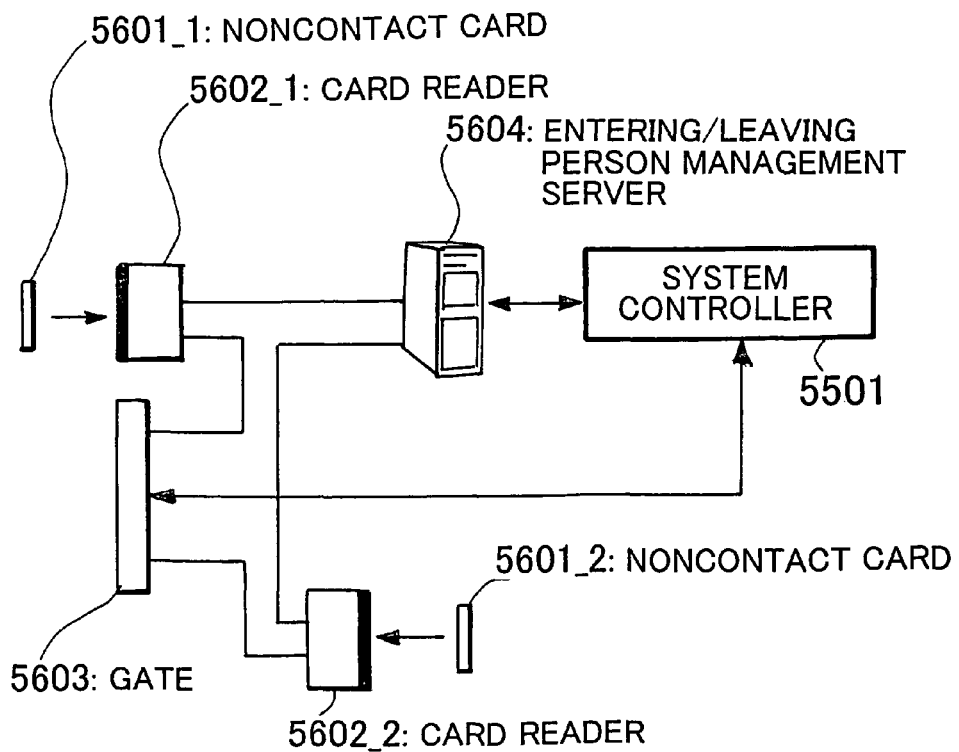
FIG. 56 is a view showing a configuration of an entering/leaving person management unit in the fifth embodiment of the present invention.

FIG. 56 is a view showing a configuration of the entering/leaving person management unit 5502.

The entering/leaving person management unit 5502 includes a noncontact card 5601, a card reader 5602, a gate 5603, and an entering/leaving person management server 5604.

The noncontact cards 5601_1 and 5601_2 are carried by all persons entering and leaving the building and store information for identifying respective persons.

The card readers 5602_1 and 5602_2 are set inside and outside the building. When a person enters the building, the card reader 5602_1 reads out information of the noncontact card 5601_1 carried by the entering person. When a person leaves the building, the card reader 5602_2 reads out information of the noncontact card 5601_2 carried by the leaving person. When the readout of the information from the noncontact cards 5601_1 or 5601_2 succeeds, the card reader 5602_1 or 5602_2 opens the gate 5603 to allow the person to enter or leave the building. At the same time, the card reader 5602_1 or 5602_2 notifies the entering/leaving person management server 5604 of the information read out from the non-contact card 5601_1 or 5601_2.

The entering/leaving person management server 5604 creates a list of entering persons based on the information notified from the card reader 5602_1 and creates a list of leaving persons based on the information notified from the card reader 5602_2. The entering/leaving person management server 5604 controls the gate 5603 depending on the situation to open/close the gate.

Figure 57:
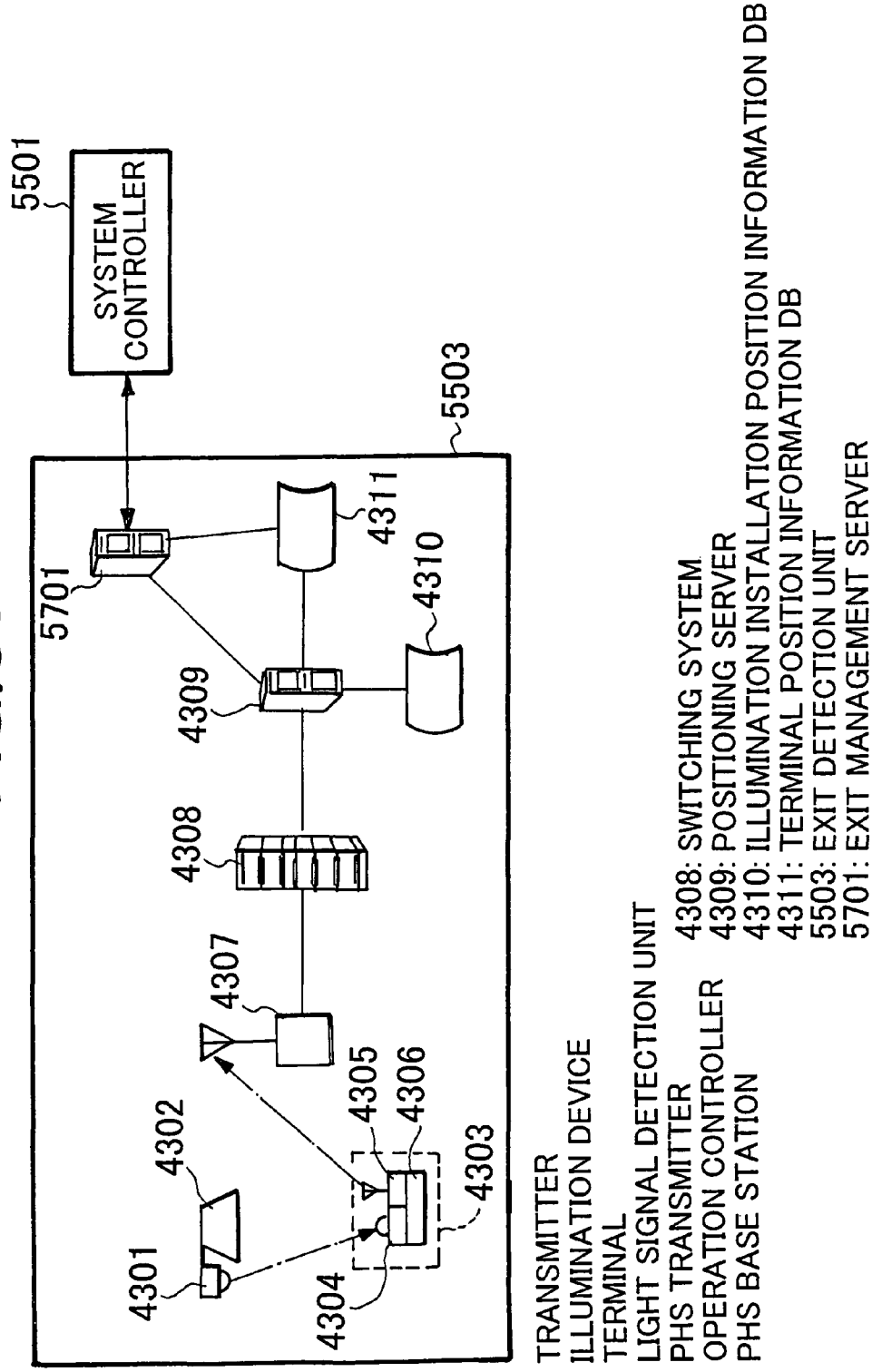
FIG. 57 is a view showing a configuration of a leaving person detection unit in the fifth embodiment of the present invention.

FIG. 57 is a view showing a configuration of the exit detection unit 5503. The components other than an exit management server 5701 are the same as those shown in FIG. 43. The operation of the exit management server 5701 is the same as that of the entering/leaving person management server 4312 which has been described in the fourth embodiment with reference to FIGS. 48 and 49. As a method of detecting leaving persons, the first modification of the fourth embodiment may be used.

Subsequently, identification of the position of the remainder in the system according to the fifth embodiment will be described below. In a normal state, the operation of the system according to the fifth embodiment performed in identifying the position of the remainder in the building is the same as that shown in FIG. 51.

Figure 58:
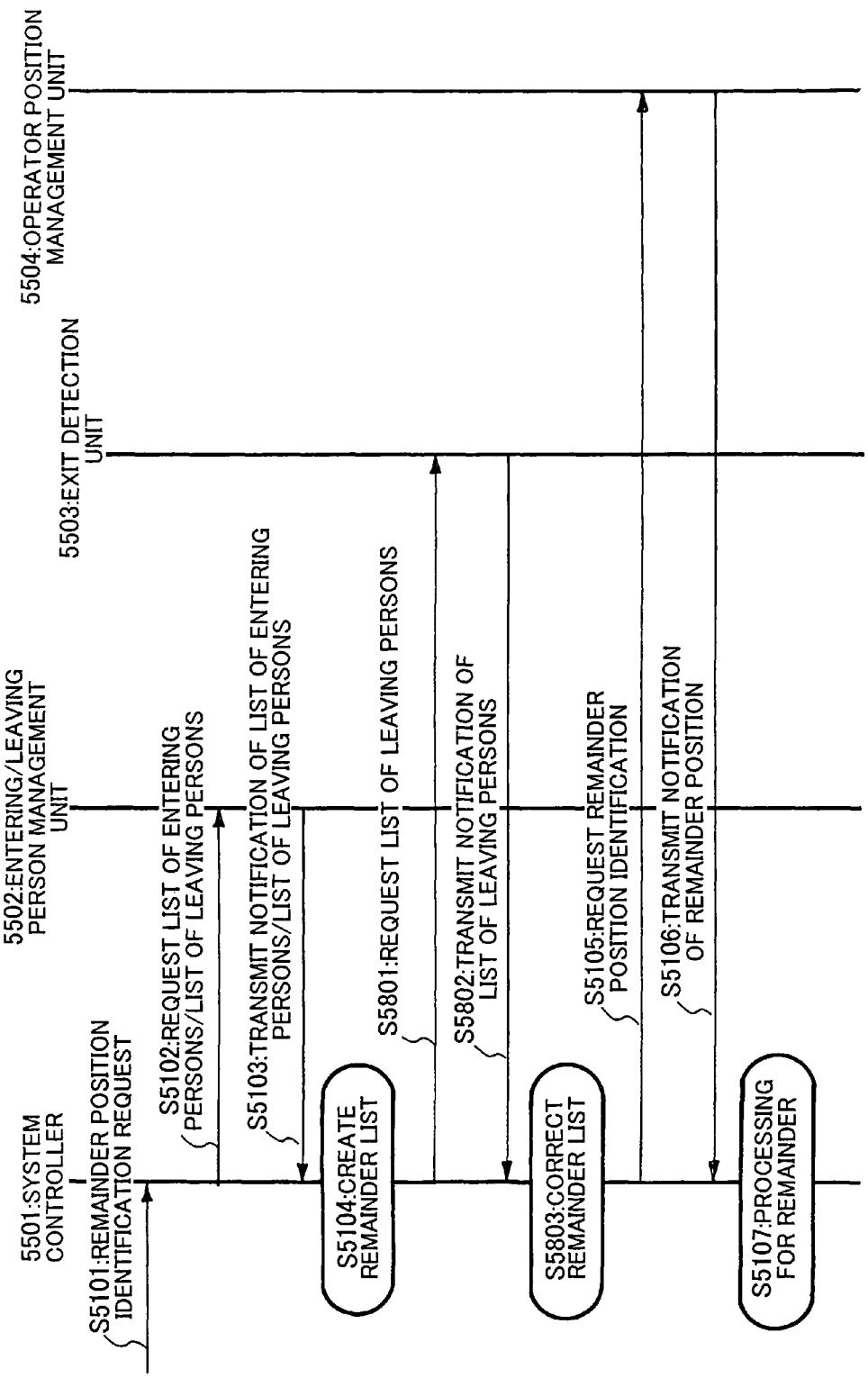
FIG. 58 is a view schematically showing an operation sequence of the positioning system in the fifth embodiment of the present invention.

FIG. 58 is a view showing an operation sequence of the system according to the fifth embodiment occurring when the position of the remainder is identified in an abnormal state. "Abnormal state" means a condition in which the gate 5603 is opened and thereby the card reader 5602_2 cannot read out information from the noncontact card carried by a person leaving the building. An example of such a case includes a state in which a disaster such as fire occurs and the highest priority is placed on the evacuation of the remainders in the building.

The operation sequence from S5101 to S5104 is the same as that described in the fourth embodiment, and the description thereof is omitted here.

In the case of the fifth embodiment, the remainder list created in S5104 includes persons that have entered the building using the contact card but have left the building without using the noncontact card. In order to delete such persons from the remainder list, the system controller 5501 requires the exit detection unit 5503 to transmit a list of leaving persons thereto (S5801). Upon receiving the request, the exit detection unit 5503 notifies the system controller 5501 of the list of leaving persons (S5802). Upon receiving the notification, the system controller 5501 deletes information of persons listed in the list of leaving persons notified from the exit detection unit 5503 from the remainder list (S5803).

The operation sequence from S5105 to S5107 is the same as that described in the fourth embodiment, and the description thereof is omitted here.

Although the illumination device is installed to the ceiling for illumination purpose in the present embodiment and the modification thereof, it may be, e.g., an emergency exit sign lighting that is not used for illumination purpose. Further, the transmitter and illumination device may be independently provided.

Sixth Embodiment

As an embodiment different from those of first and second embodiments, a management system of the position of a moving body represented by a carrier means such as a forklift used in a warehouse will be described. In this embodiment, the same reference numerals as the above embodiments are given to the components which are common to the above embodiments, and the overlapped description is omitted. The configuration of the present embodiment is basically the same as that of the first embodiment, and this embodiment will be described mainly in a different part from the first embodiment.

Figure 66:
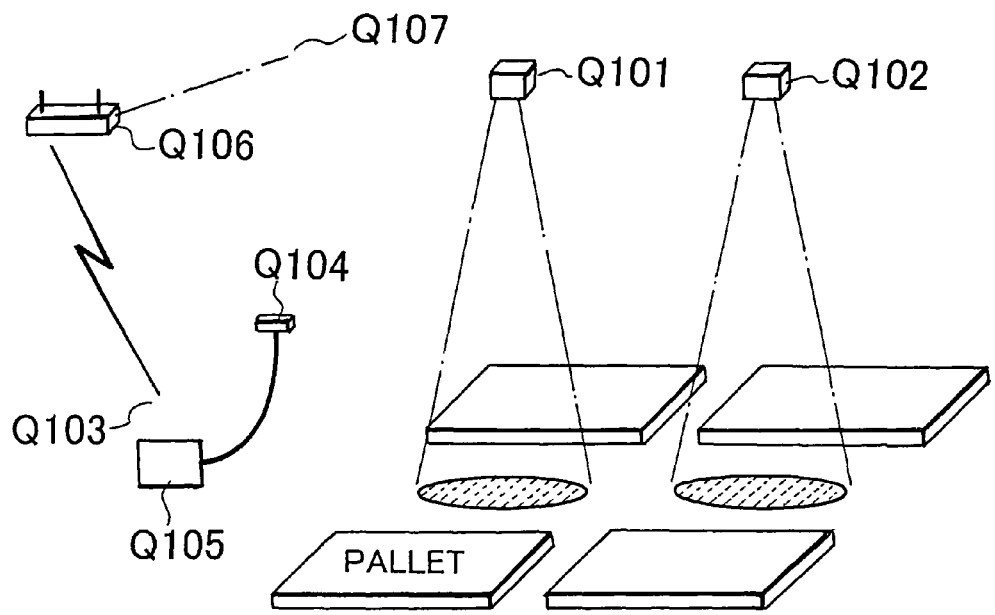
FIG. 66 is a view showing a configuration example of a position management system (positioning system) for a moving body used in a warehouse in a sixth embodiment of the present invention.

FIG. 66 shows a configuration view of the present embodiment. It is assumed that a system of the present embodiment utilizes a transmission unit that uses a light signal, in particular, an infrared ray to transmit an ID.

In FIG. 66, unique information transmitted from the transmission units Q101 and Q102 are received by the light signal detection unit Q104 which is attached to a forklift Q103 with its light receiving surface facing upward and is then notified to the terminal Q105. The terminal Q105 notifies the positioning server Q107 of the unique information notified from the light signal detection unit Q104 through the base station Q106. The configurations and operations of the light signal detection unit Q104 and terminal Q105 are the same as those described in the first embodiment.

In the present embodiment, if the transmission area of a plurality of transmission units Q101 can cover the entire warehouse to be managed, the position of the forklift Q103 can always be captured.

Figure 67:
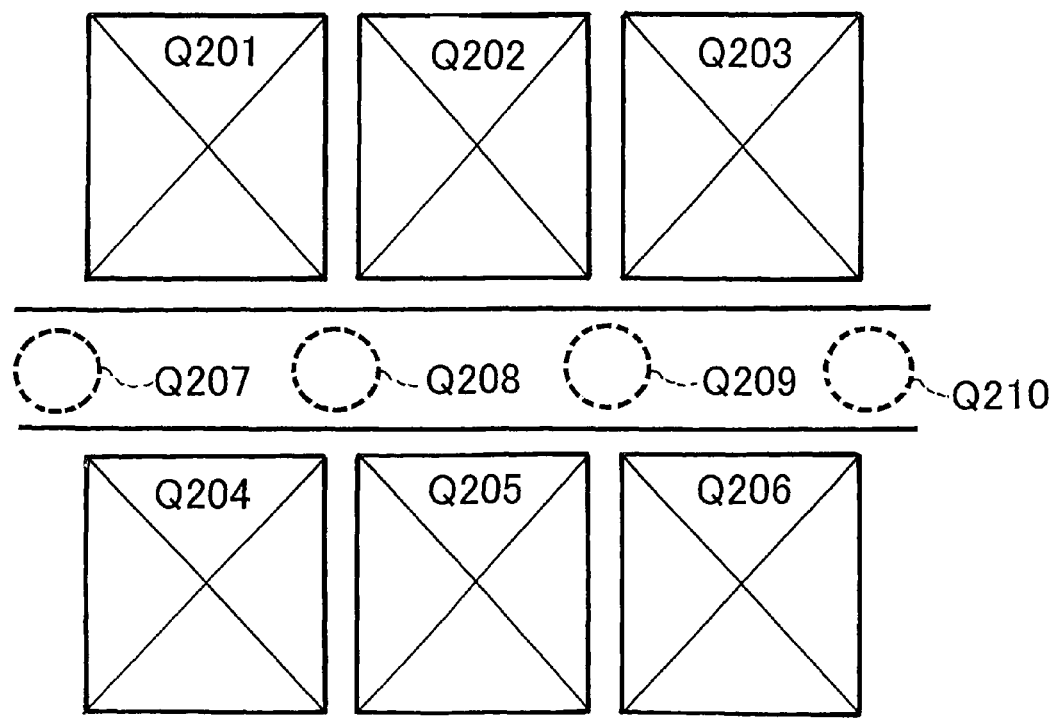
FIG. 67 is a view showing an example of arrangement of the transmission units in the case where position management is conducted by dividing a warehouse into a plurality of zones in the sixth embodiment of the present invention.

In the case where it is only necessary to grasp only a zone where the forklift exists, the transmission units Q101 may be disposed only above aisles. FIG. 67 shows a warehouse as viewed from the above.

In FIG. 67, Q201 to Q206 are zones where the forklift can exist. It is assumed that an aisle through which the forklift passes extends between the zones Q201 to Q203 and zones Q204 to Q206 and that the forklift cannot enter and leave the respective zones without passing though this aisle.

Transmission areas Q207 to Q210 are set at the positions above the aisle. With this arrangement, a zone where the forklift exists can be narrowed down by analyzing unique information received by the forklift. For example, in the case where the forklift receives unique information of the transmission areas Q207 and Q208, it can be determined that the forklift exists in the zone Q202 or Q205, or on the aisle between the zones Q202 and Q205.

Figure 68:
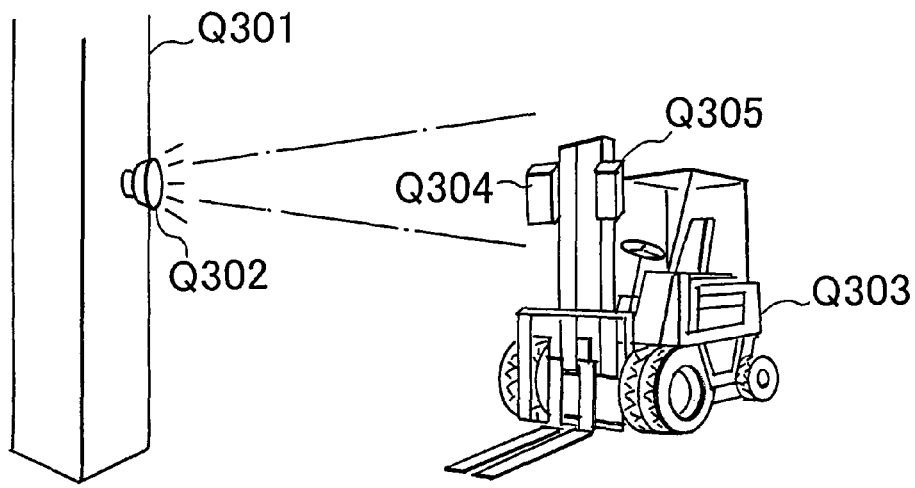
FIG. 68 is a view showing a case where the transmission unit is attached to a column in the warehouse with its light emission surface facing sideways in the sixth embodiment of the present invention.

As a method of managing the position of the forklift in the warehouse, although the unique information is transmitted from the ceiling in the example of FIG. 66, the unique information may be transmitted from a column in the horizontal direction as shown in FIG. 68. In this case, the transmission unit Q302 is attached to a column Q301 in the warehouse with its light emission surface facing sideways.

Correspondingly, the light signal detection unit Q304 is attached to the forklift Q303 with its light receiving surface facing sideways. As shown in FIG. 68, two light signal detection units Q304 and Q305 may be attached to the forklift Q303 with their light receiving surface facing to the right and left respectively with respect to the movement direction of the forklift Q303. By determining which light signal detection unit has received the unique information from the transmission unit Q302 in this configuration, it is possible to detect the direction in which the forklift Q303 faces with respect to the transmission unit Q302.

In the case where the transmission unit is attached to a column with its light emission surface facing to sideways as shown in FIG. 68, management of the position of the forklift is operated as in the manner described below with reference to FIG. 69.

Figure 69:
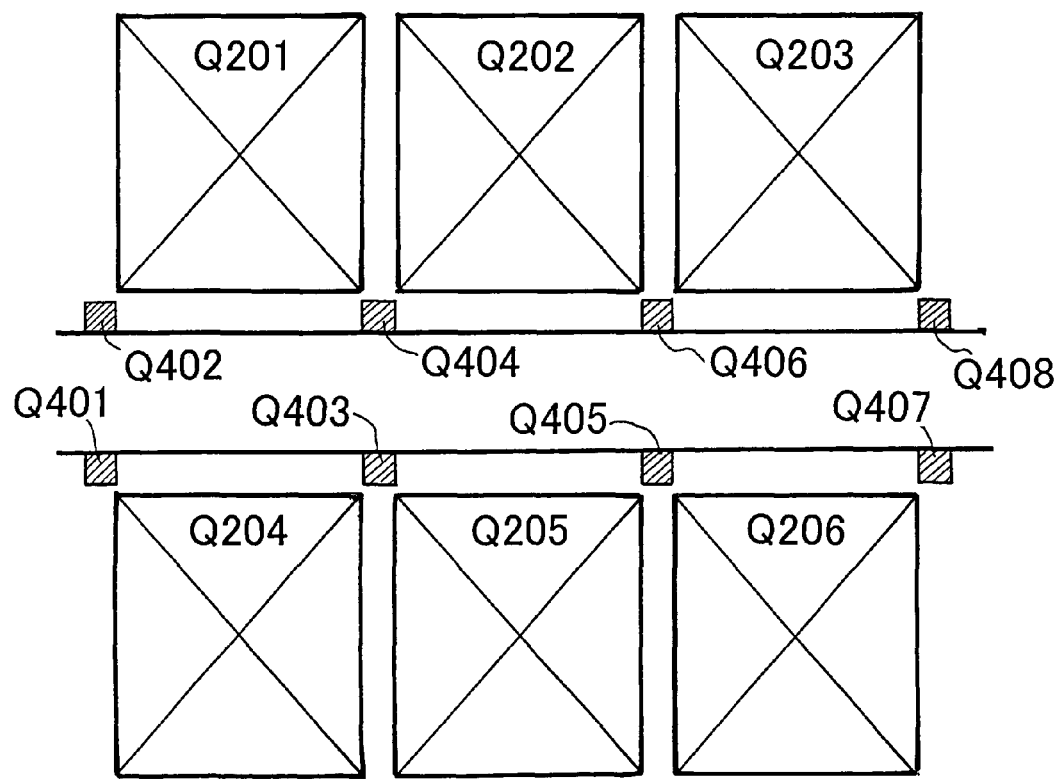
FIG. 69 is a view showing another example of arrangement of the transmission units in the case where position management is conducted by dividing a warehouse into a plurality of zones in the sixth embodiment of the present invention.
Figure 70:
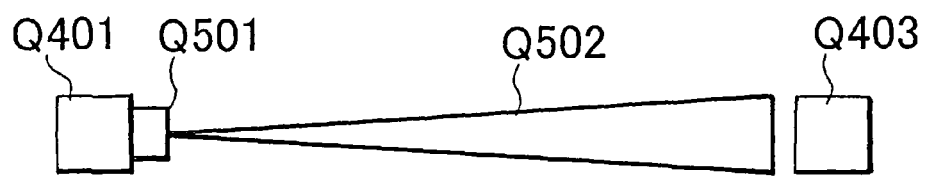
FIG. 70 is a view showing a case where a transmission unit is attached to a column in the sixth embodiment of the present invention.

FIG. 69 shows an example in which the position of the forklift is managed in a zonal manner as in the case of the example of FIG. 67. In the example of FIG. 69, columns Q401 to Q408 exist on both sides of the aisle. It is assumed that a transmission unit is attached to the column Q401 and the transmission unit transmits unique information toward the column Q403. FIG. 70 shows, in an enlarged manner, the columns Q401 and Q402. As shown in FIG. 70, a transmission unit Q501, which is attached to the column Q401, transmits unique information toward the column Q403. Q502 represents an area within which the unique information transmitted from the transmission unit Q501 can be received.

As shown in FIG. 70, a transmission power of the transmission unit Q501 is controlled so that the area Q502 does not outreach the column Q403. As a result, when a light signal detection unit attached to the forklift receives the unique information transmitted from the transmission unit Q501, it is possible to detect that the forklift has entered or left the zone Q204.

It is assumed, as shown in FIG. 68, that the two light signal detection units Q304 and Q305 are attached to the forklift Q303 with their light receiving surface facing to the right and left respectively with respect to the movement direction of the forklift Q303. In this case, when the light signal detection unit Q304 (facing to the right) receives the unique information transmitted from the transmission unit Q501 shown in FIG. 70, it is possible to determine that the forklift Q303 has entered the zone Q204.

Similarly, when the light signal detection unit Q305 (facing to the left with respect to the movement direction of the forklift Q303) receives the unique information transmitted from the transmission unit Q501, it is possible to determine that the forklift has entered the zone Q204.

Figure 71:
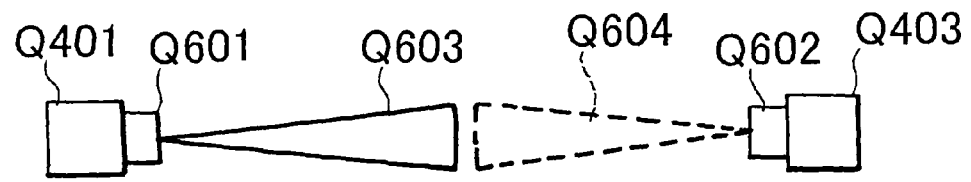
FIG. 71 is a view showing a case where a transmission unit is attached to columns standing on both sides of a zone or an aisle in the sixth embodiment of the present invention.

FIG. 71 shows another attachment method of the transmission unit to the column. In FIG. 71, transmission units Q601 and Q602 are attached facing each other to columns 401 and 403 respectively and transmit unique information to each other. Q603 and Q604 represent the unique information transmission area of the respective transmission units. This configuration facilitates power control of the transmission unit.

That is, in the configuration shown in FIG. 70, it is necessary to control the transmission power so that the area within which the unique information from the transmission unit Q501 can be received does not outreach the column Q403. If the transmission power is too weak, an area where the unique information cannot be received is generated in a zone between the columns Q401 and Q403 at a position near the column Q403, which may prevent the detection of entering/leaving of the forklift. Therefore, in the configuration of FIG. 70, the transmission power of the transmission unit Q501 must accurately be controlled.

On the other hand, in the case where the unique information is transmitted respectively from the transmission units Q601 and Q602 attached to the columns on both sides of the zone Q204 as shown in FIG. 71, it is possible to determine that the forklift Q303 has entered or left the zone in the case where the forklift Q303 receives one or both unique information, so that there is no problem even if the transmission areas of the transmission areas Q603 and Q604 are overlapped with each other to some degree. This configuration facilitates power control of the transmission units Q601 and Q602.

However, in the case where the forklift Q303 moves backward in the configurations which have been described with reference to FIGS. 68 to 71, it becomes impossible to detect the entering or leaving of the forklift into/from the zone based on only the direction of the light signal detection unit that has received unique information. Therefore, additional information indicating whether the forklift is moving forward or backward becomes necessary. Further, in this case, the movement of the forklift can be determined based on the history of the unique information that the light signal detection unit attached to the forklift has received.

For example, in the case where the light signal detection unit attached to the forklift Q303 receives unique information transmitted to the area between the columns Q401 and Q403 after receiving unique information transmitted to the area between the columns Q401 and Q402, it can be determined that the forklift Q303 has entered the zone Q204 from the aisle. In the case where the light signal detection unit attached to the forklift Q303 receives unique information transmitted to the area between the columns Q401 and Q403 after a given time has elapsed from the detection of the entering into the zone Q204, it can be estimated that the forklift Q303 has left the zone Q204. In this case, when the light signal detection unit attached to the forklift Q303 receives unique information transmitted between other pair of columns, it can reliably be determined that the forklift has left the zone Q204.

When the transmission unit transmits unique information to the area between the column Q401 and Q402 standing across the aisle in the configurations shown in FIGS. 70 and 71, it becomes possible to identify the position on the aisle where the forklift Q303 exists.

Although a forklift is taken as an example of a target of position management in the configurations shown in FIGS. 66 to 71, the present invention can also be applied to a case where an operator carries a terminal device such as a PDA (Personal Digital Assistant) provided with the light signal detection unit or a case where the light signal detection unit is attached to a helmet. Further, the location where the position management is implemented is not limited to the warehouse, but can be implemented in various indoor environments such as a factory and an event site.

As a system very similar to the system described using FIGS. 68 to 71, a system that detects entering/leaving of a person by detecting interruption of a light using an infrared ray sensor is known. However, the system according to the present invention differs from such a conventional system in the point that it can identify the forklift itself that enters a given zone. The conventional system can detect that an object has passed a given point, but cannot identify what the object is. On the other hand, the present system transmits terminal IDs assigned to respective terminals provided on the forklifts to thereby identify which forklift has entered a given zone.

INDUSTRIAL APPLICABILITY

As has been described above, the present invention is applicable to a positioning system that identifies the position of a wireless terminal, a positioning method, and a positioning program. In particular, for example, the present invention is applicable to a system allowing a positioning system using a wireless LAN and positioning system using an illumination device to work together in a switchable manner, a system that utilizes a positioning system using an illumination device to identify the position of a remainder in a building, or a position management system of a moving object represented by a carrier means such as a forklift used in a warehouse.

The invention claimed is:

1. A positioning system for detecting the position of a mobile terminal, comprising:
an illumination device configured to transmit a signal including a unique information from a given installation position;
a mobile terminal communicably connected to the illumination device and configured to extract the unique information from the signal transmitted from the illumination device; and
a position estimation device communicably connected to the mobile terminal and receiving the unique information from the terminal, the position estimation device being configured to estimate a position of the mobile terminal based on an illumination installation position information and the unique information received by the mobile terminal, said illumination installation position information including the unique information and a position coordinate information indicating the installation position of the illumination device in association with each other,
wherein the position estimation device is configured to:
read out from the illumination installation position information the position coordinate information corresponding to the unique information based on one or more unique information, which uniquely identifies the illumination device extracted by the mobile terminal within a past predetermined time period;
estimate the position of the mobile terminal based on the read out position information,
add a weighting value to one or more unique information received by the mobile terminal within a past predetermined time based on the reception time of the respective unique information; and
estimate the position of the mobile terminal based on unique information selected based on a result of the addition; and
wherein the position estimation device is configured to estimate the position of the terminal based on most frequently received unique information among one or more unique information received by the terminal within a past predetermined time period.

2. The positioning system according to claim 1, wherein the position estimation device is configured to estimate the position of the terminal based on the unique information received by the terminal most recently.

3. The positioning system according to claim 1, wherein:
the illumination device comprises a light emission unit for emitting an illumination light and a transmission unit for transmitting the unique information;
the transmission unit comprises a white LED for emitting a visible light signal; and
the white LED is configured to transmit the unique information on the visible light signal.

4. The positioning system according to claim 1, wherein:
the illumination device comprises a light emission unit for emitting an illumination light and a transmission unit for transmitting the unique information;
the transmission unit comprises an infrared LED for emitting an infrared ray signal; and
the infrared LED is configured to transmit the unique information on the infrared ray signal.

5. The positioning system according to claim 1, wherein:
the illumination device comprises a light emission unit for emitting an illumination light and a transmission unit for transmitting the unique information;
the transmission unit comprises a wireless communication unit for transmitting a radio signal; and
the wireless communication unit is configured to transmit the unique information on the radio signal.

6. The positioning system according to claim 1, wherein the transmission unit is configured to transmit the unique information to the terminal at random timing.

7. The positioning system according to claim 1, wherein the illumination installation position information is configured to be created by associating the unique information collected by the terminal and installation position of the illumination device with each other.

8. The positioning system according to claim 1, wherein:
the positioning system further comprises a second positioning system; and
the positioning system and second positioning system can be operated in a switchable manner.

9. The positioning system according to claim 8, wherein the second positioning system is a positioning system using a wireless LAN.

10. The positioning system according to claim 8, wherein the positioning system is configured to identify the position of the terminal by using the unique information that the illumination device transmits, in the case where requested terminal position information is logical position information.

11. The positioning system according to claim 8, wherein the positioning system is configured to identify the position of the terminal by using the second positioning system, in the case where the positioning system could not identify the position of the terminal by using the unique information.

12. The positioning system according to claim 8, wherein the positioning system is configured to determine whether to identify the position of the terminal by using the unique information or by using the second positioning system, based on the type of the requested terminal position information.

13. The positioning system according to claim 1, wherein the positioning system is configured to display acquired terminal position information and to reacquire terminal position information depending on the accuracy of the acquired terminal position information.

14. The positioning system according to claim 1, wherein the positioning system has a function of storing attribute information concerning the terminal and of displaying the position information of the terminal corresponding to specified attribute information.

15. The positioning system according to claim 14, wherein the positioning system is configured to store, as the attribute information of the terminal, a name of a department to which a terminal user belongs.

16. The positioning system according to claim 13, wherein the positioning system is configured to display the terminal position information corresponding to a specified display condition and to specify, as the display condition, information of floors in which the terminal exists.

17. The positioning system according to claim 1, wherein the positioning system is configured to:
identify a user terminal in response to a position information request concerning a user of the terminal;
acquire the position information of the identified terminal; and
select one terminal in order of priority set for the respective terminals to acquire the position information thereof, in the case where a plurality of the user terminals exist.

18. The positioning system according to claim 17, wherein the priority is configured to be determined based on the type of the terminal.

19. The positioning system according to claim 17, wherein the priority is configured to be determined such that the position information of the terminal using a wireless LAN has a higher priority.

20. The positioning system according to claim 17, wherein the priority is configured to be determined based on presence/absence of a response from the terminal.

21. The positioning system according to claim 17, wherein the priority is configured to be determined based on the use state of the terminal.

22. A positioning method of a positioning system for detecting the position of a terminal, the positioning system comprising:
an illumination device configured to transmit a signal including a unique information from a given installation position;
a terminal communicably connected to the illumination device and configured to extract the unique information from the signal transmitted from the illumination device; and
a position estimation device communicably connected to the terminal and receiving the unique information from the terminal, the position estimation device being configured to estimate a position of the terminal based on an illumination installation position information and the unique information received by the terminal, said illumination installation position information including the unique information and a position information indicating the installation position of the illumination device in association with each other, and wherein the position estimation device is configured to estimate the position of the terminal based on most frequently received unique information among one or more unique information received by the terminal within a past predetermined time period,
the positioning method comprising:
adding, by using the position estimation device, a weighting value to one or more unique information received by the terminal within a past predetermined time based on the reception time of the respective unique information;
selecting unique information from the one or more unique information based on a result of the addition by using the position estimation device;
reading out from the illumination installation position information the position information corresponding to the selected unique information, by using the position estimation device;
estimating the position of the terminal based on the read out position information by using the position estimation device; and
identifying, in the case where position detection processing can be switched between the positioning system and a second positioning system and where a terminal position information request is logical position information, the position of the terminal by using the unique information that the illumination device transmits.

23. The positioning method according to claim 22, wherein a positioning method carried out by the second positioning system is a positioning method using a wireless LAN.

24. The positioning method according to claim 22, further comprising
identifying, in the case where the position of the terminal could not be identified by using the unique information, the position of the terminal by using the second positioning system.

25. The positioning method according to claim 22, further comprising
determining whether to identify the position of the terminal using the unique information or using the second positioning system based on the type of the requested position information.

26. A positioning system for detecting the position of a terminal, the system comprising: an illumination device configured to transmit a signal including a unique information from a given installation position;
a terminal communicably connected to the illumination device and configured to extract the unique information from the signal transmitted from the illumination device; and
a position estimation device communicably connected to the terminal and receiving the unique information from the terminal, the position estimation device being configured to estimate a position of the terminal based on an illumination installation position information and the unique information received by the terminal, said illumination installation position information including the unique information and a position information indicating the installation position of the illumination device in association with each other,
wherein the position estimation device is configured to:
add a weighing value to one or more unique information received by the terminal within a
past predetermined time based on the reception time of the respective unique information;

increase the weighting value as the reception time becomes newer;

select unique information having the largest value resulting from the addition;

read out from the illumination installation position information the position information corresponding to the selected unique information; and estimate the position of the terminal based on the read out position information; and wherein the position estimation device is configured to estimate the position of the terminal based on most frequently received unique information among one or more unique information received by the terminal within a past predetermined time period.

27. A positioning system for detecting the position of a mobile terminal, comprising:

an illumination device configured to transmit a signal including a unique information from a given installation position;

a mobile terminal communicably connected to the illumination device and configured to extract the unique information from the signal transmitted from the illumination device; and a position estimation device communicably connected to the mobile terminal and receiving the unique information from the terminal, the position estimation device being configured to estimate a position of the mobile terminal based on an illumination installation position information and the unique information received by the mobile terminal, said illumination installation position information including the unique information and a position coordinate information indicating the installation position of the illumination device in association with each other, wherein the position estimation device is configured to:

read out from the illumination installation position information the position coordinate information corresponding to the unique information based on one or more unique information, which uniquely identifies the illumination device extracted by the mobile terminal within a past predetermined time period;

estimate the position of the mobile terminal based on the read out position information, add a weighting value to one or more unique information received by the mobile terminal within a past predetermined time based on the reception time of the respective unique information; and estimate the position of the mobile terminal based on unique information selected based on a result of the addition; and wherein the position estimation device is configured to estimate the position of the terminal based on most frequently received unique information among one or more unique information received by the terminal within a past predetermined time period, and wherein the positioning system is configured to:

identify a user terminal in response to a position information request concerning a user of the terminal;

acquire the position information of the identified terminal; and select one terminal in order of priority set for the respective terminals to acquire the position information thereof, in the case where a plurality of the user terminals exist.

\* \* \* \* \*